(12) United States Patent
Hardman et al.

(10) Patent No.: US 8,151,127 B2
(45) Date of Patent: *Apr. 3, 2012

(54) SYSTEM FOR CONSERVING BATTERY LIFE IN A BATTERY OPERATED DEVICE

(75) Inventors: Gordon E. Hardman, Boulder, CO (US); John W. Pyne, Erie, CO (US); Molly A. Hardman, Boulder, CO (US); David A. Przygocki, Longmont, CO (US); David M. Coombs, Tucson, AZ (US); Paul B. Wilson, Tallmadge, OH (US); Ronald C. Grush, Longmont, CO (US); Philip B. Loudin, Boulder, CO (US); Brett W. Floyd, Longmont, CO (US)

(73) Assignee: Bridgestone Americas Tire Operations, LLC, Nashville, TN (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/694,777

(22) Filed: Jan. 27, 2010

(65) Prior Publication Data
US 2010/0127845 A1 May 27, 2010

Related U.S. Application Data

(60) Division of application No. 11/605,825, filed on Nov. 29, 2006, now Pat. No. 7,739,529, which is a division of application No. 09/916,028, filed on Jul. 26, 2001, now Pat. No. 7,161,476, which is a continuation-in-part of application No. 09/915,858, filed on Jul. 26, 2001, now Pat. No. 6,630,885.

(60) Provisional application No. 60/220,896, filed on Jul. 26, 2000.

(51) Int. Cl.
G06F 1/00 (2006.01)
G06F 1/26 (2006.01)
G06F 1/32 (2006.01)
G08B 26/00 (2006.01)
B60C 23/00 (2006.01)
B60C 23/02 (2006.01)

(52) U.S. Cl. ........ 713/320; 713/300; 455/574; 340/442; 340/447; 340/505

(58) Field of Classification Search .................. 713/300, 713/320, 324; 455/574; 340/442, 444, 447, 340/505
See application file for complete search history.

(56) References Cited

U.S. PATENT DOCUMENTS
1,877,988 A 9/1932 Schrank
(Continued)

FOREIGN PATENT DOCUMENTS
CA 2245817 8/1997
(Continued)

OTHER PUBLICATIONS

Billen, Karl, European Search Report, Application No. 09167976.1-2425 / 2113402, Jul. 6, 2010, 5 pages, European Patent Office, Munich, Germany.
(Continued)

*Primary Examiner* — Mark Connolly

(57) ABSTRACT

A battery operated device includes a receiver for receiving a transmission that includes a postamble. A sensor, in a tire, measures a parameter of the tire and outputs data indicative of the parameter. A microprocessor is coupled to the receiver and the sensor. The microprocessor is configured to periodically partially awaken to determine whether the transmission is likely a forward link packet (FLP) by examining the postamble, and to transmit the data in a reverse link packet (RLP) in response to confirming that the transmission is a FLP.

16 Claims, 46 Drawing Sheets

U.S. PATENT DOCUMENTS

| | | |
|---|---|---|
| 2,274,557 A | 2/1942 | Morgan et al. |
| 3,037,575 A | 6/1962 | Quinn |
| 3,232,330 A | 2/1966 | Puis et al. |
| 3,261,001 A | 7/1966 | Magnin |
| 3,309,463 A | 3/1967 | Roedl |
| 3,329,934 A | 7/1967 | Wooden |
| 3,596,509 A | 8/1971 | Raffaelli |
| 3,610,852 A | 10/1971 | Lejeune |
| 3,613,075 A | 10/1971 | Griffiths et al. |
| 3,614,732 A | 10/1971 | Lejeune |
| 3,638,180 A | 1/1972 | Lejeune |
| 3,694,803 A | 9/1972 | Strenglein |
| 3,717,030 A | 2/1973 | McGhee et al. |
| 3,723,966 A | 3/1973 | Mueller et al. |
| 3,770,040 A | 11/1973 | De Cicco |
| 3,782,177 A | 1/1974 | Hoop |
| 3,787,806 A | 1/1974 | Church |
| 3,803,550 A | 4/1974 | Mirsky |
| 3,806,471 A | 4/1974 | Mitchell |
| 3,806,869 A | 4/1974 | Davis, Jr. |
| 3,806,905 A | 4/1974 | Strenglein |
| 3,810,090 A | 5/1974 | Davis, Jr. et al. |
| 3,833,094 A | 9/1974 | Grossman |
| 3,873,965 A | 3/1975 | Garcia |
| 3,890,595 A | 6/1975 | Barabino |
| 3,893,228 A | 7/1975 | George et al. |
| 3,903,416 A | 9/1975 | Fox |
| 3,911,434 A | 10/1975 | Cook |
| 3,938,078 A | 2/1976 | Davis et al. |
| 3,974,477 A | 8/1976 | Hester |
| 3,985,984 A | 10/1976 | Cappa |
| 3,993,939 A | 11/1976 | Slavin et al. |
| 3,999,046 A | 12/1976 | Porter |
| 4,006,326 A | 2/1977 | Lejeune |
| 4,010,354 A | 3/1977 | Apicella, Jr. et al. |
| 4,048,614 A | 9/1977 | Shumway |
| 4,054,540 A | 10/1977 | Michalchik |
| 4,057,783 A | 11/1977 | Blanchier |
| 4,067,235 A | 1/1978 | Markland et al. |
| 4,068,898 A | 1/1978 | Hanson |
| 4,071,724 A | 1/1978 | Lejeune |
| 4,074,227 A | 2/1978 | Kalmus |
| 4,075,603 A | 2/1978 | Snyder et al. |
| 4,086,564 A | 4/1978 | Claxton |
| 4,090,172 A | 5/1978 | Vesnic |
| 4,101,872 A | 7/1978 | Pappas |
| 4,103,283 A | 7/1978 | Lee |
| 4,104,595 A | 8/1978 | Overzet |
| 4,110,732 A | 8/1978 | Jarocha et al. |
| 4,119,944 A | 10/1978 | Smith |
| 4,120,193 A | 10/1978 | Tomsic et al. |
| 4,131,876 A | 12/1978 | Dees, Sr. et al. |
| 4,137,520 A | 1/1979 | Deveau |
| 4,153,881 A | 5/1979 | Permut et al. |
| 4,157,530 A | 6/1979 | Merz |
| 4,160,234 A | 7/1979 | Karbo et al. |
| 4,163,208 A | 7/1979 | Merz |
| 4,180,794 A | 12/1979 | Claxton |
| 4,186,377 A | 1/1980 | Barabino |
| 4,190,804 A | 2/1980 | Pyne et al. |
| 4,191,948 A | 3/1980 | Stockdale |
| 4,192,005 A | 3/1980 | Kurtz |
| 4,199,991 A | 4/1980 | Kodama |
| 4,210,898 A | 7/1980 | Betts |
| 4,211,901 A | 7/1980 | Matsuda et al. |
| 4,220,907 A | 9/1980 | Pappas et al. |
| 4,229,728 A | 10/1980 | Tremba |
| 4,237,728 A | 12/1980 | Betts et al. |
| 4,242,671 A | 12/1980 | Plows |
| 4,246,567 A | 1/1981 | Miller |
| 4,254,312 A | 3/1981 | Migrin et al. |
| 4,263,579 A | 4/1981 | Corgan et al. |
| 4,276,538 A | 6/1981 | Eventoff et al. |
| 4,276,540 A | 6/1981 | Habib, Jr. |
| 4,283,707 A | 8/1981 | Church |
| 4,300,118 A | 11/1981 | Matsuda et al. |
| 4,300,120 A | 11/1981 | Surman |
| 4,301,337 A | 11/1981 | Eventoff |
| 4,303,984 A | 12/1981 | Houvig |
| 4,308,520 A | 12/1981 | Darlington |
| 4,311,044 A | 1/1982 | Marshall et al. |
| 4,311,985 A | 1/1982 | Gee et al. |
| 4,312,001 A | 1/1982 | Marzolf |
| 4,313,483 A | 2/1982 | Brockmann |
| 4,314,227 A | 2/1982 | Eventoff |
| 4,314,228 A | 2/1982 | Eventoff |
| 4,314,230 A | 2/1982 | Cardinal et al. |
| 4,316,176 A | 2/1982 | Gee et al. |
| 4,317,126 A | 2/1982 | Gragg, Jr. |
| 4,319,220 A | 3/1982 | Pappas et al. |
| 4,328,494 A | 5/1982 | Goodall |
| 4,330,774 A | 5/1982 | Doty |
| 4,334,215 A | 6/1982 | Frazier et al. |
| 4,334,428 A | 6/1982 | Fima et al. |
| 4,335,283 A | 6/1982 | Migrin |
| 4,337,652 A | 7/1982 | Matsuda et al. |
| 4,363,020 A | 12/1982 | Venema |
| 4,374,438 A | 2/1983 | Crowley |
| 4,376,931 A | 3/1983 | Komatu et al. |
| 4,382,830 A | 5/1983 | Cohn |
| 4,384,482 A | 5/1983 | Snyder |
| 4,386,247 A | 5/1983 | Couat |
| 4,386,791 A | 6/1983 | Watanabe |
| 4,392,382 A | 7/1983 | Myers |
| 4,398,172 A | 8/1983 | Carroll et al. |
| 4,398,704 A | 8/1983 | Buchanan, Jr. et al. |
| 4,409,586 A | 10/1983 | Hochstein |
| 4,443,785 A | 4/1984 | Speranza |
| 4,445,093 A | 4/1984 | Kohler |
| 4,446,447 A | 5/1984 | McNamara |
| 4,449,248 A | 5/1984 | Leslie et al. |
| 4,450,431 A | 5/1984 | Hochstein |
| 4,451,714 A | 5/1984 | Eventoff |
| 4,467,641 A | 8/1984 | Abraham |
| 4,468,650 A | 8/1984 | Barbee |
| 4,468,968 A | 9/1984 | Kee |
| 4,489,599 A | 12/1984 | Andrei-Alexandru et al. |
| 4,494,106 A | 1/1985 | Smith et al. |
| 4,494,183 A | 1/1985 | Bayer et al. |
| 4,501,006 A | 2/1985 | Korenberg |
| 4,510,484 A | 4/1985 | Snyder |
| 4,517,834 A | 5/1985 | Luke |
| 4,520,307 A | 5/1985 | Weiss et al. |
| 4,521,645 A | 6/1985 | Carroll |
| 4,525,766 A | 6/1985 | Petersen |
| 4,529,961 A | 7/1985 | Nishimura et al. |
| 4,531,112 A | 7/1985 | Thomas |
| 4,536,668 A | 8/1985 | Boyer |
| 4,540,976 A | 9/1985 | Wegrzyn |
| 4,543,457 A | 9/1985 | Petersen et al. |
| 4,550,827 A | 11/1985 | Watts et al. |
| 4,554,527 A | 11/1985 | Muller |
| 4,554,528 A | 11/1985 | Burkel et al. |
| 4,567,459 A | 1/1986 | Folger et al. |
| 4,567,460 A | 1/1986 | Gebler |
| 4,570,152 A | 2/1986 | Melton et al. |
| 4,571,588 A | 2/1986 | Lee et al. |
| 4,574,267 A | 3/1986 | Jones |
| 4,578,992 A | 4/1986 | Galasko et al. |
| 4,581,606 A | 4/1986 | Mallory |
| 4,588,978 A | 5/1986 | Allen |
| 4,593,370 A | 6/1986 | Balkanli |
| 4,609,905 A | 9/1986 | Uzzo |
| 4,619,137 A | 10/1986 | Bott |
| 4,644,317 A | 2/1987 | Aingworth |
| 4,651,992 A | 3/1987 | Danino et al. |
| 4,657,289 A | 4/1987 | Boyer |
| 4,660,854 A | 4/1987 | Suzuki et al. |
| 4,669,052 A | 5/1987 | Bianco |
| 4,678,203 A | 7/1987 | Rohner et al. |
| 4,693,112 A | 9/1987 | Ferris |
| 4,695,823 A | 9/1987 | Vernon |
| 4,701,826 A | 10/1987 | Mikkor |
| 4,703,650 A | 11/1987 | Dosjoub et al. |
| 4,711,130 A | 12/1987 | Glas et al. |
| 4,717,905 A | 1/1988 | Morrison, Jr. et al. |
| 4,723,445 A | 2/1988 | Ripley et al. |

| Patent | Date | Inventor |
|---|---|---|
| 4,730,188 A | 3/1988 | Milheiser |
| 4,734,034 A | 3/1988 | Maness et al. |
| 4,734,674 A | 3/1988 | Thomas et al. |
| 4,737,660 A | 4/1988 | Allen et al. |
| 4,737,760 A | 4/1988 | Huang et al. |
| 4,737,761 A | 4/1988 | Dosjoub et al. |
| 4,739,328 A | 4/1988 | Koelle et al. |
| 4,742,712 A | 5/1988 | Kokubu |
| 4,742,857 A | 5/1988 | Gandhi |
| 4,747,761 A | 5/1988 | Yumiyama et al. |
| 4,749,993 A | 6/1988 | Szabo et al. |
| 4,788,525 A | 11/1988 | Lichtenstein |
| 4,798,369 A | 1/1989 | Geno et al. |
| 4,816,802 A | 3/1989 | Doerksen et al. |
| 4,816,839 A | 3/1989 | Landt |
| 4,817,922 A | 4/1989 | Hovance |
| 4,823,107 A | 4/1989 | Pompier |
| 4,831,210 A | 5/1989 | Larson et al. |
| 4,835,717 A | 5/1989 | Michel et al. |
| 4,837,553 A | 6/1989 | Pompier |
| 4,844,138 A | 7/1989 | Kokubu |
| 4,845,649 A | 7/1989 | Eckardt et al. |
| 4,851,809 A | 7/1989 | McAlister |
| 4,853,690 A | 8/1989 | Mayer et al. |
| 4,856,993 A | 8/1989 | Maness et al. |
| 4,862,486 A | 8/1989 | Wing et al. |
| 4,868,476 A | 9/1989 | Respaut |
| 4,875,378 A | 10/1989 | Yamazaki et al. |
| 4,888,591 A | 12/1989 | Landt et al. |
| 4,890,090 A | 12/1989 | Ballyns |
| 4,891,973 A | 1/1990 | Bollweber et al. |
| 4,893,110 A | 1/1990 | Hebert |
| 4,894,639 A | 1/1990 | Schmierer |
| 4,903,335 A | 2/1990 | Shimizu |
| 4,909,074 A | 3/1990 | Gerresheim et al. |
| 4,911,217 A | 3/1990 | Dunn et al. |
| 4,929,851 A | 5/1990 | Pace |
| 4,933,852 A | 6/1990 | Lemelson |
| 4,934,856 A | 6/1990 | Pauc |
| 4,935,738 A | 6/1990 | Pilato |
| 4,938,056 A | 7/1990 | DeRudder et al. |
| 4,938,645 A | 7/1990 | Wollar |
| 4,942,510 A | 7/1990 | Edwards |
| 4,945,337 A | 7/1990 | Huang |
| 4,951,502 A | 8/1990 | Dorfler et al. |
| 4,953,393 A | 9/1990 | Galasko et al. |
| 4,953,394 A | 9/1990 | Franke et al. |
| 4,954,677 A | 9/1990 | Alberter et al. |
| 4,954,806 A | 9/1990 | Hwang |
| 4,966,034 A | 10/1990 | Bock et al. |
| 4,975,679 A | 12/1990 | Ballyns |
| 4,977,586 A | 12/1990 | Curry |
| 4,978,941 A | 12/1990 | Brown |
| 4,998,092 A | 3/1991 | Ohno et al. |
| 5,001,457 A | 3/1991 | Wang |
| 5,014,224 A | 5/1991 | Hans |
| 5,025,244 A | 6/1991 | Huang |
| 5,025,550 A | 6/1991 | Zirbes et al. |
| 5,027,428 A | 6/1991 | Ishiguro et al. |
| 5,029,468 A | 7/1991 | Dosjoub |
| 5,030,807 A | 7/1991 | Landt et al. |
| 5,032,845 A | 7/1991 | Velasco |
| 5,033,295 A | 7/1991 | Schmid et al. |
| 5,035,137 A | 7/1991 | Burkard et al. |
| 5,038,069 A | 8/1991 | Lukasiewicz et al. |
| 5,040,562 A | 8/1991 | Achterholt |
| 5,050,110 A | 9/1991 | Rott |
| 5,050,292 A | 9/1991 | Zirbes et al. |
| 5,053,774 A | 10/1991 | Schuermann et al. |
| 5,054,315 A | 10/1991 | Dosjoub |
| 5,055,659 A | 10/1991 | Hendrick et al. |
| 5,055,826 A | 10/1991 | Ballyns |
| 5,060,527 A | 10/1991 | Burgess |
| 5,061,917 A | 10/1991 | Higgs et al. |
| 5,063,774 A | 11/1991 | Burkard et al. |
| 5,071,259 A | 12/1991 | Metzger et al. |
| 5,079,536 A | 1/1992 | Chapman |
| 5,081,443 A | 1/1992 | Breit |
| 5,083,457 A | 1/1992 | Schultz |
| 5,090,237 A | 2/1992 | Schrumpf et al. |
| 5,104,063 A | 4/1992 | Hartley |
| 5,109,213 A | 4/1992 | Williams |
| 5,115,236 A | 5/1992 | Kohler |
| 5,119,066 A | 6/1992 | Ballyns |
| 5,130,694 A | 7/1992 | Zainaleian |
| 5,134,880 A | 8/1992 | Gerhard |
| 5,140,851 A | 8/1992 | Hettich et al. |
| RE34,095 E | 10/1992 | Padula et al. |
| 5,160,383 A | 11/1992 | Gartland et al. |
| 5,163,281 A | 11/1992 | Kanehira et al. |
| 5,165,281 A | 11/1992 | Bell |
| 5,170,343 A | 12/1992 | Matsuda |
| 5,178,834 A | 1/1993 | Kagayama et al. |
| 5,179,981 A | 1/1993 | Hicks et al. |
| 5,180,456 A | 1/1993 | Schultz et al. |
| 5,181,418 A | 1/1993 | Bartscher et al. |
| 5,181,423 A | 1/1993 | Philipps et al. |
| 5,181,975 A | 1/1993 | Pollack et al. |
| 5,186,054 A | 2/1993 | Sekimura |
| 5,192,929 A | 3/1993 | Walker et al. |
| 5,193,387 A | 3/1993 | Hodate |
| 5,196,845 A | 3/1993 | Myatt |
| 5,201,968 A | 4/1993 | Renier |
| 5,218,861 A | 6/1993 | Brown et al. |
| 5,218,862 A | 6/1993 | Hurrell, II et al. |
| 5,223,851 A | 6/1993 | Hadden et al. |
| 5,228,337 A | 7/1993 | Sharpe et al. |
| 5,230,243 A | 7/1993 | Erich |
| 5,231,872 A | 8/1993 | Bowler et al. |
| 5,235,850 A | 8/1993 | Schurmann |
| 5,247,831 A | 9/1993 | Fioravanti |
| 5,249,609 A | 10/1993 | Walker et al. |
| 5,254,201 A | 10/1993 | Konda et al. |
| 5,260,683 A | 11/1993 | Tanaka et al. |
| 5,261,273 A | 11/1993 | Imani et al. |
| 5,263,524 A | 11/1993 | Boardman |
| 5,274,355 A | 12/1993 | Galan |
| 5,285,189 A | 2/1994 | Nowicki et al. |
| 5,289,160 A | 2/1994 | Fiorletta |
| 5,289,161 A | 2/1994 | Huang |
| 5,289,369 A | 2/1994 | Hirshberg |
| 5,293,919 A | 3/1994 | Olney et al. |
| 5,297,424 A | 3/1994 | Sackett |
| 5,300,164 A | 4/1994 | DeTrano et al. |
| 5,301,553 A | 4/1994 | Schultz et al. |
| 5,302,939 A | 4/1994 | Downs et al. |
| 5,315,866 A | 5/1994 | Righi |
| 5,319,354 A | 6/1994 | Myatt |
| 5,335,540 A | 8/1994 | Bowler et al. |
| 5,335,541 A | 8/1994 | Sharpe |
| 5,342,408 A | 8/1994 | deCoriolis et al. |
| 5,348,067 A | 9/1994 | Myatt |
| 5,349,328 A | 9/1994 | Lonzame |
| 5,349,332 A | 9/1994 | Ferguson et al. |
| 5,359,886 A | 11/1994 | Pradelle |
| 5,365,551 A * | 11/1994 | Snodgrass et al. ............ 375/141 |
| 5,374,319 A | 12/1994 | Stueber et al. |
| 5,400,649 A | 3/1995 | Bartscher et al. |
| 5,407,255 A | 4/1995 | Feldman |
| 5,409,049 A | 4/1995 | Renier |
| 5,411,051 A | 5/1995 | Olney et al. |
| 5,413,159 A | 5/1995 | Olney et al. |
| 5,436,612 A | 7/1995 | Aduddell |
| 5,442,553 A | 8/1995 | Parrillo |
| 5,444,448 A | 8/1995 | Schuermann et al. |
| 5,448,242 A | 9/1995 | Sharpe et al. |
| 5,452,608 A | 9/1995 | Green |
| 5,453,747 A | 9/1995 | D'Hont et al. |
| 5,460,037 A | 10/1995 | Chamussy et al. |
| 5,461,385 A | 10/1995 | Armstrong |
| 5,462,617 A | 10/1995 | Bender et al. |
| 5,463,374 A | 10/1995 | Mendez et al. |
| 5,468,108 A | 11/1995 | Sullivan et al. |
| 5,471,212 A | 11/1995 | Sharpe et al. |
| 5,472,032 A | 12/1995 | Winston et al. |
| 5,473,111 A | 12/1995 | Hattori et al. |
| 5,473,938 A | 12/1995 | Handfield et al. |
| 5,479,171 A | 12/1995 | Schuermann |

| Patent | Date | Inventor |
|---|---|---|
| 5,483,826 A | 1/1996 | Schultz et al. |
| 5,483,827 A | 1/1996 | Kulka et al. |
| 5,488,352 A | 1/1996 | Jasper |
| 5,491,465 A | 2/1996 | Adams |
| 5,493,925 A | 2/1996 | Liegel et al. |
| 5,500,065 A | 3/1996 | Koch et al. |
| 5,500,637 A | 3/1996 | Kokubu |
| 5,505,080 A | 4/1996 | McGhee |
| 5,513,524 A | 5/1996 | Rosenfeld |
| 5,513,525 A | 5/1996 | Schurmann |
| 5,517,853 A | 5/1996 | Chamussy |
| 5,520,231 A | 5/1996 | Myatt |
| 5,521,846 A | 5/1996 | Lang et al. |
| 5,526,861 A | 6/1996 | Oshita et al. |
| 5,531,109 A | 7/1996 | Tsagas |
| 5,535,630 A | 7/1996 | Miyamoto |
| 5,537,867 A | 7/1996 | Kosaka et al. |
| 5,540,092 A | 7/1996 | Handfield et al. |
| 5,541,574 A | 7/1996 | Lowe et al. |
| 5,542,293 A | 8/1996 | Tsuda et al. |
| 5,545,599 A | 8/1996 | Pickering, Jr. et al. |
| 5,550,548 A | 8/1996 | Schuermann |
| 5,552,789 A | 9/1996 | Schuermann |
| 5,559,484 A | 9/1996 | Nowicki et al. |
| 5,562,787 A | 10/1996 | Koch et al. |
| 5,573,610 A | 11/1996 | Koch et al. |
| 5,573,611 A | 11/1996 | Koch et al. |
| 5,578,984 A | 11/1996 | Nakajima |
| 5,581,023 A | 12/1996 | Handfield et al. |
| 5,583,482 A | 12/1996 | Chamussy et al. |
| 5,585,554 A | 12/1996 | Handfield et al. |
| 5,586,130 A | 12/1996 | Doyle |
| 5,587,698 A | 12/1996 | Genna |
| 5,589,815 A | 12/1996 | Nishihara et al. |
| 5,600,301 A | 2/1997 | Robinson, III |
| 5,602,524 A | 2/1997 | Mock et al. |
| 5,604,307 A | 2/1997 | Iida et al. |
| 5,604,481 A | 2/1997 | Lin |
| 5,604,482 A | 2/1997 | Majeed et al. |
| 5,611,875 A | 3/1997 | Bachhuber |
| 5,612,671 A | 3/1997 | Mendez et al. |
| 5,619,022 A | 4/1997 | Long |
| 5,621,309 A | 4/1997 | Feldman |
| 5,626,140 A | 5/1997 | Feldman et al. |
| 5,627,517 A | 5/1997 | Theimer et al. |
| 5,627,751 A | 5/1997 | Davis et al. |
| 5,635,691 A | 6/1997 | Ballyns |
| 5,637,926 A | 6/1997 | Zedonis |
| 5,640,683 A | 6/1997 | Evans et al. |
| 5,647,927 A | 7/1997 | Mason |
| 5,656,993 A | 8/1997 | Coulthard |
| 5,658,011 A | 8/1997 | Byon |
| 5,661,651 A | 8/1997 | Geschke et al. |
| 5,663,496 A | 9/1997 | Handfield et al. |
| 5,667,606 A | 9/1997 | Renier |
| 5,673,018 A | 9/1997 | Lowe et al. |
| 5,673,037 A | 9/1997 | Cesar et al. |
| 5,674,332 A | 10/1997 | Battocchio |
| 5,675,314 A | 10/1997 | Chaklader |
| 5,677,667 A | 10/1997 | Lesesky et al. |
| 5,691,694 A | 11/1997 | Horie |
| 5,694,111 A | 12/1997 | Huang |
| 5,699,041 A | 12/1997 | Ballyns |
| 5,704,117 A | 1/1998 | Mok et al. |
| 5,707,045 A | 1/1998 | Easter |
| 5,708,411 A | 1/1998 | Hill |
| 5,710,539 A | 1/1998 | Iida |
| 5,717,135 A | 2/1998 | Fiorletta et al. |
| 5,717,376 A | 2/1998 | Wilson |
| 5,718,025 A | 2/1998 | Courtin |
| 5,721,374 A | 2/1998 | Siekkinen et al. |
| 5,724,266 A | 3/1998 | Kishimoto et al. |
| 5,728,933 A | 3/1998 | Schultz et al. |
| 5,731,516 A | 3/1998 | Handfield et al. |
| 5,731,522 A | 3/1998 | Sittler |
| 5,731,754 A | 3/1998 | Lee, Jr. et al. |
| 5,734,319 A | 3/1998 | Stephens et al. |
| 5,741,966 A | 4/1998 | Handfield et al. |
| 5,746,138 A | 5/1998 | Hirose |
| 5,748,076 A | 5/1998 | Horie |
| 5,749,984 A | 5/1998 | Frey et al. |
| 5,752,202 A | 5/1998 | Obright |
| 5,754,101 A | 5/1998 | Tsunetomi et al. |
| 5,754,102 A | 5/1998 | Yanase |
| 5,760,682 A | 6/1998 | Liu et al. |
| 5,764,138 A | 6/1998 | Lowe |
| 5,767,398 A | 6/1998 | Naedler |
| 5,774,047 A | 6/1998 | Hensel, IV |
| 5,774,048 A | 6/1998 | Achterholt |
| 5,780,733 A | 7/1998 | Meunier |
| 5,781,104 A | 7/1998 | Huang |
| 5,783,992 A | 7/1998 | Eberwine et al. |
| 5,790,016 A | 8/1998 | Konchin et al. |
| 5,793,285 A | 8/1998 | Wehinger |
| 5,798,689 A | 8/1998 | Huang |
| 5,801,305 A | 9/1998 | Kawai et al. |
| 5,801,306 A | 9/1998 | Chamussy et al. |
| 5,808,190 A | 9/1998 | Ernst |
| 5,814,263 A | 9/1998 | Pouille et al. |
| 5,814,725 A | 9/1998 | Furuichi et al. |
| 5,824,891 A | 10/1998 | Monson |
| 5,825,285 A | 10/1998 | Sawafuji |
| 5,825,286 A | 10/1998 | Coulthard |
| 5,827,957 A | 10/1998 | Wehinger |
| 5,828,975 A | 10/1998 | Isshiki et al. |
| 5,837,891 A | 11/1998 | Bridge |
| 5,838,229 A | 11/1998 | Robinson, III |
| 5,844,130 A | 12/1998 | Hilgart et al. |
| 5,846,354 A | 12/1998 | Winston et al. |
| 5,847,317 A | 12/1998 | Phelps |
| 5,849,120 A | 12/1998 | Drieux |
| 5,853,020 A | 12/1998 | Widner |
| 5,856,788 A | 1/1999 | Walter et al. |
| 5,877,679 A | 3/1999 | Prottey |
| 5,880,363 A | 3/1999 | Meyer et al. |
| 5,883,305 A | 3/1999 | Jo et al. |
| 5,886,624 A | 3/1999 | Hebert |
| 5,889,464 A | 3/1999 | Huang |
| 5,895,846 A | 4/1999 | Chamussy et al. |
| 5,896,060 A | 4/1999 | Ovard et al. |
| 5,900,543 A | 5/1999 | Oshiro |
| 5,900,808 A | 5/1999 | Lebo |
| 5,900,809 A | 5/1999 | Hebert |
| 5,907,097 A | 5/1999 | Nakajima |
| 5,909,050 A | 6/1999 | Furey et al. |
| 5,913,240 A | 6/1999 | Drahne et al. |
| 5,913,241 A | 6/1999 | Ohashi et al. |
| 5,922,949 A | 7/1999 | Nakajima |
| 5,923,244 A | 7/1999 | Jones |
| 5,924,055 A | 7/1999 | Hattori |
| 5,929,755 A | 7/1999 | Hsieh |
| 5,929,756 A | 7/1999 | Randazzo et al. |
| 5,929,780 A | 7/1999 | Pagnol et al. |
| 5,929,801 A | 7/1999 | Aslanidis et al. |
| 5,936,155 A | 8/1999 | Francois et al. |
| 5,936,519 A | 8/1999 | Nakajima et al. |
| 5,937,926 A | 8/1999 | Powell |
| 5,939,626 A | 8/1999 | Tominaga et al. |
| 5,939,627 A | 8/1999 | Huang |
| 5,939,977 A | 8/1999 | Monson |
| 5,940,006 A | 8/1999 | MacLellan et al. |
| 5,940,781 A | 8/1999 | Nakajima |
| 5,942,681 A | 8/1999 | Vollenweider et al. |
| 5,942,987 A | 8/1999 | Heinrich et al. |
| 5,945,908 A | 8/1999 | Nowicki et al. |
| 5,945,938 A | 8/1999 | Chia et al. |
| 5,948,989 A | 9/1999 | Ichikawa et al. |
| 5,949,330 A | 9/1999 | Hoffman et al. |
| 5,952,568 A | 9/1999 | Bedell, Jr. |
| 5,955,942 A | 9/1999 | Slifkin et al. |
| 5,955,949 A | 9/1999 | Cocita |
| 5,956,820 A | 9/1999 | Albinski |
| 5,957,986 A | 9/1999 | Coverdill |
| 5,959,201 A | 9/1999 | Cummins et al. |
| 5,959,202 A | 9/1999 | Nakajima |
| 5,960,844 A | 10/1999 | Hamaya |
| 5,962,778 A | 10/1999 | Billieres |
| 5,962,779 A | 10/1999 | Bass |

| | | | | | | |
|---|---|---|---|---|---|---|
| 5,963,128 A | 10/1999 | McClelland | | 6,112,587 A | 9/2000 | Oldenettel |
| 5,965,807 A | 10/1999 | Yamashita et al. | | 6,114,849 A | 9/2000 | Price et al. |
| 5,965,808 A | 10/1999 | Normann et al. | | 6,118,369 A | 9/2000 | Boesch |
| 5,965,822 A | 10/1999 | Wu | | 6,119,523 A | 9/2000 | Olsson et al. |
| 5,967,198 A | 10/1999 | Smalley | | 6,124,785 A | 9/2000 | Huang |
| 5,969,239 A | 10/1999 | Tromeur et al. | | 6,124,786 A | 9/2000 | Normann et al. |
| 5,970,393 A | 10/1999 | Khorrami et al. | | 6,124,787 A | 9/2000 | Isakov et al. |
| 5,971,046 A | 10/1999 | Koch et al. | | 6,124,810 A | 9/2000 | Segal et al. |
| 5,974,368 A | 10/1999 | Schepps et al. | | 6,130,602 A | 10/2000 | O'Toole et al. |
| 5,975,174 A | 11/1999 | Loewe | | 6,137,400 A | 10/2000 | Yanase et al. |
| 5,977,870 A | 11/1999 | Rensel et al. | | 6,147,659 A | 11/2000 | Takahashi et al. |
| 5,979,232 A | 11/1999 | Halcomb | | 6,148,888 A | 11/2000 | Benimeli |
| 5,982,279 A | 11/1999 | Tominaga et al. | | 6,148,889 A | 11/2000 | Minami et al. |
| 5,983,715 A | 11/1999 | Nakajima | | 6,160,474 A | 12/2000 | Tsunetomi et al. |
| 5,987,980 A | 11/1999 | Mangafas et al. | | 6,161,430 A | 12/2000 | Koch et al. |
| 6,002,327 A | 12/1999 | Boesch et al. | | 6,161,431 A | 12/2000 | Drahne et al. |
| 6,003,379 A | 12/1999 | Ichikawa et al. | | 6,163,255 A | 12/2000 | Banzhof et al. |
| 6,005,242 A | 12/1999 | Chernyak | | 6,169,480 B1 | 1/2001 | Uhl et al. |
| 6,005,480 A | 12/1999 | Banzhof et al. | | 6,175,301 B1 | 1/2001 | Piesinger |
| 6,006,600 A | 12/1999 | Cheng | | 6,175,302 B1 | 1/2001 | Huang |
| 6,009,749 A | 1/2000 | Huang | | 6,175,787 B1 | 1/2001 | Breed |
| 6,011,462 A | 1/2000 | Cooper | | 6,177,872 B1 | 1/2001 | Kodukula et al. |
| 6,011,463 A | 1/2000 | Cormier, Sr. | | 6,181,240 B1 | 1/2001 | Wu |
| 6,016,102 A | 1/2000 | Fortune et al. | | 6,181,241 B1 | 1/2001 | Normann et al. |
| 6,018,993 A | 2/2000 | Normann et al. | | 6,182,021 B1 | 1/2001 | Izumi et al. |
| 6,025,777 A | 2/2000 | Fuller et al. | | 6,192,746 B1 | 2/2001 | Wilson |
| 6,025,778 A | 2/2000 | Dietz et al. | | 6,192,747 B1 | 2/2001 | Fennel |
| 6,025,780 A | 2/2000 | Bowers et al. | | 6,194,998 B1 | 2/2001 | Huang |
| 6,030,478 A | 2/2000 | Koch et al. | | 6,194,999 B1 | 2/2001 | Uhl et al. |
| 6,031,450 A | 2/2000 | Huang | | 6,198,392 B1 | 3/2001 | Hahn et al. |
| 6,032,522 A | 3/2000 | Clark et al. | | 6,199,575 B1 | 3/2001 | Widner |
| 6,034,595 A | 3/2000 | Yanase | | 6,204,750 B1 | 3/2001 | Scheelen |
| 6,034,596 A | 3/2000 | Smith et al. | | 6,204,758 B1 | 3/2001 | Wacker et al. |
| 6,034,597 A | 3/2000 | Normann et al. | | 6,209,771 B1 | 4/2001 | Lyons et al. |
| 6,036,179 A | 3/2000 | Rensel | | 6,215,389 B1 | 4/2001 | Schmidt |
| 6,037,863 A | 3/2000 | Collins | | 6,215,393 B1 | 4/2001 | Delaporte |
| 6,041,649 A | 3/2000 | Fembock | | 6,215,402 B1 | 4/2001 | Kodukula et al. |
| 6,043,737 A | 3/2000 | Shehan et al. | | 6,215,437 B1 | 4/2001 | Schurmann et al. |
| 6,043,738 A | 3/2000 | Stewart et al. | | 6,217,683 B1 | 4/2001 | Balzer et al. |
| 6,046,672 A | 4/2000 | Pearman | | 6,218,935 B1 | 4/2001 | Corcoran et al. |
| 6,053,038 A | 4/2000 | Schramm et al. | | 6,218,936 B1 | 4/2001 | Imao |
| 6,055,854 A | 5/2000 | Chen | | 6,218,937 B1 | 4/2001 | Delaporte |
| 6,055,855 A | 5/2000 | Straub | | 6,220,319 B1 | 4/2001 | Reuter |
| 6,055,925 A | 5/2000 | Horton | | 6,222,444 B1 | 4/2001 | Wang |
| 6,058,768 A | 5/2000 | Huang | | 6,228,929 B1 | 5/2001 | Larson et al. |
| 6,060,983 A | 5/2000 | Yanase et al. | | 6,232,875 B1 | 5/2001 | DeZorzi |
| 6,060,984 A | 5/2000 | Braun et al. | | 6,239,737 B1 | 5/2001 | Black |
| 6,061,614 A | 5/2000 | Carrender et al. | | 6,240,126 B1 | 5/2001 | Ohashi et al. |
| 6,061,642 A | 5/2000 | Nakajima | | 6,243,007 B1 | 6/2001 | McLaughlin et al. |
| 6,062,072 A | 5/2000 | Mock et al. | | 6,243,018 B1 | 6/2001 | Saito et al. |
| 6,064,315 A | 5/2000 | Oriassino et al. | | 6,244,104 B1 | 6/2001 | Koch et al. |
| 6,064,936 A | 5/2000 | Nakajima | | 6,246,316 B1 | 6/2001 | Andsager |
| 6,067,848 A | 5/2000 | Siegfried et al. | | 6,246,317 B1 | 6/2001 | Pickornik et al. |
| 6,067,850 A | 5/2000 | Lang et al. | | 6,246,356 B1 | 6/2001 | Gunnarsson |
| 6,069,966 A | 5/2000 | Jones et al. | | 6,252,498 B1 | 6/2001 | Pashayan, Jr. |
| 6,072,387 A | 6/2000 | Overbeck et al. | | 6,253,616 B1 | 7/2001 | Permuy et al. |
| 6,075,023 A | 6/2000 | Dohmen et al. | | 6,255,940 B1 | 7/2001 | Phelan et al. |
| 6,082,192 A | 7/2000 | Koch et al. | | 6,257,289 B1 | 7/2001 | Tomita et al. |
| 6,084,530 A | 7/2000 | Pidwerbetsky et al. | | 6,259,360 B1 | 7/2001 | Takamura |
| 6,087,930 A | 7/2000 | Kulka et al. | | 6,259,361 B1 | 7/2001 | Robillard et al. |
| 6,089,085 A | 7/2000 | Newman | | 6,262,657 B1 | 7/2001 | Okuda et al. |
| 6,092,028 A | 7/2000 | Naito et al. | | 6,267,010 B1 | 7/2001 | Hatanaka et al. |
| 6,092,414 A | 7/2000 | Newman | | 6,271,748 B1 | 8/2001 | Derbyshire et al. |
| 6,092,415 A | 7/2000 | Borenius et al. | | 6,275,148 B1 | 8/2001 | Takamura et al. |
| 6,094,979 A | 8/2000 | Haslett | | 6,278,361 B1 | 8/2001 | Magiawala et al. |
| 6,098,682 A | 8/2000 | Kis | | 6,278,363 B1 | 8/2001 | Bezek et al. |
| 6,100,790 A | 8/2000 | Evans et al. | | 6,281,787 B1 | 8/2001 | Lerg et al. |
| 6,100,798 A | 8/2000 | Liang | | 6,281,794 B1 | 8/2001 | Duan et al. |
| 6,100,804 A | 8/2000 | Brady et al. | | 6,304,827 B1 | 10/2001 | Blixhavn et al. |
| 6,100,814 A * | 8/2000 | Doyle ................. 340/12.5 | | 6,329,825 B1 | 12/2001 | Tanaka et al. |
| 6,100,840 A | 8/2000 | Zidek et al. | | 6,339,956 B1 | 1/2002 | Huinink et al. |
| 6,101,870 A | 8/2000 | Kato et al. | | 6,339,957 B1 | 1/2002 | Yanase et al. |
| 6,101,883 A | 8/2000 | Takeuchi | | 6,340,929 B1 | 1/2002 | Katou et al. |
| 6,105,423 A | 8/2000 | Prottey | | 6,340,930 B1 * | 1/2002 | Lin ................. 340/447 |
| 6,107,917 A | 8/2000 | Carrender et al. | | 6,343,506 B1 | 2/2002 | Jones et al. |
| 6,109,099 A | 8/2000 | Kawai et al. | | 6,351,990 B1 | 3/2002 | McInnes |
| 6,111,520 A | 8/2000 | Allen et al. | | 6,357,292 B1 | 3/2002 | Schultz et al. |
| 6,112,165 A | 8/2000 | Uhl et al. | | 6,357,469 B1 | 3/2002 | Bell |
| 6,112,585 A | 9/2000 | Schrottle et al. | | 6,357,833 B1 | 3/2002 | Bajer |

| Patent No. | Date | Name |
|---|---|---|
| 6,359,556 B1 | 3/2002 | Katou |
| 6,360,594 B1 | 3/2002 | Koch et al. |
| 6,362,730 B2 | 3/2002 | Razavi et al. |
| 6,362,731 B1 | 3/2002 | Lill |
| 6,362,732 B1 | 3/2002 | Konchin et al. |
| 6,362,733 B1 | 3/2002 | Momose et al. |
| 6,363,790 B1 | 4/2002 | Flögel et al. |
| 6,367,528 B1 | 4/2002 | Colantonio et al. |
| 6,369,703 B1 | 4/2002 | Lill |
| 6,369,712 B2 * | 4/2002 | Letkomiller et al. ...... 340/572.1 |
| 6,371,178 B1 | 4/2002 | Wilson |
| 6,374,666 B1 | 4/2002 | Lemberger et al. |
| 6,377,203 B1 | 4/2002 | Doany |
| 6,378,360 B1 | 4/2002 | Bartels |
| 6,384,720 B1 | 5/2002 | Juzswik et al. |
| 6,385,511 B1 | 5/2002 | Fondeur et al. |
| 6,385,553 B1 | 5/2002 | Naito et al. |
| 6,386,023 B1 | 5/2002 | Sajna et al. |
| 6,386,251 B1 | 5/2002 | Koch et al. |
| 6,388,567 B1 | 5/2002 | Bohm et al. |
| 6,388,568 B1 | 5/2002 | Arita et al. |
| 6,388,636 B1 | 5/2002 | Brown et al. |
| 6,396,396 B2 | 5/2002 | Oshiro et al. |
| 6,396,438 B1 | 5/2002 | Seal |
| 6,397,670 B1 | 6/2002 | Dufournier et al. |
| 6,400,261 B1 | 6/2002 | Starkey et al. |
| 6,400,263 B1 | 6/2002 | Kokubo |
| 6,404,330 B1 | 6/2002 | Sugisawa |
| 6,407,661 B2 | 6/2002 | Arita et al. |
| 6,408,690 B1 | 6/2002 | Young et al. |
| 6,411,199 B1 | 6/2002 | Geiszler et al. |
| 6,411,213 B1 | 6/2002 | Vega et al. |
| 6,414,592 B1 | 7/2002 | Dixit et al. |
| 6,415,839 B1 | 7/2002 | Pompier et al. |
| 6,417,766 B1 | 7/2002 | Starkey |
| 6,420,966 B2 | 7/2002 | Sugisawa |
| 6,420,967 B1 | 7/2002 | Ghabra et al. |
| 6,435,018 B1 | 8/2002 | Murakami et al. |
| 6,435,020 B1 | 8/2002 | Oldenettel et al. |
| 6,438,467 B1 | 8/2002 | Pacsai |
| 6,439,044 B1 | 8/2002 | Tigges |
| 6,439,045 B1 | 8/2002 | Latarnik et al. |
| 6,441,727 B1 | 8/2002 | LeMense |
| 6,441,728 B1 | 8/2002 | Dixit et al. |
| 6,441,732 B1 | 8/2002 | Laitsaari et al. |
| 6,443,198 B1 | 9/2002 | Koch et al. |
| 6,444,069 B1 | 9/2002 | Koch et al. |
| 6,445,286 B1 | 9/2002 | Kessler et al. |
| 6,445,287 B1 | 9/2002 | Schofield et al. |
| 6,446,023 B1 | 9/2002 | Ernst |
| 6,446,502 B1 | 9/2002 | Normann et al. |
| 6,446,764 B1 | 9/2002 | Huang |
| 6,448,891 B2 | 9/2002 | Barnett |
| 6,448,892 B1 | 9/2002 | Delaporte |
| 6,450,020 B1 | 9/2002 | Naito et al. |
| 6,450,021 B1 | 9/2002 | Katou et al. |
| 6,453,737 B2 | 9/2002 | Young et al. |
| 6,456,191 B1 | 9/2002 | Federman |
| 6,456,228 B1 | 9/2002 | Granhed et al. |
| 6,459,369 B1 | 10/2002 | Wang |
| 6,462,650 B1 | 10/2002 | Balzer et al. |
| 6,463,798 B2 | 10/2002 | Niekerk et al. |
| 6,463,799 B1 | 10/2002 | Oldenettel et al. |
| 6,466,127 B1 | 10/2002 | Martin |
| 6,469,621 B1 | 10/2002 | Vredevoogd et al. |
| 6,469,627 B1 | 10/2002 | Forster et al. |
| 6,470,933 B1 | 10/2002 | Volpi |
| 6,472,979 B2 | 10/2002 | Schofield et al. |
| 6,474,380 B1 | 11/2002 | Rensel et al. |
| 6,476,712 B1 | 11/2002 | Achterholt |
| 6,477,894 B1 | 11/2002 | Koch et al. |
| 6,486,771 B1 | 11/2002 | Fuller et al. |
| 6,486,772 B1 | 11/2002 | Hsu |
| 6,486,776 B1 | 11/2002 | Pollack et al. |
| 6,489,888 B1 | 12/2002 | Honeck et al. |
| 6,498,967 B1 | 12/2002 | Hopkins et al. |
| 6,499,343 B2 | 12/2002 | Haas et al. |
| 6,501,372 B2 | 12/2002 | Lin |
| 6,501,373 B2 | 12/2002 | Kitano |
| 6,504,475 B2 | 1/2003 | Sugisawa |
| 6,505,507 B1 | 1/2003 | Imao et al. |
| 6,507,276 B1 | 1/2003 | Young et al. |
| 6,510,375 B2 | 1/2003 | Faye |
| 6,516,660 B1 | 2/2003 | Koch et al. |
| 6,518,875 B2 | 2/2003 | DeZorzi |
| 6,518,876 B1 | 2/2003 | Marguet et al. |
| 6,518,877 B1 | 2/2003 | Starkey et al. |
| 6,520,006 B2 | 2/2003 | Burns |
| 6,522,980 B1 | 2/2003 | Arnold |
| 6,524,415 B1 | 2/2003 | Youngman et al. |
| 6,525,655 B2 | 2/2003 | Huang |
| 6,525,664 B1 | 2/2003 | Erland |
| 6,529,807 B2 | 3/2003 | Sugisawa |
| 6,529,851 B1 | 3/2003 | Oshiro |
| 6,530,271 B1 | 3/2003 | Kawasaki et al. |
| 6,531,957 B1 | 3/2003 | Nysen |
| 6,531,960 B1 | 3/2003 | Gladstone et al. |
| 6,533,010 B1 | 3/2003 | Alonso et al. |
| 6,534,711 B1 | 3/2003 | Pollack |
| 6,535,116 B1 | 3/2003 | Zhou |
| 6,538,566 B1 | 3/2003 | Morand et al. |
| 6,543,277 B2 | 4/2003 | Koch et al. |
| 6,543,279 B1 | 4/2003 | Yones et al. |
| 6,543,500 B1 | 4/2003 | Dufournier |
| 6,549,125 B2 | 4/2003 | Nigon et al. |
| 6,553,820 B1 | 4/2003 | Tsagas et al. |
| 6,557,405 B2 | 5/2003 | Shimura et al. |
| 6,557,406 B2 | 5/2003 | Gabelmann |
| 6,557,407 B1 | 5/2003 | Huang |
| 6,561,018 B2 | 5/2003 | Mancosu et al. |
| 6,561,212 B1 | 5/2003 | Hsu |
| 6,568,259 B2 | 5/2003 | Saheki et al. |
| 6,571,481 B1 | 6/2003 | Weiss |
| 6,571,617 B2 | 6/2003 | Van Niekerk et al. |
| 6,573,828 B1 | 6/2003 | Wu |
| 6,575,023 B2 | 6/2003 | Ohashi et al. |
| 6,580,363 B1 | 6/2003 | Wilson |
| 6,580,364 B1 | 6/2003 | Munch et al. |
| 6,580,365 B2 | 6/2003 | Starkey |
| 6,580,980 B1 | 6/2003 | Gauthier et al. |
| 6,581,449 B1 | 6/2003 | Brown et al. |
| 6,581,657 B1 | 6/2003 | Brown |
| 6,584,427 B2 | 6/2003 | Kamiya et al. |
| 6,587,039 B1 | 7/2003 | Woestemeyer et al. |
| 6,587,767 B2 | 7/2003 | Letang et al. |
| 6,588,264 B1 | 7/2003 | Johnson |
| 6,588,265 B1 | 7/2003 | Roberson |
| 6,591,668 B1 | 7/2003 | Becherer et al. |
| 6,591,671 B2 | 7/2003 | Brown |
| 6,591,672 B2 | 7/2003 | Chuang et al. |
| 6,593,845 B1 | 7/2003 | Friedman et al. |
| 6,594,558 B1 | 7/2003 | Schmitt |
| 6,594,566 B1 | 7/2003 | Skoff |
| 6,595,046 B2 | 7/2003 | Lemberger et al. |
| 6,597,284 B2 | 7/2003 | Juzswik |
| 6,604,040 B2 | 8/2003 | Kawasaki et al. |
| 6,604,414 B1 | 8/2003 | Claussen et al. |
| 6,604,415 B2 | 8/2003 | Imao et al. |
| 6,604,416 B2 | 8/2003 | Tsujita |
| 6,606,903 B2 | 8/2003 | Hsu |
| 6,608,554 B2 | 8/2003 | Leseky et al. |
| 6,609,418 B2 | 8/2003 | Yamagiwa et al. |
| 6,609,419 B1 | 8/2003 | Bankart et al. |
| 6,611,224 B1 | 8/2003 | Nysen et al. |
| 6,611,755 B1 | 8/2003 | Coffee et al. |
| 6,612,164 B1 | 9/2003 | Meins |
| 6,612,165 B2 | 9/2003 | Juzswik et al. |
| 6,612,346 B1 | 9/2003 | Allen et al. |
| 6,614,343 B1 | 9/2003 | Fennel et al. |
| 6,615,651 B1 | 9/2003 | Barbanti |
| 6,619,110 B1 | 9/2003 | Delaporte |
| 6,622,552 B1 | 9/2003 | Delaporte |
| 6,622,553 B2 | 9/2003 | Hayashi et al. |
| 6,624,748 B1 | 9/2003 | Phelan et al. |
| 6,626,035 B1 | 9/2003 | Dent et al. |
| 6,629,454 B2 | 10/2003 | Lundqvist |
| 6,630,885 B2 | 10/2003 | Hardman et al. |
| 6,630,910 B2 | 10/2003 | Forster et al. |

| | | | | | | |
|---|---|---|---|---|---|---|
| 6,631,637 B2 | 10/2003 | Losey | | 2002/0073911 A1 | 6/2002 | Lapohn |
| 6,633,229 B1 | 10/2003 | Normann et al. | | 2002/0075144 A1 | 6/2002 | DeZorzi |
| 6,637,276 B2 | 10/2003 | Adderton et al. | | 2002/0075146 A1 | 6/2002 | Saheki |
| 6,644,108 B2 | 11/2003 | Inoue | | 2002/0078740 A1 | 6/2002 | Imao et al. |
| 6,647,771 B2 | 11/2003 | Burns | | 2002/0078741 A1 | 6/2002 | Cantu et al. |
| 6,647,772 B2 | 11/2003 | Ito et al. | | 2002/0080045 A1 | 6/2002 | Lonsdale et al. |
| 6,647,773 B2 | 11/2003 | Nantz et al. | | 2002/0084896 A1 | 7/2002 | Dixit et al. |
| 6,650,230 B1 | 11/2003 | Evans et al. | | 2002/0088517 A1 | 7/2002 | Shimura |
| 6,650,236 B2 | 11/2003 | Ghabra et al. | | 2002/0089417 A1 | 7/2002 | Watanabe et al. |
| 6,653,936 B2 | 11/2003 | Bohm et al. | | 2002/0092345 A1 | 7/2002 | Van Niekerk et al. |
| 6,655,203 B2 | 12/2003 | Hsu | | 2002/0092346 A1 | 7/2002 | Niekerk et al. |
| 6,657,540 B2 | 12/2003 | Knapp | | 2002/0092347 A1 | 7/2002 | Niekerk et al. |
| 6,658,927 B1 | 12/2003 | Goslar et al. | | 2002/0093421 A1 | 7/2002 | Bohm et al. |
| 6,658,928 B1 | 12/2003 | Pollack et al. | | 2002/0093422 A1 | 7/2002 | Shimura |
| 6,662,091 B2 | 12/2003 | Wilson et al. | | 2002/0095980 A1 | 7/2002 | Breed et al. |
| 6,662,642 B2 | 12/2003 | Breed et al. | | 2002/0097147 A1 | 7/2002 | Yamagiwa et al. |
| 6,662,665 B1 | 12/2003 | Huang | | 2002/0097148 A1 | 7/2002 | Yamagiwa et al. |
| 6,664,890 B2 | 12/2003 | Yamagiwa et al. | | 2002/0101340 A1 | 8/2002 | Starkey |
| 6,666,078 B1 | 12/2003 | Claussen et al. | | 2002/0101341 A1 | 8/2002 | Yamagiwa et al. |
| 6,666,079 B2 | 12/2003 | Poulbot et al. | | 2002/0101342 A1 | 8/2002 | Yamagiwa et al. |
| 6,666,080 B2 | 12/2003 | Buist et al. | | 2002/0105419 A1 | 8/2002 | Sugisawa |
| 6,667,687 B1 | 12/2003 | DeZorzi | | 2002/0105420 A1 | 8/2002 | Yamagiwa et al. |
| 6,668,238 B2 | 12/2003 | Taruya et al. | | 2002/0105421 A1 | 8/2002 | Lin |
| 6,668,636 B2 | 12/2003 | Nantz et al. | | 2002/0112537 A1 | 8/2002 | Lemberger et al. |
| 6,668,637 B2 | 12/2003 | Ono et al. | | 2002/0113692 A1 | 8/2002 | Normann et al. |
| 6,668,666 B1 | 12/2003 | Chen et al. | | 2002/0113693 A1 | 8/2002 | Wu |
| 6,668,879 B1 | 12/2003 | Lee | | 2002/0116992 A1 | 8/2002 | Rickel |
| 6,668,884 B2 | 12/2003 | Koch et al. | | 2002/0121132 A1 | 9/2002 | Breed et al. |
| 6,670,886 B1 | 12/2003 | Lin | | 2002/0124637 A1 | 9/2002 | Saheki et al. |
| 6,671,609 B2 | 12/2003 | Nantz et al. | | 2002/0126006 A1 | 9/2002 | Yamagiwa et al. |
| 6,672,150 B2 | 1/2004 | Delaporte et al. | | 2002/0130771 A1 | 9/2002 | Osborne et al. |
| 6,672,151 B1 | 1/2004 | Schultz et al. | | 2002/0134150 A1 | 9/2002 | Shih |
| 6,681,164 B2 | 1/2004 | Bergerhoff et al. | | 2002/0139288 A1 | 10/2002 | Evans et al. |
| 6,683,537 B2 | 1/2004 | Starkey et al. | | 2002/0140546 A1 | 10/2002 | Tuttle |
| 6,684,691 B1 | 2/2004 | Rosseau | | 2002/0140574 A1 | 10/2002 | Starkey et al. |
| 6,688,353 B1 | 2/2004 | Koch | | 2002/0143668 A1 | 10/2002 | Goodwin, III |
| 6,690,271 B2 | 2/2004 | Fischer et al. | | 2002/0148286 A1 | 10/2002 | Losey |
| 6,691,059 B1 | 2/2004 | Griesser | | 2002/0149468 A1 | 10/2002 | Carrender et al. |
| 6,691,567 B2 | 2/2004 | Walker et al. | | 2002/0149477 A1 | 10/2002 | Desai et al. |
| 6,693,522 B2 | 2/2004 | Tang et al. | | 2002/0149480 A1 | 10/2002 | Shanks et al. |
| 6,693,581 B2 | 2/2004 | Gottwald et al. | | 2002/0149481 A1 | 10/2002 | Shanks et al. |
| 6,694,807 B2 | 2/2004 | Chuang et al. | | 2002/0149482 A1 | 10/2002 | Shanks et al. |
| 6,696,934 B2 | 2/2004 | Sugisawa | | 2002/0149483 A1 | 10/2002 | Shanks et al. |
| 6,696,935 B2 | 2/2004 | Bonardi et al. | | 2002/0157461 A1 | 10/2002 | Schmidt et al. |
| 6,696,936 B2 | 2/2004 | Yamagiwa et al. | | 2002/0157462 A1 | 10/2002 | Knox et al. |
| 6,721,289 B1 * | 4/2004 | O'Toole et al. ............... 370/311 | | 2002/0166373 A1 | 11/2002 | Mancosu et al. |
| 7,457,259 B2 | 11/2008 | Chang et al. | | 2002/0167400 A1 | 11/2002 | Tsujita et al. |
| 7,483,676 B2 | 1/2009 | Mizukami et al. | | 2002/0171537 A1 | 11/2002 | Ghabra et al. |
| 7,696,867 B2 * | 4/2010 | Aiki et al. ................. 340/539.1 | | 2002/0174925 A1 | 11/2002 | Wilson et al. |
| 7,739,529 B2 * | 6/2010 | Hardman et al. ............ 713/320 | | 2002/0177971 A1 | 11/2002 | Taruya et al. |
| 2001/0000430 A1 | 4/2001 | Smith et al. | | 2002/0190852 A1 | 12/2002 | Lin |
| 2001/0001553 A1 | 5/2001 | Hahn et al. | | 2002/0190853 A1 | 12/2002 | Nigon et al. |
| 2001/0003437 A1 | 6/2001 | Oshiro et al. | | 2002/0194904 A1 | 12/2002 | Kawasaki et al. |
| 2001/0004236 A1 | 6/2001 | Letkomiller et al. | | 2002/0196137 A1 | 12/2002 | Poirier et al. |
| 2001/0008083 A1 | 7/2001 | Brown | | 2003/0000296 A1 | 1/2003 | Schmitt |
| 2001/0054959 A1 | 12/2001 | VanHorn et al. | | 2003/0000615 A1 | 1/2003 | Volpi |
| 2002/0002862 A1 | 1/2002 | Bunya et al. | | 2003/0001733 A1 | 1/2003 | Huang |
| 2002/0003474 A1 | 1/2002 | McClelland et al. | | 2003/0001735 A1 | 1/2003 | Honeck et al. |
| 2002/0005065 A1 | 1/2002 | Yamagiwa et al. | | 2003/0004615 A1 | 1/2003 | Hagelin |
| 2002/0011929 A1 | 1/2002 | Sugisawa | | 2003/0004624 A1 | 1/2003 | Wilson et al. |
| 2002/0014115 A1 | 2/2002 | Young et al. | | 2003/0006890 A1 | 1/2003 | Magiawala et al. |
| 2002/0021212 A1 | 2/2002 | Arita et al. | | 2003/0006893 A1 | 1/2003 | Dunbridge et al. |
| 2002/0024432 A1 | 2/2002 | Lin et al. | | 2003/0006894 A1 | 1/2003 | Konchin et al. |
| 2002/0029627 A1 | 3/2002 | Delaporte et al. | | 2003/0006895 A1 | 1/2003 | Drake et al. |
| 2002/0030592 A1 | 3/2002 | Hakanen et al. | | 2003/0010107 A1 | 1/2003 | Giustino et al. |
| 2002/0038570 A1 | 4/2002 | Burns | | 2003/0010108 A1 | 1/2003 | Goslar et al. |
| 2002/0039066 A1 | 4/2002 | Fuller et al. | | 2003/0011472 A1 | 1/2003 | Itou et al. |
| 2002/0044050 A1 | 4/2002 | Derbyshire et al. | | 2003/0015030 A1 | 1/2003 | Gabelmann |
| 2002/0044051 A1 | 4/2002 | Sugisawa | | 2003/0016126 A1 | 1/2003 | Katou |
| 2002/0046599 A1 | 4/2002 | Chuang et al. | | 2003/0020604 A1 | 1/2003 | Fischer et al. |
| 2002/0046793 A1 | 4/2002 | Eromaki | | 2003/0020605 A1 | 1/2003 | Starkey |
| 2002/0047779 A1 | 4/2002 | Arita | | 2003/0024463 A1 | 2/2003 | Evans et al. |
| 2002/0050164 A1 | 5/2002 | Wallach | | 2003/0030553 A1 | 2/2003 | Schofield et al. |
| 2002/0053971 A1 | 5/2002 | Kitano | | 2003/0034884 A1 | 2/2003 | Oshiro |
| 2002/0057196 A1 | 5/2002 | Sugisawa | | 2003/0036832 A1 | 2/2003 | Kokes et al. |
| 2002/0059825 A1 | 5/2002 | Lundqvist | | 2003/0038716 A1 | 2/2003 | Piesinger |
| 2002/0059826 A1 | 5/2002 | Ono et al. | | 2003/0046992 A1 | 3/2003 | Caretta |
| 2002/0060626 A1 | 5/2002 | Yamagiwa et al. | | 2003/0046993 A1 | 3/2003 | Fujii |
| 2002/0073771 A1 | 6/2002 | Katou | | 2003/0046994 A1 | 3/2003 | Luce |

| | | |
|---|---|---|
| 2003/0047264 A1 | 3/2003 | Yurjevich et al. |
| 2003/0048178 A1 | 3/2003 | Bonardi et al. |
| 2003/0048179 A1 | 3/2003 | Griesser et al. |
| 2003/0052774 A1 | 3/2003 | Latarnik et al. |
| 2003/0058089 A1 | 3/2003 | Ruehr et al. |
| 2003/0058090 A1 | 3/2003 | Schofield et al. |
| 2003/0058118 A1 | 3/2003 | Wilson |
| 2003/0061873 A1 | 4/2003 | Lin |
| 2003/0062994 A1 | 4/2003 | Morand et al. |
| 2003/0062995 A1 | 4/2003 | Fonzes et al. |
| 2003/0065455 A1 | 4/2003 | Nakao |
| 2003/0066343 A1 | 4/2003 | Fischer et al. |
| 2003/0070477 A1 | 4/2003 | Fischer et al. |
| 2003/0070478 A1 | 4/2003 | Fischer et al. |
| 2003/0071723 A1 | 4/2003 | Tang et al. |
| 2003/0074961 A1 | 4/2003 | Fischer et al. |
| 2003/0076222 A1 | 4/2003 | Fischer et al. |
| 2003/0076223 A1 | 4/2003 | Tominaga et al. |
| 2003/0076234 A1 | 4/2003 | Bergerhoff et al. |
| 2003/0079534 A1 | 5/2003 | Hsu |
| 2003/0079535 A1 | 5/2003 | Hsu |
| 2003/0079536 A1 | 5/2003 | Fischer et al. |
| 2003/0079537 A1 | 5/2003 | Luce |
| 2003/0079538 A1 | 5/2003 | Hsu |
| 2003/0079539 A1 | 5/2003 | Hsu |
| 2003/0080861 A1 | 5/2003 | Okubo |
| 2003/0080862 A1 | 5/2003 | Kranz |
| 2003/0080863 A1 | 5/2003 | Oshiro et al. |
| 2003/0090372 A1 | 5/2003 | Bergerhoff et al. |
| 2003/0093197 A1 | 5/2003 | Bergerhoff et al. |
| 2003/0093198 A1 | 5/2003 | Bergerhoff et al. |
| 2003/0095050 A1 | 5/2003 | Mancosu et al. |
| 2003/0098787 A1 | 5/2003 | Lin |
| 2003/0102966 A1 | 6/2003 | Konchin et al. |
| 2003/0107481 A1 | 6/2003 | Sawafuji |
| 2003/0107483 A1 | 6/2003 | Kano |
| 2003/0110850 A1 | 6/2003 | Saheki |
| 2003/0110851 A1 | 6/2003 | Tsujita |
| 2003/0112135 A1 | 6/2003 | Yamagiwa et al. |
| 2003/0112136 A1 | 6/2003 | Reidhead |
| 2003/0112137 A1 | 6/2003 | Saheki |
| 2003/0112138 A1 | 6/2003 | Marguet et al. |
| 2003/0114965 A1 | 6/2003 | Fiechter et al. |
| 2003/0115945 A1 | 6/2003 | Tsujita |
| 2003/0117275 A1 | 6/2003 | Watkins |
| 2003/0117276 A1 | 6/2003 | Marguet et al. |
| 2003/0117277 A1 | 6/2003 | Marguet et al. |
| 2003/0121317 A1 | 7/2003 | Luce |
| 2003/0121318 A1 | 7/2003 | Bell et al. |
| 2003/0121319 A1 | 7/2003 | Kojima et al. |
| 2003/0121320 A1 | 7/2003 | Okubo |
| 2003/0122660 A1 | 7/2003 | Kachouh et al. |
| 2003/0122661 A1 | 7/2003 | Ginman et al. |
| 2003/0126918 A1 | 7/2003 | Chuang et al. |
| 2003/0126919 A1 | 7/2003 | Hsu |
| 2003/0126920 A1 | 7/2003 | Hayashi et al. |
| 2003/0128108 A1 | 7/2003 | Knapp |
| 2003/0128109 A1 | 7/2003 | Andou et al. |
| 2003/0128110 A1 | 7/2003 | Sugisawa |
| 2003/0130773 A1 | 7/2003 | Oshiro et al. |
| 2003/0140688 A1 | 7/2003 | Oshiro et al. |
| 2003/0141969 A1 | 7/2003 | Wang |
| 2003/0145645 A1 | 8/2003 | Porter et al. |
| 2003/0145650 A1 | 8/2003 | Juzswik et al. |
| 2003/0146830 A1 | 8/2003 | Tominaga et al. |
| 2003/0150261 A1 | 8/2003 | Koch et al. |
| 2003/0151503 A1 | 8/2003 | Altaber et al. |
| 2003/0154779 A1 | 8/2003 | Polenghi |
| 2003/0156021 A1 | 8/2003 | Tabata et al. |
| 2003/0156022 A1 | 8/2003 | Saheki et al. |
| 2003/0156023 A1 | 8/2003 | Kawasaki et al. |
| 2003/0156024 A1 | 8/2003 | Beckley |
| 2003/0156025 A1 | 8/2003 | Okubo |
| 2003/0164030 A1 | 9/2003 | Walker et al. |
| 2003/0164031 A1 | 9/2003 | Nantz et al. |
| 2003/0164032 A1 | 9/2003 | Nantz et al. |
| 2003/0164033 A1 | 9/2003 | Ghabra et al. |
| 2003/0164034 A1 | 9/2003 | Nantz et al. |
| 2003/0164035 A1 | 9/2003 | Nantz et al. |
| 2003/0164758 A1 | 9/2003 | King et al. |
| 2003/0164759 A1 | 9/2003 | Nantz et al. |
| 2003/0164760 A1 | 9/2003 | Nantz et al. |
| 2003/0172728 A1 | 9/2003 | Gustafsson et al. |
| 2003/0172729 A1 | 9/2003 | Benedict et al. |
| 2003/0179082 A1 | 9/2003 | Ide |
| 2003/0179085 A1 | 9/2003 | Ghabra et al. |
| 2003/0179086 A1 | 9/2003 | Nantz et al. |
| 2003/0182996 A1 | 10/2003 | Bankart et al. |
| 2003/0187555 A1 | 10/2003 | Lutz et al. |
| 2003/0187607 A1 | 10/2003 | Oshiro |
| 2003/0192371 A1 | 10/2003 | Cousineau |
| 2003/0192373 A1 | 10/2003 | Luce |
| 2003/0192374 A1 | 10/2003 | Luce |
| 2003/0192375 A1 | 10/2003 | Sugai et al. |
| 2003/0193391 A1 | 10/2003 | Arita |
| 2003/0193392 A1 | 10/2003 | Okubo et al. |
| 2003/0197603 A1 | 10/2003 | Stewart et al. |
| 2003/0197604 A1 | 10/2003 | Ogawa et al. |
| 2003/0201044 A1 | 10/2003 | Schick |
| 2003/0201879 A1 | 10/2003 | Munch et al. |
| 2003/0201880 A1 | 10/2003 | Lu |
| 2003/0201881 A1 | 10/2003 | Headley et al. |
| 2003/0201883 A1 | 10/2003 | Saheki et al. |
| 2003/0205081 A1 | 11/2003 | Proschka |
| 2003/0209065 A1 | 11/2003 | Fonteneau |
| 2003/0210136 A1 | 11/2003 | Oshiro et al. |
| 2003/0210137 A1 | 11/2003 | Ito |
| 2003/0214394 A1 | 11/2003 | Behrendsen |
| 2003/0214395 A1 | 11/2003 | Flowerday et al. |
| 2003/0217595 A1 | 11/2003 | Banzhof et al. |
| 2003/0217797 A1 | 11/2003 | Poulbot et al. |
| 2003/0221481 A1 | 12/2003 | Von Wendorff |
| 2003/0221766 A1 | 12/2003 | Strache et al. |
| 2003/0222770 A1 | 12/2003 | Lesesky et al. |
| 2003/0226400 A1 | 12/2003 | Rutherford |
| 2003/0227379 A1 | 12/2003 | Itou |
| 2003/0227380 A1 | 12/2003 | Piech et al. |
| 2003/0233209 A1 | 12/2003 | Yanase |
| 2003/0233872 A1 | 12/2003 | Boulot |
| 2003/0234041 A1 | 12/2003 | Boulot |
| 2003/0234066 A1 | 12/2003 | Grotendorst et al. |
| 2003/0234722 A1 | 12/2003 | Lonsdale et al. |
| 2003/0234723 A1 | 12/2003 | Lin |
| 2004/0004556 A1 | 1/2004 | Desai |
| 2004/0007302 A1 | 1/2004 | Hamilton et al. |
| 2004/0008107 A1 | 1/2004 | Boulot |
| 2004/0011445 A1 | 1/2004 | Harm |
| 2004/0012489 A1 | 1/2004 | Yamashita |
| 2004/0017289 A1 | 1/2004 | Brown, Jr. |
| 2004/0017290 A1 | 1/2004 | Boulot |
| 2004/0021557 A1 | 2/2004 | Yanase |
| 2004/0021558 A1 | 2/2004 | Kelly et al. |
| 2004/0021559 A1 | 2/2004 | O'Brien |
| 2004/0021560 A1 | 2/2004 | Sasaki et al. |
| 2004/0021561 A1 | 2/2004 | Sasaki et al. |
| 2004/0021562 A1 | 2/2004 | Prenninger |
| 2004/0025581 A1 | 2/2004 | Miller |
| 2004/0025582 A1 | 2/2004 | Wiseman, Jr. et al. |
| 2004/0027241 A1 | 2/2004 | Forster |
| 2004/0031316 A1 | 2/2004 | Lundqvist |
| 2004/0034454 A1 | 2/2004 | Ito et al. |
| 2004/0035196 A1 | 2/2004 | Claussen et al. |
| 2008/0165832 A1 | 7/2008 | Fukuda et al. |

FOREIGN PATENT DOCUMENTS

| | | |
|---|---|---|
| CA | 2311162 | 12/2000 |
| CA | 2278252 | 1/2001 |
| CA | 2356617 | 4/2002 |
| DE | 4242861 A1 | 6/1994 |
| DE | 19605795 A1 | 8/1997 |
| EP | 0045401 B1 | 7/1981 |
| EP | 0607638 | 7/1994 |
| EP | 0639472 A1 | 2/1995 |
| EP | 0689950 A2 | 1/1996 |
| EP | 0906839 A2 | 9/1998 |
| EP | 0908331 A2 | 4/1999 |
| EP | 0933236 A1 | 8/1999 |
| EP | 0933237 A2 | 8/1999 |

| | | | |
|---|---|---|---|
| EP | 0936089 A2 | 8/1999 |
| EP | 0947359 A2 | 10/1999 |
| EP | 0982159 | 3/2000 |
| EP | 0985560 A2 | 3/2000 |
| EP | 0989001 | 3/2000 |
| EP | 0993969 A2 | 4/2000 |
| EP | 0995619 A1 | 4/2000 |
| EP | 1006009 A2 | 6/2000 |
| EP | 1006010 A2 | 6/2000 |
| EP | 1006167 A2 | 6/2000 |
| EP | 1026015 | 8/2000 |
| EP | 1026016 | 8/2000 |
| EP | 1031442 A2 | 8/2000 |
| EP | 1052119 A1 | 11/2000 |
| EP | 1055531 A1 | 11/2000 |
| EP | 1070580 | 1/2001 |
| EP | 1172237 A2 | 1/2002 |
| EP | 1203675 A2 | 5/2002 |
| EP | 1215057 A2 | 6/2002 |
| EP | 1344656 A2 | 9/2003 |
| EP | 1350640 A1 | 10/2003 |
| EP | 1187731 | 11/2003 |
| EP | 1361081 A2 | 11/2003 |
| FR | 2661373 A1 | 10/1991 |
| FR | 2812436 A1 | 2/2002 |
| JP | H08-181632 | 7/1996 |
| JP | 08-282166 | 10/1996 |
| JP | 09-035014 | 2/1997 |
| JP | 09-049777 | 2/1997 |
| JP | 9-200086 | 7/1997 |
| JP | 10-028107 | 1/1998 |
| JP | 11-234163 | 8/1999 |
| JP | H11-334328 | 12/1999 |
| JP | 2001-354018 | 12/2001 |
| JP | 2002-046431 | 2/2002 |
| JP | 2002-362121 | 12/2002 |
| JP | 2003-002019 | 1/2003 |
| JP | 2003-014572 | 1/2003 |
| JP | 2003-094918 | 4/2003 |
| JP | 2003-094920 | 4/2003 |
| JP | 2003-094922 | 4/2003 |
| JP | 2003-094923 | 4/2003 |
| JP | 2003-166818 | 6/2003 |
| JP | 2003-200723 | 7/2003 |
| JP | 2003-205717 | 7/2003 |
| JP | 2003-220808 | 8/2003 |
| JP | 2003-220809 | 8/2003 |
| JP | 2003-220810 | 8/2003 |
| JP | 2004254204 | 9/2004 |
| WO | 94/06640 | 3/1994 |
| WO | 96/06747 | 3/1996 |
| WO | 9606747 | 3/1996 |
| WO | 9628311 | 9/1996 |
| WO | 97/18962 | 5/1997 |
| WO | 9718961 | 5/1997 |
| WO | 97/21557 | 6/1997 |
| WO | 97/42385 | 11/1997 |
| WO | 9834799 | 8/1998 |
| WO | 98/42524 | 10/1998 |
| WO | 98/49564 | 11/1998 |
| WO | 98/52008 | 11/1998 |
| WO | 98/52780 | 11/1998 |
| WO | 99/29522 | 6/1999 |
| WO | 99/29525 | 6/1999 |
| WO | 9929523 | 6/1999 |
| WO | 9929524 | 6/1999 |
| WO | 99/39928 | 8/1999 |
| WO | 99/41093 | 8/1999 |
| WO | 99/42308 | 8/1999 |
| WO | 9941093 | 8/1999 |
| WO | 99/53740 | 10/1999 |
| WO | 9952722 | 10/1999 |
| WO | 9952723 | 10/1999 |
| WO | 9952724 | 10/1999 |
| WO | 9953279 | 10/1999 |
| WO | 9953740 | 10/1999 |
| WO | 99/61264 | 12/1999 |
| WO | 9961265 | 12/1999 |
| WO | 00/01545 | 1/2000 |
| WO | 00/08598 | 2/2000 |
| WO | 0007834 | 2/2000 |
| WO | 00/21764 | 4/2000 |
| WO | 00/34061 | 6/2000 |
| WO | 0034062 | 6/2000 |
| WO | 0034063 | 6/2000 |
| WO | 0047429 | 8/2000 |
| WO | 0047430 | 8/2000 |
| WO | 0069663 | 11/2000 |
| WO | 01/12452 | 2/2001 |
| WO | 01/17806 | 3/2001 |
| WO | 01/19626 | 3/2001 |
| WO | 01/25034 | 4/2001 |
| WO | 0125033 | 4/2001 |
| WO | 01/36220 | 5/2001 |
| WO | 01/36221 | 5/2001 |
| WO | 02/07996 | 1/2002 |
| WO | 02/09957 | 2/2002 |
| WO | 02/34551 | 5/2002 |
| WO | 02/34552 | 5/2002 |
| WO | 02/34553 | 5/2002 |
| WO | 02/36368 | 5/2002 |
| WO | 02/38400 | 5/2002 |
| WO | 02/39137 | 5/2002 |
| WO | 02/068225 | 9/2002 |
| WO | 02/081238 | 10/2002 |
| WO | 03/005318 | 1/2003 |
| WO | 03/035414 | 5/2003 |
| WO | 03/038447 | 5/2003 |
| WO | 03/051652 | 6/2003 |
| WO | 03/070495 | 8/2003 |
| WO | 03/076216 | 9/2003 |
| WO | 03/086788 | 10/2003 |
| WO | 03/097385 | 11/2003 |
| WO | 03/105509 | 12/2003 |
| WO | 03/105511 | 12/2003 |

OTHER PUBLICATIONS

Karl Billen, European Search Report and European Search Opinion, European Patent Application No. 10173452.3-2425, Nov. 19, 2010, pp. 1-6, Munich, Germany.
Billen, Karl; European Search Report, Appl. No. 10173452.3-2425; Nov. 19, 2010; 6 pages; European Patent Office, Munich, Germany.
Billen, Karl, European Search Report, Appl. No. 10173427.5-2425, Feb. 1, 2011, 5 pages, European Patent Office, Munich, Germany.
Billen, Karl, European Search Report, Appl. No. 10173443.2-2425, Feb. 4, 2011, 5 pages, European Patent Office, Munich, Germany.

* cited by examiner

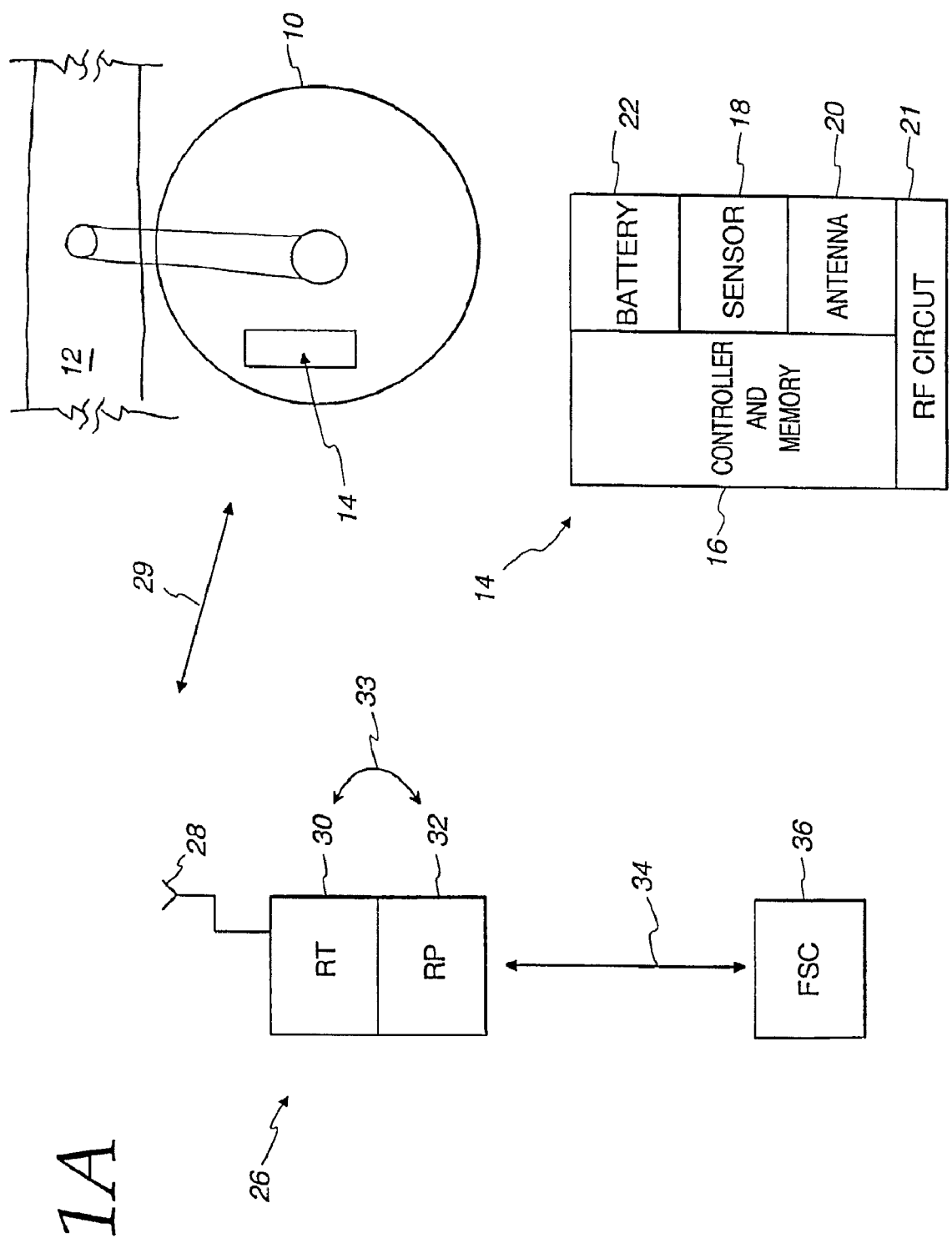

Fig 1B
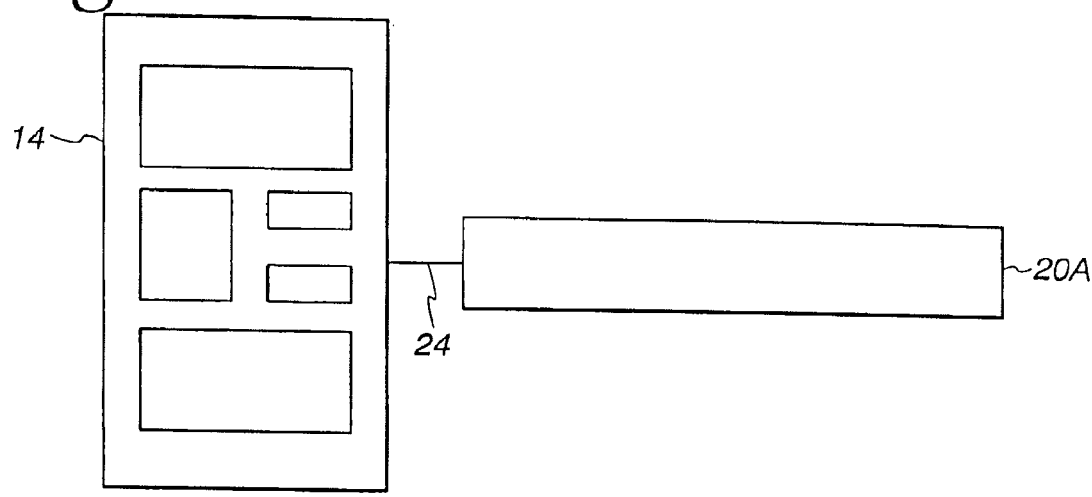
Fig 1C
Fig 1D
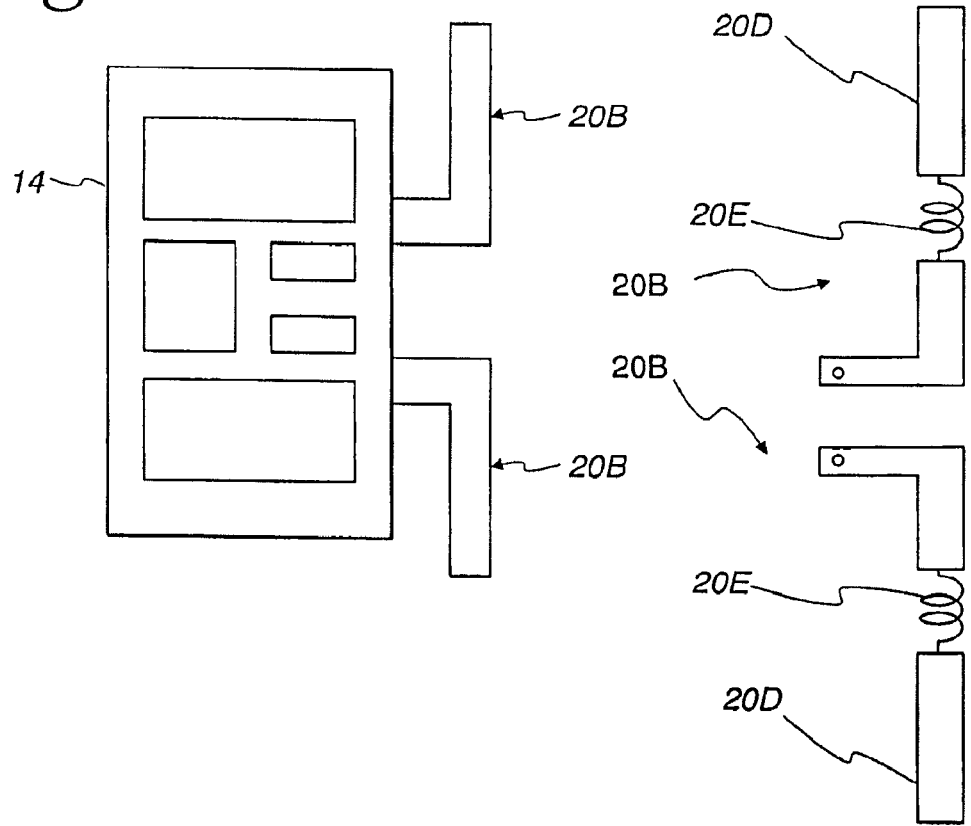

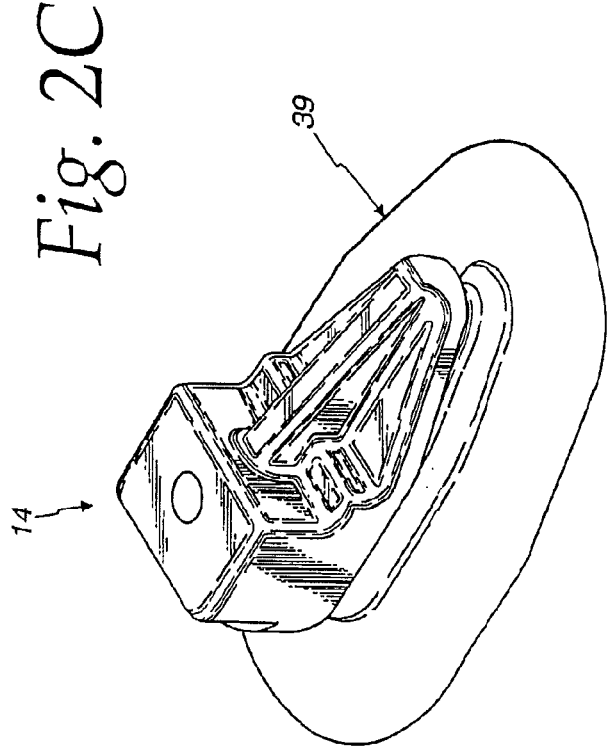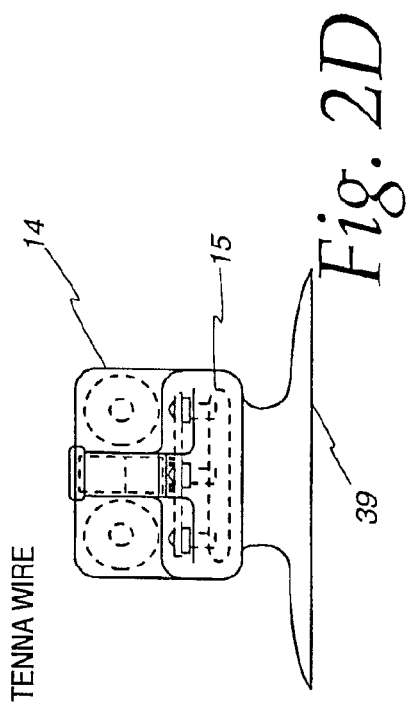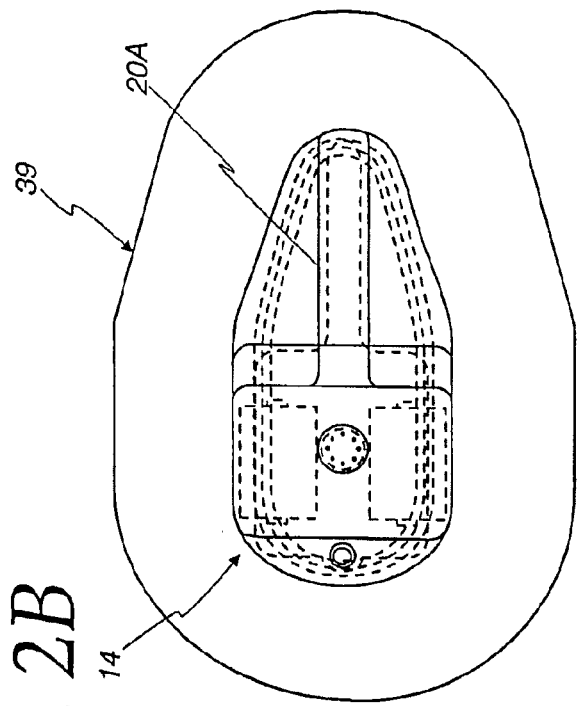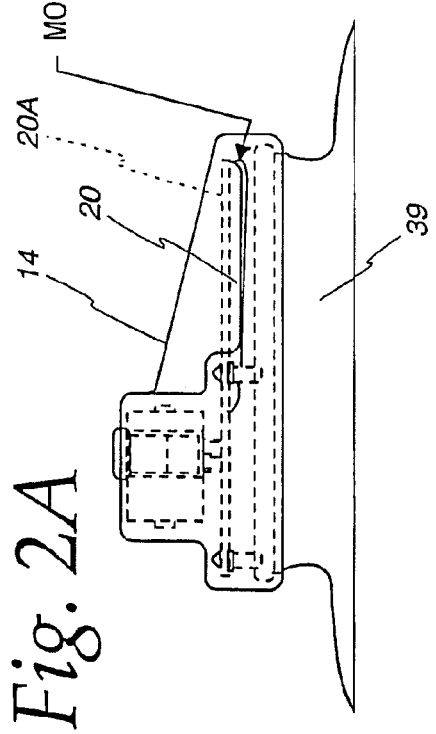

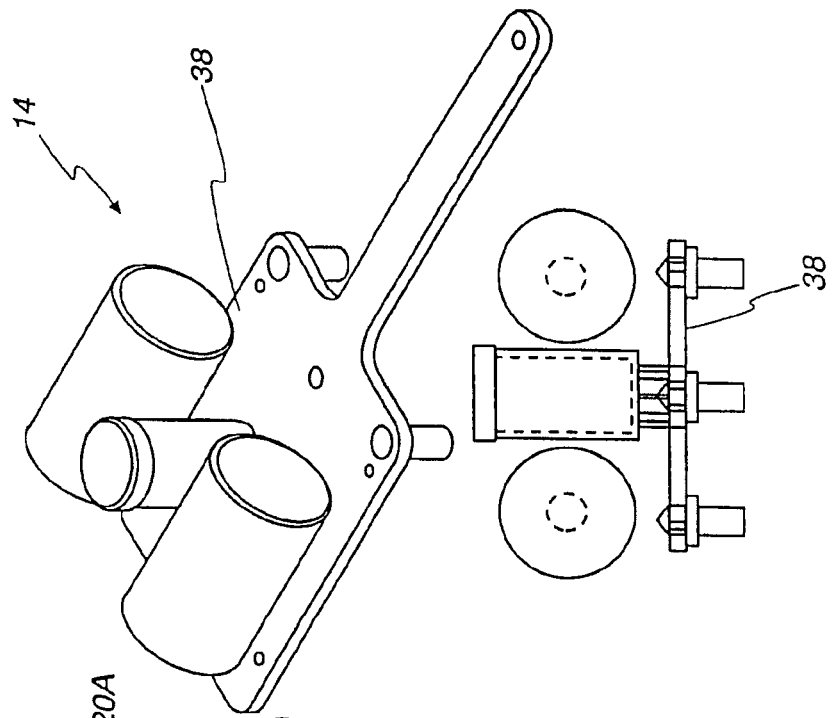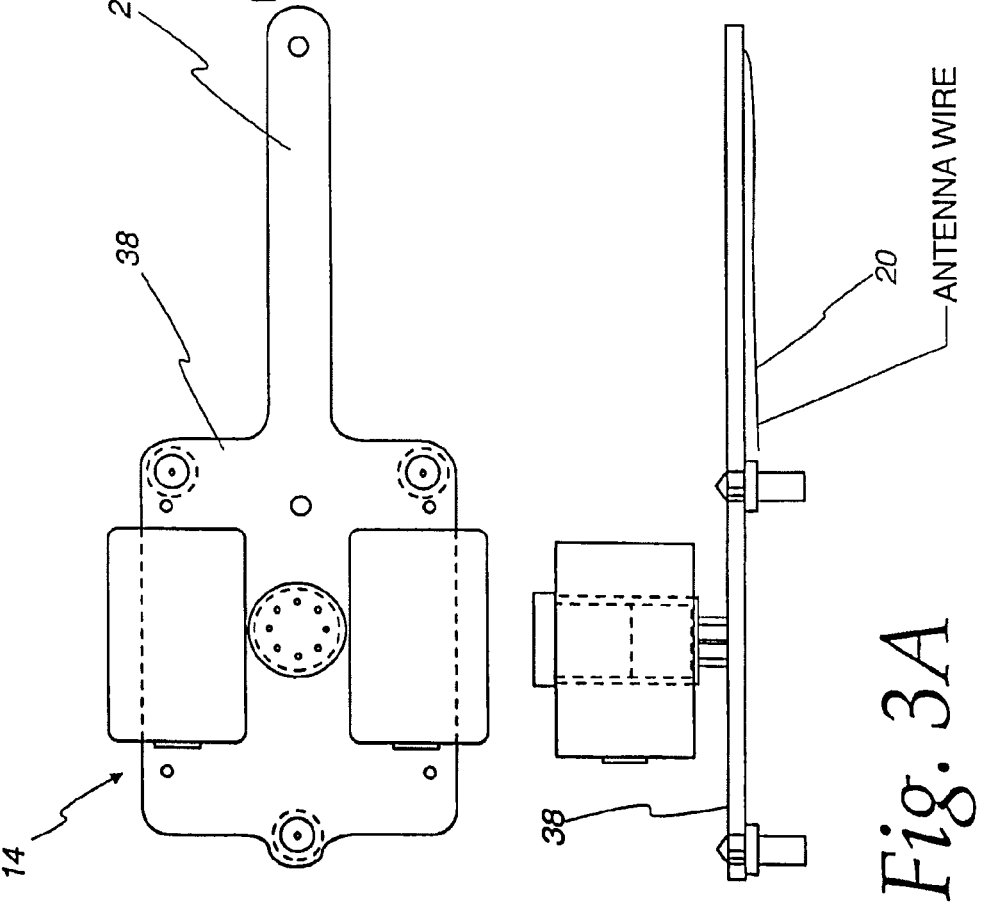

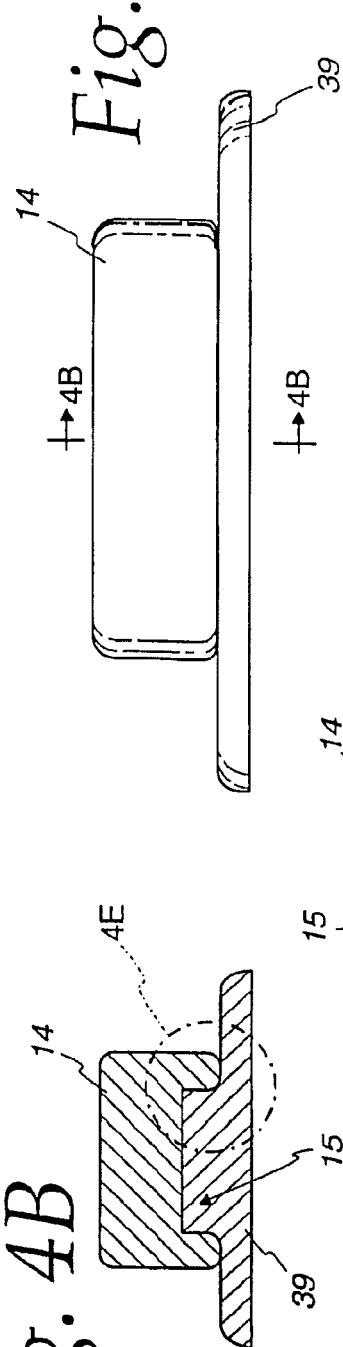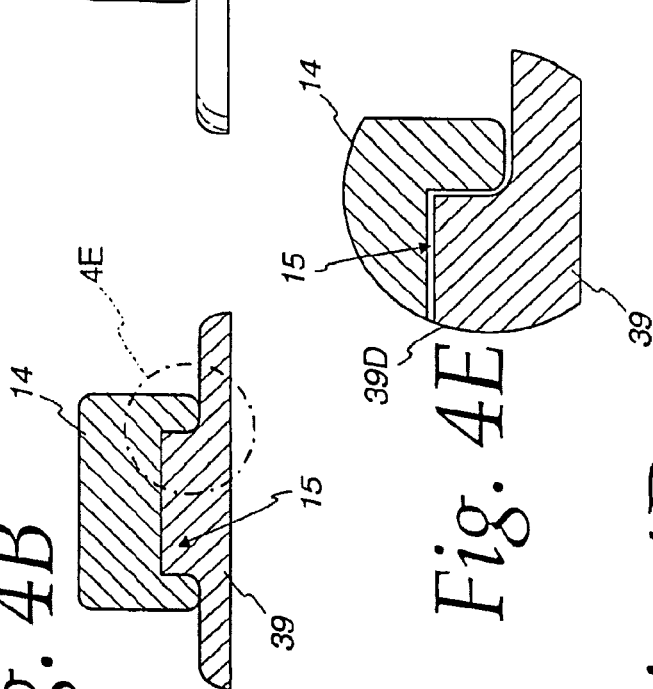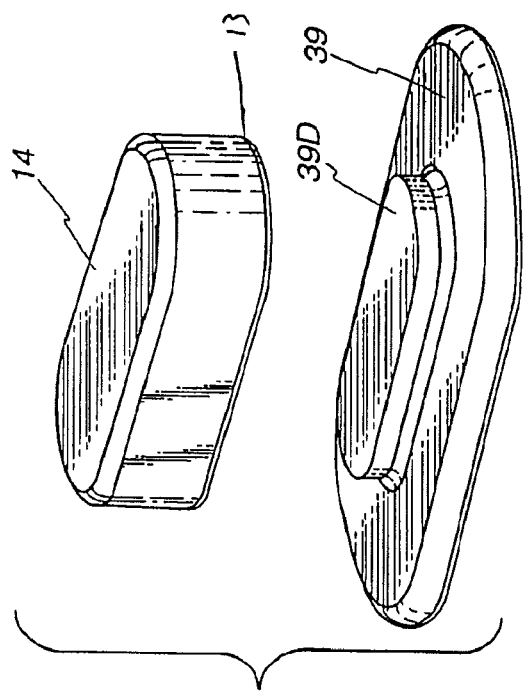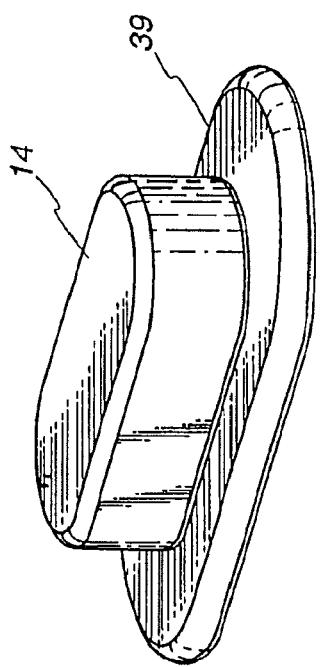

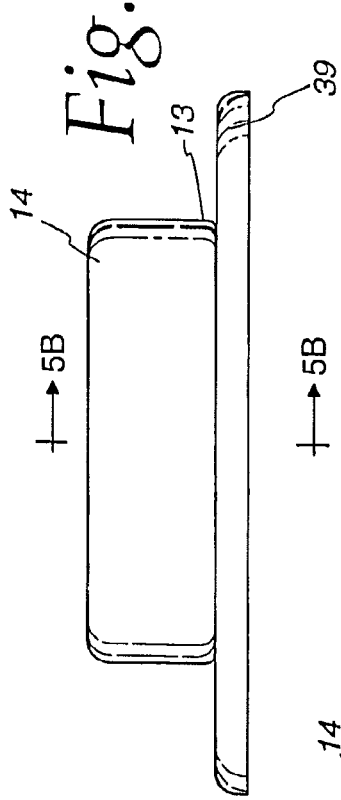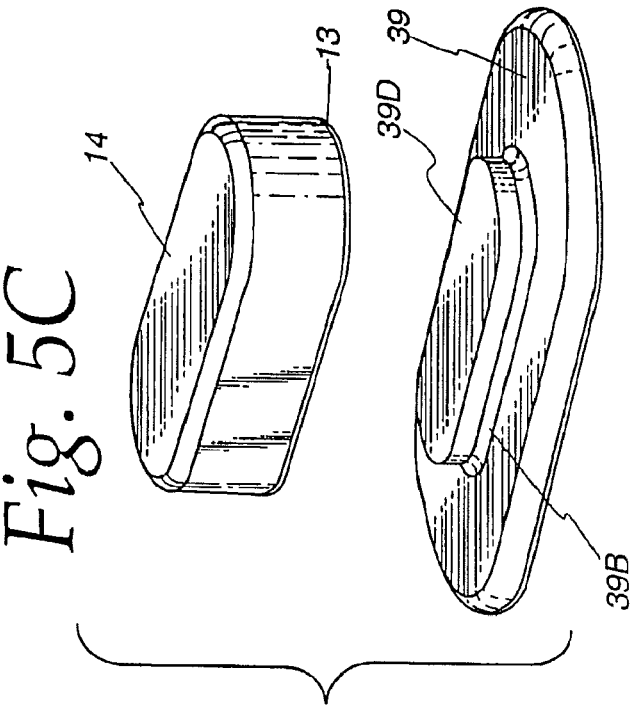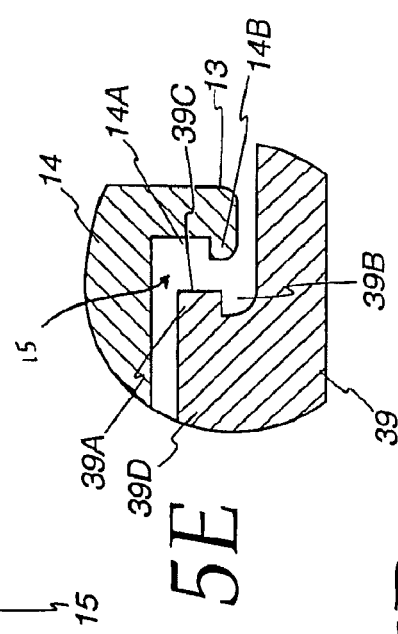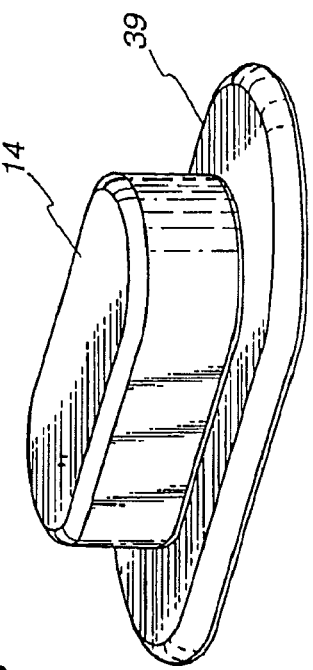

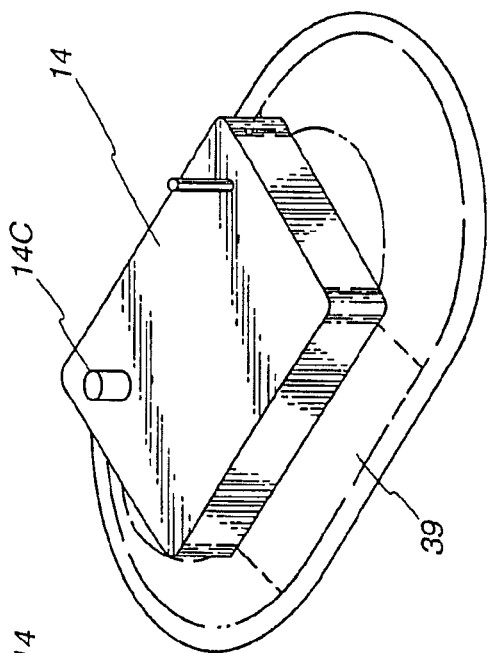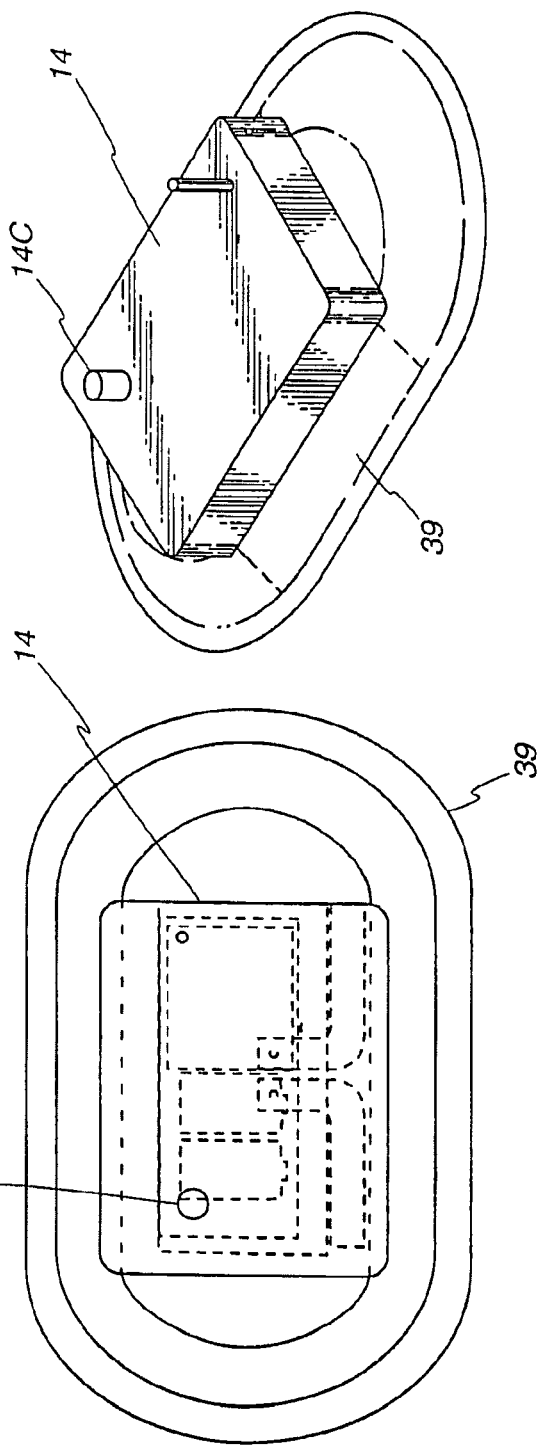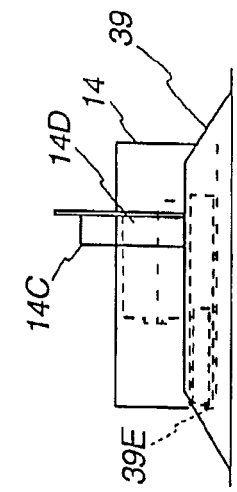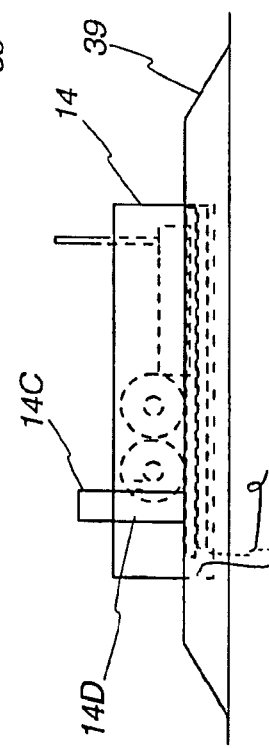

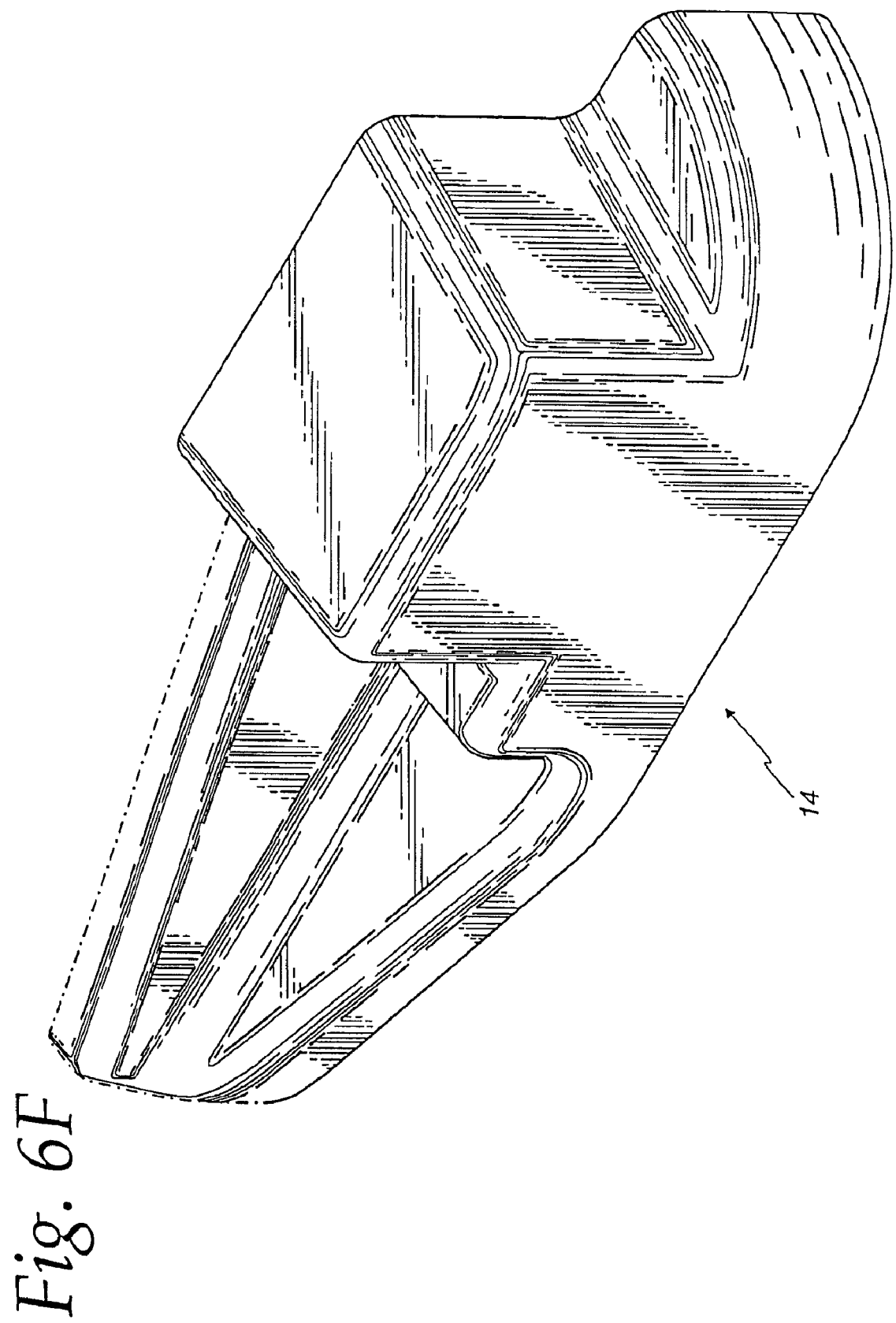

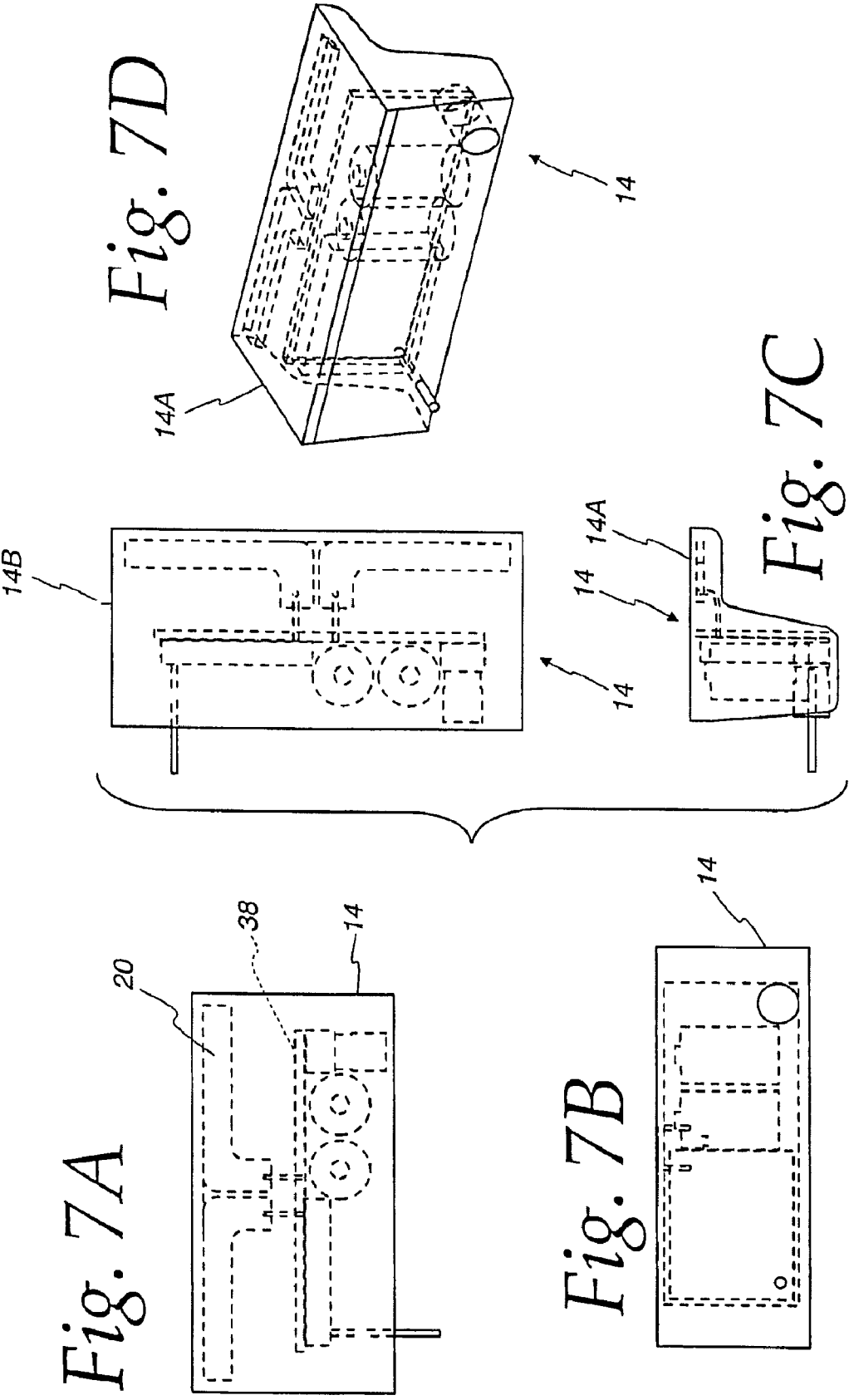

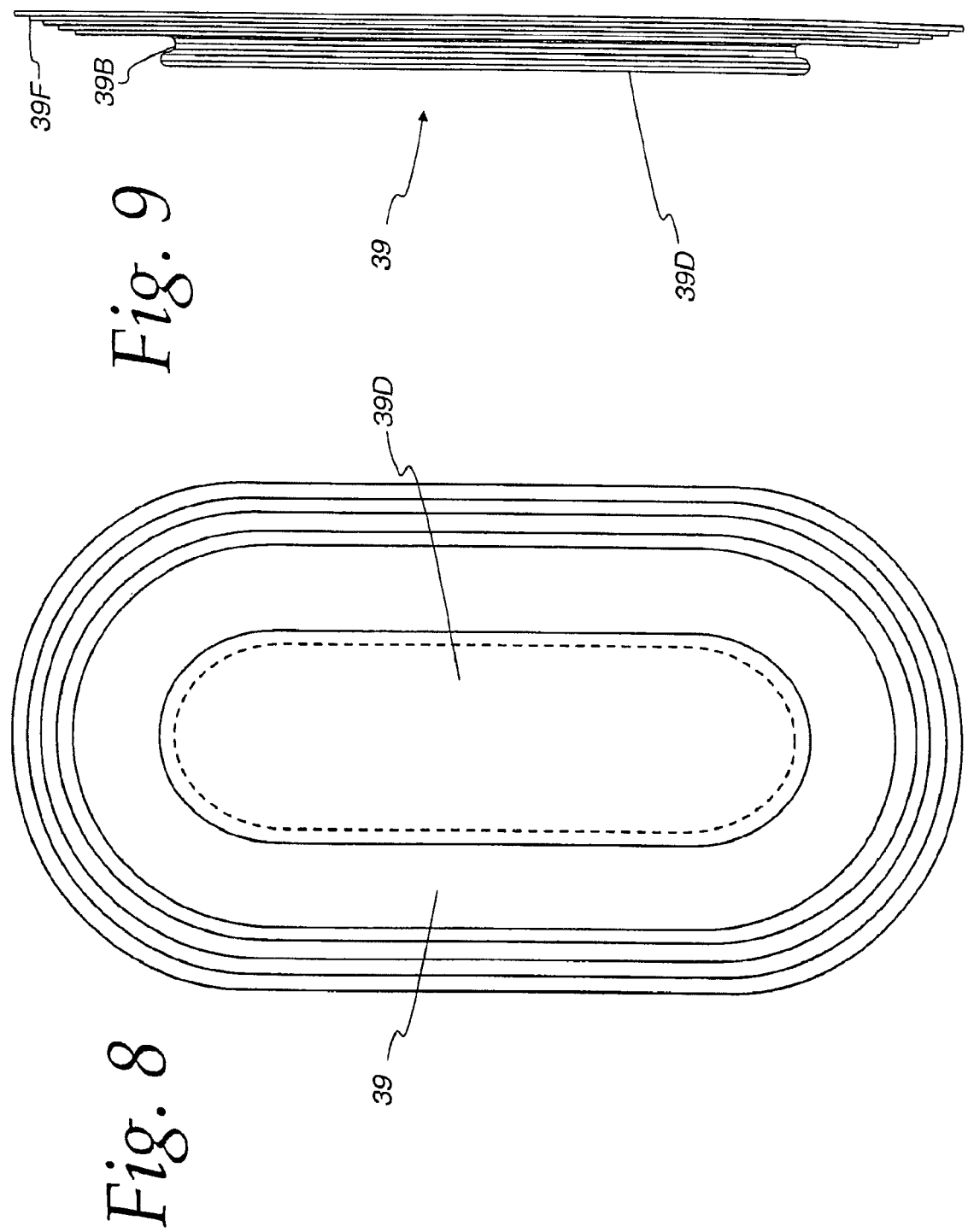

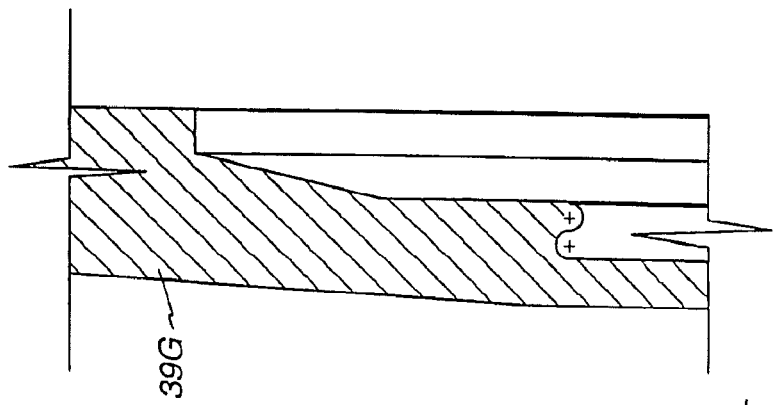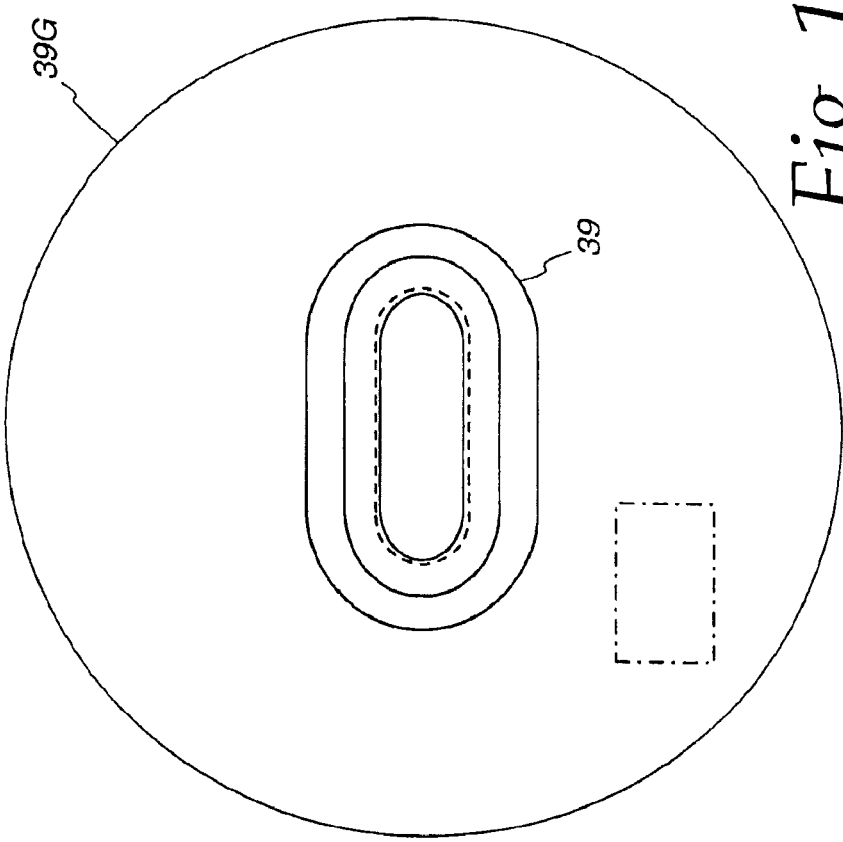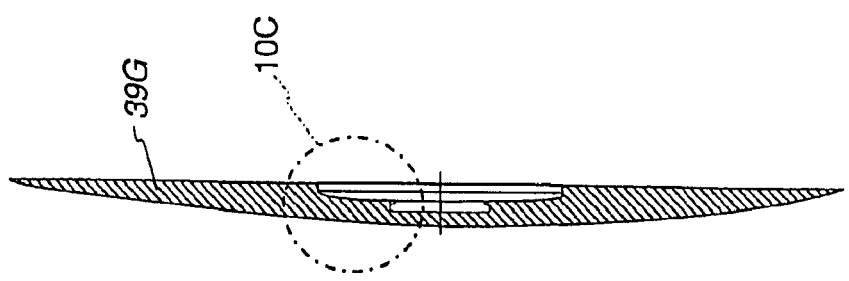

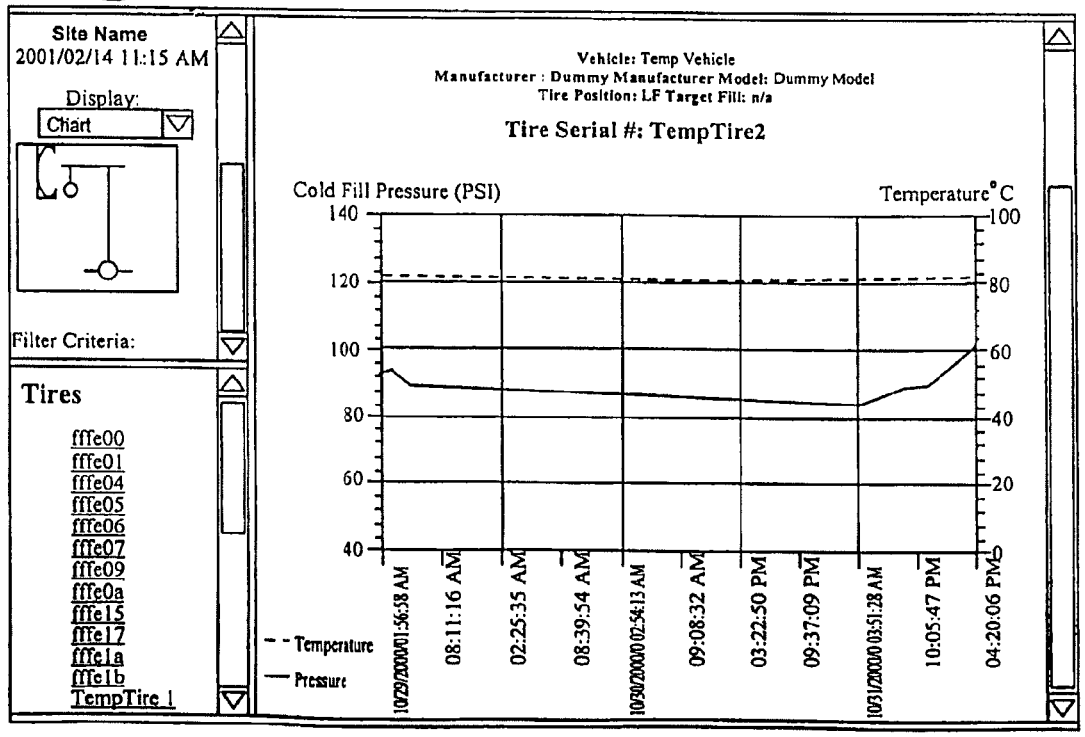

Fig. 31

Edit Vehicle

Current Site: Boulder

Actions
Save
Cancel

Vehicle: _____

Mfg Name and Model
UNKNOWN MODEL UNKNOWN ▽

Available Tires          Tires Assigned to Vehicle
                         -S9N001045
                         -S9N000442
                    >>   -S9N000443
                    <<   -S9N000444
                         -S8L001345

General Info:

VIN: _____
Description: -1
Service Start DTS: -1
Curr Obs DTS: -1
Inception DTS: -1

Fig. 32

Log Off    Users    Fleet    Vehicles    Tires    Tags    Site    Help

Edit Tire

Current Site: Boulder

Actions
Save
Cancel

Tire Serial Number:        S9N001045
Tire Brand:                _____
Tire Target Fill Pressure: _____
Tire Position:0            RF ▽
Hours On Vehicle:          _____
Hours Total:               _____

Tire Mfg Name and Model
Available Tags           Tags Assigned to Tire
                         16775702
                    >>
                    <<

General Info:

PROTOCOL OVERVIEW

MANCHESTER ENCODING

TIMING DIAGRAM WITH PREAMBLE & CRC

TIMING DIAGRAM WITH PREAMBLE, CRC, POSTAMBLE

TAG RECEIVER WAKEUP

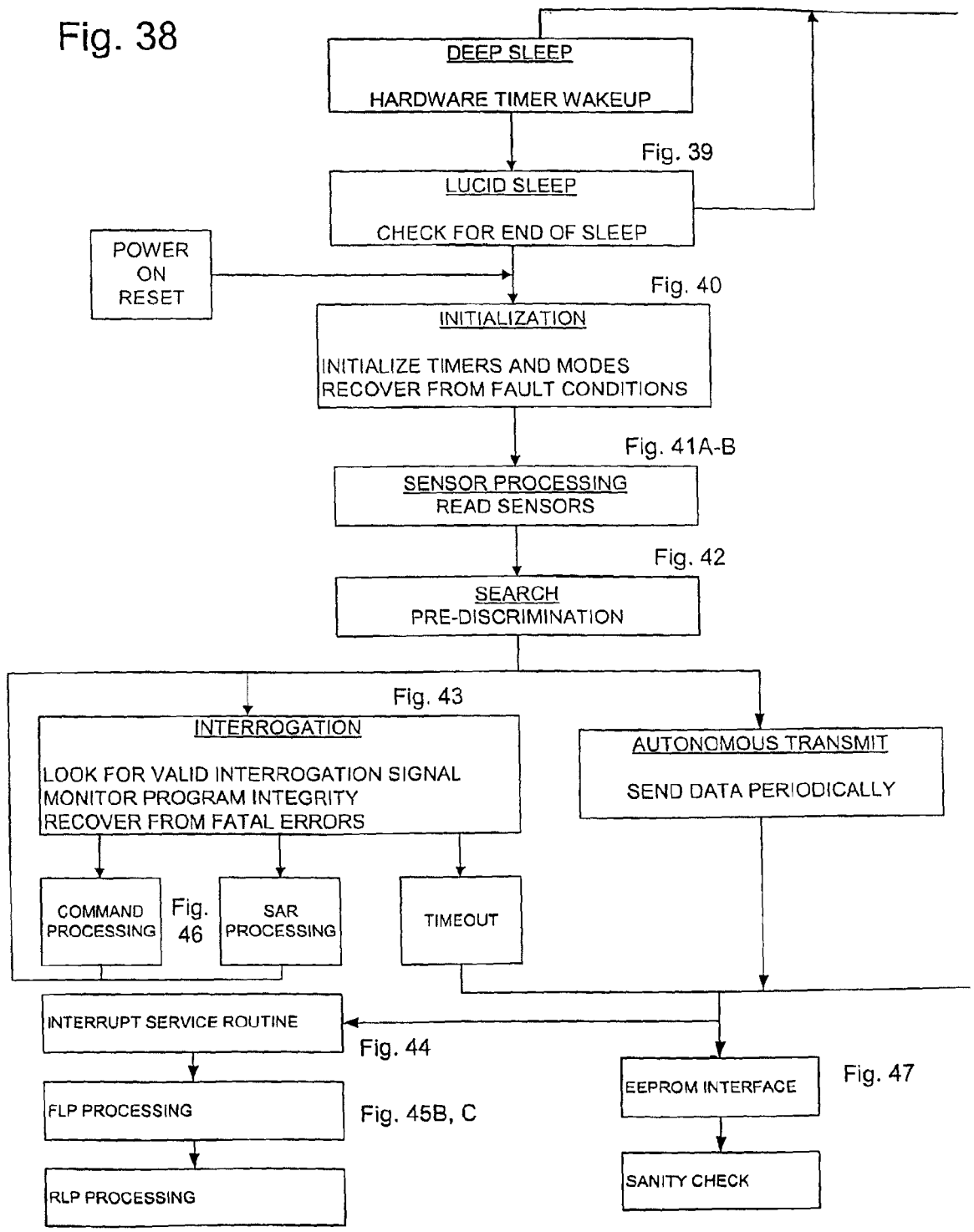

INITIALIZATION

SENSOR PROCESSING

SEARCH

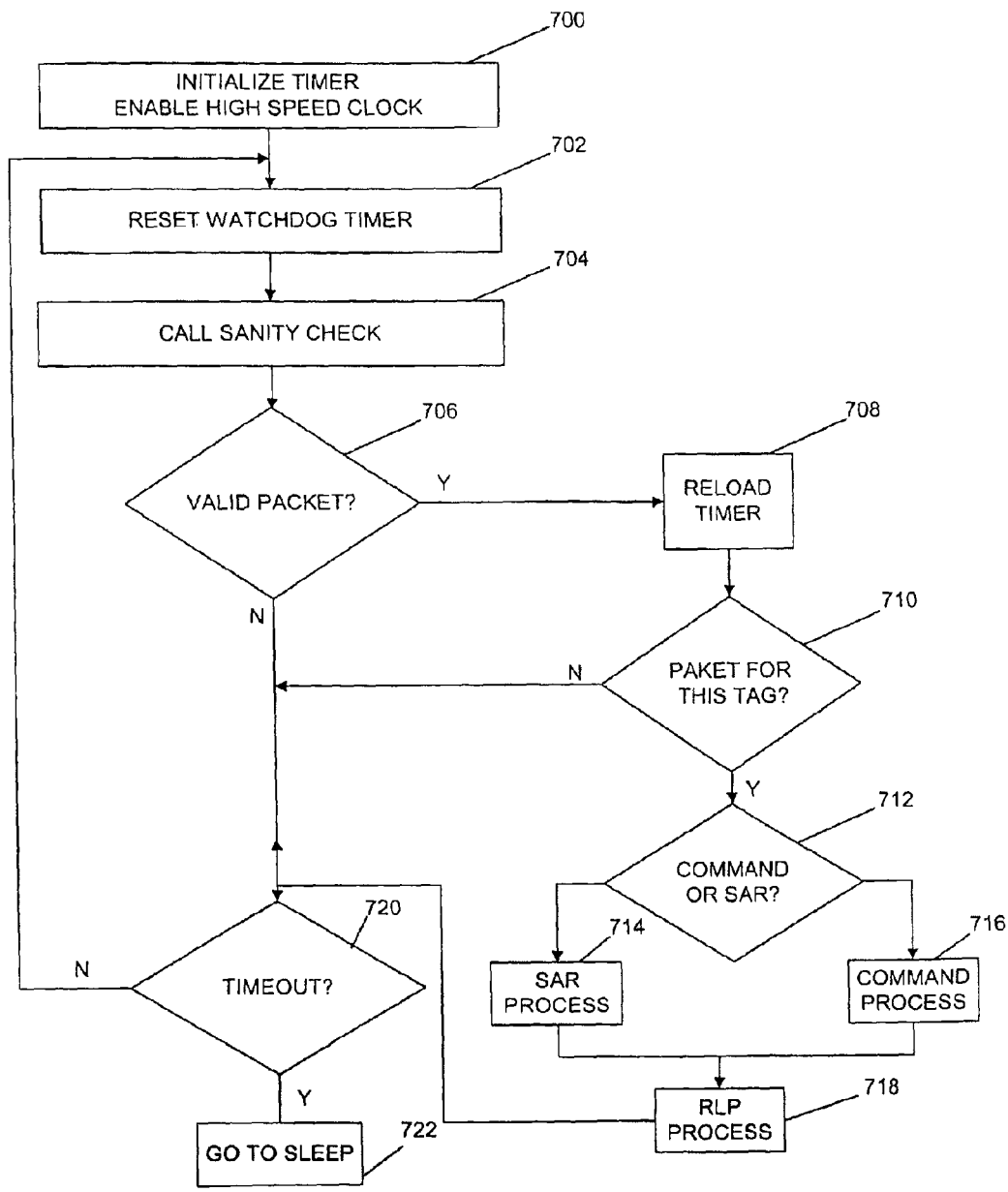

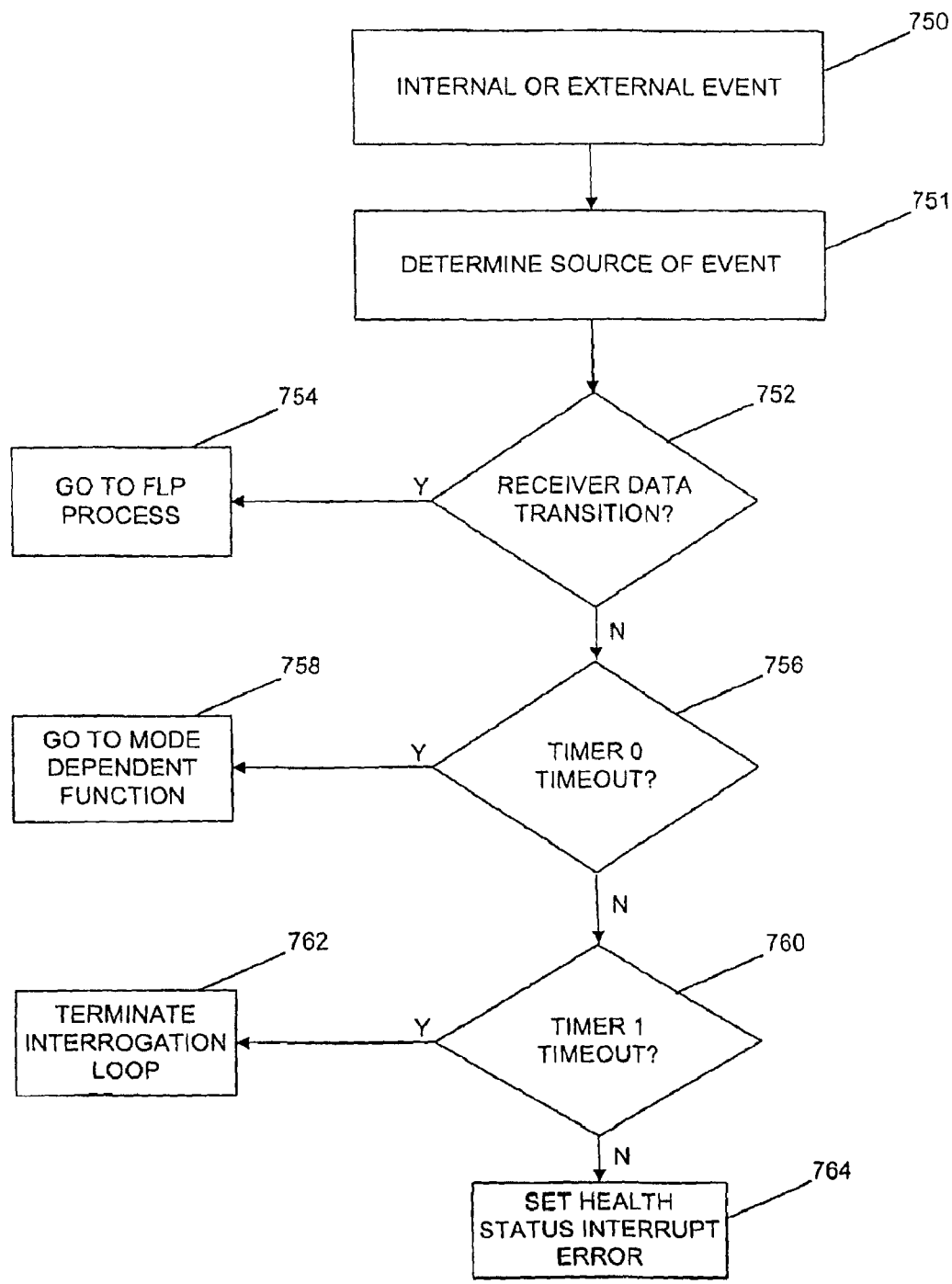

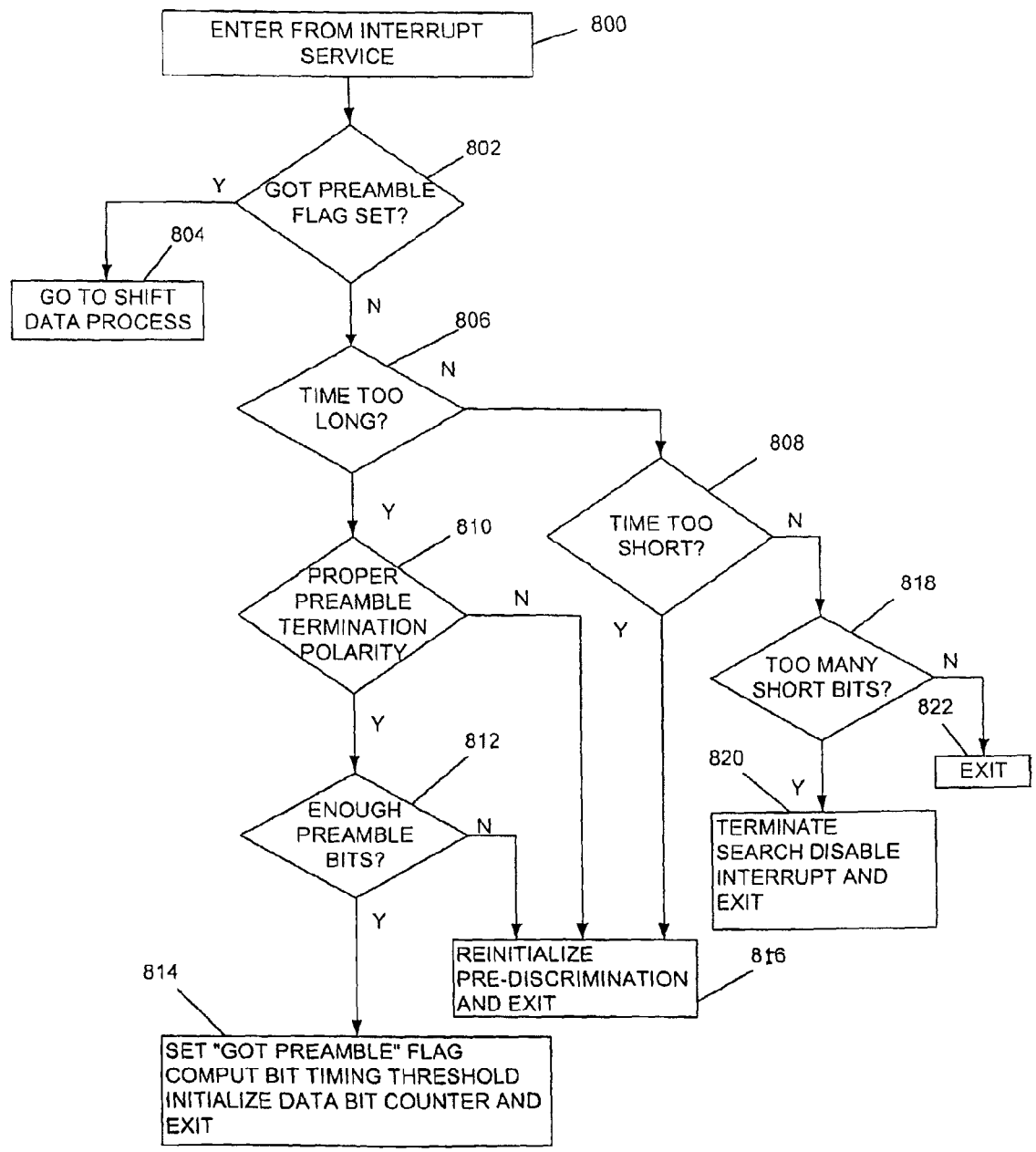

COMMAND ROUTINE

SYSTEM FOR CONSERVING BATTERY LIFE IN A BATTERY OPERATED DEVICE

CROSS-REFERENCE TO RELATED APPLICATIONS

This is division of U.S. application Ser. No. 11/605,825, filed Nov. 29, 2006 now U.S. Pat. No. 7,739,529, which is a division of U.S. application Ser. No. 09/916,028, filed Jul. 26, 2001, now U.S. Pat. No. 7,161,476, which is a continuation-in-part of U.S. application Ser. No. 09/915,858, filed Jul. 26, 2001, now U.S. Pat. No. 6,630,885, which claims the benefit of U.S. Provisional Application No. 60/220,896, filed Jul. 26, 2000, all of the above applications hereby incorporated herein by reference.

TECHNICAL FIELD

The present invention relates in general to a system for conserving battery life and in particular to a system for conserving battery life in a battery operated device such as tire tags, where each tag has an electronic sensor circuit that conserves power by "sleeping" and periodically "waking-up" to measure and store tire parameters, such as temperature and pressure.

BACKGROUND

It is desirable to monitor tires for parameters such as temperature and pressure. It is particularly advantageous to monitor large tires for off-the-road (OTR) vehicles since the tires on these vehicles are very expensive and must be regularly maintained to maximize vehicle and tire efficiency.

In the past, tire monitoring devices have ranged from systems that monitor tire pressure by connections to the valve stem (U.S. Pat. No. 4,734,674), to systems that use magnetic coupling to receive the signals external of the tire (U.S. Pat. No. 4,588,978), to sophisticated systems that measure rate of change of pressure in the tire and then change the rate of transmission of the data depending upon the rate of change of pressure (U.S. Pat. No. 5,656,992). Other systems are activated by a radio frequency transmission that energizes the tire tag circuit by inductive coupling devices. See U.S. Pat. No. 5,166,676.

Passive devices that rely on inductive magnetic coupling or capacitive coupling generally have the disadvantage of requiring lengthy coil windings, thus requiring major modifications in the tire construction and assembly process. Another serious disadvantage with such passive devices is that the interrogator must be positioned in very close proximity to the tire, usually within a few inches of the tire, in order to allow communication between the tire and the device. Because of the proximity requirements, continuous monitoring is impractical since it would essentially require that an interrogator be mounted at each wheel of the vehicle. Manual acquisition of the data from the passive devices embedded in each of the tires is also cumbersome and time-consuming because of the proximity requirements.

Other prior art devices used for monitoring tire conditions are comprised of self-powered circuits that are positioned external of the tire, such as at the valve stem. Externally mounted devices have the disadvantage of being exposed to damage such as from weather and vandalism. Additionally, externally installed devices can easily become disassociated from a particular tire that is being monitored.

Another disadvantage with known tire monitoring and identification devices is that communication transmissions are achieved using conventional radio frequencies that generally require a relatively large antenna which must be mounted externally or secured to the tire in such a manner that relatively major modifications are required in the tire construction or assembly process.

Various problems have been addressed by the devices shown and described in U.S. Pat. Nos. 5,500,065; 5,562,787; 5,573,610; and 5,573,611. However, these devices are contained within the tire wheel chamber and have difficulty transmitting data through the tire to external receivers. Also some additional devices are contained within valve stems that do not attach directly to the tire but, instead, to the wheel or rim so the devices do not provide a permanent record of the tire since the tire could be removed and replaced with another tire on the same rim containing the device. Also, these prior art devices either attach to the tire, to the wheel, or to the valve stem exclusively and do not provide design flexibility which is desired in many applications.

Also, when using RF frequency communication, difficulties are encountered in transmitting the signals to a remote location due to the problem of transmitting signals through the tire sidewall(s), which, due to tire thickness at this location, materially reduces the transmission efficiency thereof. It has been observed that the amount of carbon content in the tire affects transmissibility of RF signals thus posing problems for antenna designs. Further, problems occur with prior art antennae etched into or placed on a substrate or printed circuit board. Good transmissions from such construction may occur in only one direction through the tire sidewalls. However, a tire may be "reverse" mounted such that the tag is on an inside wall. Such mounting may increase the difficulty of transmitting signals through the tire sidewalls in the desired direction.

Therefore it would be desirable to provide a tire tag that conserves battery power to extend the useful life of the tire tag.

Although the tire monitoring devices disclosed in the above-mentioned documents provide limited advantages, a tire monitoring system is needed that provides versatility and flexibility by permitting separation of system functions into discrete components capable of improving RF communication with a remote reader/transceiver (RT) in terms of signal/noise ratio, reproducibility and transmission distance. The present invention uses separate components that are combined into a single device structure (a tire tag) attached directly to the inside of the tire. These tag components include a measuring device (sensor) to measure a tire parameter, such as temperature, pressure, and the like, and an RF transmitter and receiver, associated with the tire, for receiving external command signals and transmitting tire data signals from the vehicle tire to an external RT. In addition, the invention provides advantages in programming the tag that prolong battery life, thus extending the useful life of the tire tag.

The present invention includes several sleep and partially awake modes that significantly conserve battery life, provides novel tag identification techniques, and offers configurable transmission options that improve tag performance.

SUMMARY

The present disclosure describes a tire tag that overcomes the disadvantages of the prior art by providing an Electronic Tire tag Management System (ETMS) including a parameter measuring device, such as a tire tag. In one embodiment, the tire tag is generally in a deep sleep mode in which only an RC watchdog timer is running so as to conserve power. The tag periodically partially awakens on a periodic basis, initiates a low-speed clock, determines if it is time to further awaken to take sensor measurements and/or look for possible interrogation signals, and if it is not time, adjusts a search mode counter by one, and returns to the deep sleep mode.

If the tag determines that it is time to further awaken, the tag continues using the low-speed clock, determines if it is time to read the sensors by examining a sensor counter and, if it is time to read the sensors, the tag reads and stores sensor data, such as pressure and temperature. Otherwise, the tag adjusts the sensor counter by one, and checks for interrogation signals (also called Forward Link Packets—FLPs) from a remote reader/transceiver (RT). If the tag detects what appears to be an interrogation signal, it further awakens to an interrogation mode. Otherwise, the tag continues using the low-speed clock and determines if it is time to perform an autonomous transmission (AT) by examining an AT counter. If it is not time for an AT, the tag adjusts the AT counter by one and returns to the deep sleep mode. Otherwise, the tag awakens to the interrogation mode, initiates a high-speed clock, and performs an AT (e.g., it transmits the most recently stored sensor data to a RT).

In the interrogation mode, the tag initiates a high-speed clock, reads at least a portion of the incoming transmission to see if it is a valid interrogation signal, and if it is, responds to the interrogation signal. Otherwise, if the transmission is not a valid interrogation signal, the tag waits a predetermined period of time for a valid interrogation signal. If no valid interrogation signal is detected within that time, the tag turns OFF the high-speed clock and again enters the deep sleep mode. Otherwise, the tag responds to the valid interrogation signal.

The tag conserves battery power with its "sleep/wake-up" routine.

More broadly, the invention is a system for conserving battery life in any battery operated device.

Thus, it is an object of the present invention to provide a tire management system that conserves energy as an example of the invention as set forth in the attached claims.

BRIEF DESCRIPTION OF THE DRAWINGS

These and other features of the present invention will be more fully disclosed when taken in conjunction with the following Detailed Description of the Invention in which like numerals represent like elements and in which:

FIG. 1A represents a general overview of the components comprising the electronic tire management system (ETMS) according to one embodiment of the present invention;

FIGS. 1B-1D detail alternative antenna configurations which may be used in conjunction with the tire tag;

FIGS. 2A-2D are side, top, perspective and end views respectively of a potted tire tag assembly, each having an antenna parallel to and slightly spaced from the printed circuit board;

FIGS. 3A-3D are side, top, perspective and end views respectively of an unpotted tire tag assembly, each having an antenna parallel to and slightly spaced from the printed circuit board;

FIGS. 4A-4E are a side view of one embodiment of a tire tag and patch, a cross-sectional view, a perspective view of a disassembled potted tire tag assembly and the patch on which the tire tag is mounted, a perspective view of the potted tire tag assembly mounted on the tire patch, and a cross-sectional view of a portion of the potted tire tag and patch shown in FIG. 4B, respectively;

FIGS. 5A-5E are a side view of another embodiment of a tire tag and patch, a cross-sectional view, a perspective view of a disassembled potted tire tag assembly and the patch; a perspective view of the assemble tire tag and patch, and an exploded cross-sectional view of a portion of the tire tag and patch shown in FIG. 5B illustrating how the tire tag mates to the patch;

FIGS. 6A-6D are a top view, side view, perspective view, and end view of another embodiment of a potted tire tag assembly mounted to a tire patch;

FIGS. 6E-6F are opposed perspective views illustrating one embodiment of the potted tire tag.

FIGS. 7A-7D are a back view, a top view, end and top views, and a perspective view of another embodiment of a potted tire tag assembly having the antenna normal to the printed circuit board and having a rectangular base;

FIG. 8 is a top view of a layered tire patch showing the layers used to construct a patch having a T-shaped raised plateau;

FIG. 9 is a side view of the patch shown in FIG. 8;

FIGS. 10A-10C are a top view of a mold, a cross-sectional view, and a cross-sectional view of a portion of the mold shown in FIG. 10B, illustrating the T-shaped plateau of the upper half mold used to fabricate tire patches according to one embodiment of the invention;

FIGS. 23-33 are screen shots showing one embodiment of a user interface for remotely accessing tire data via the Web;

FIG. 38 is a flow chart of the overall tag firmware functions, according to one embodiment of the invention;

FIG. 43 is a flow chart illustrating the Interrogation process;

FIG. 44 is a flow chart illustrating the Interrupt Service routine;

FIG. 45B is a flow chart illustrating Packet Processing (pre-discrimination);

DETAILED DESCRIPTION

Figure 6E:
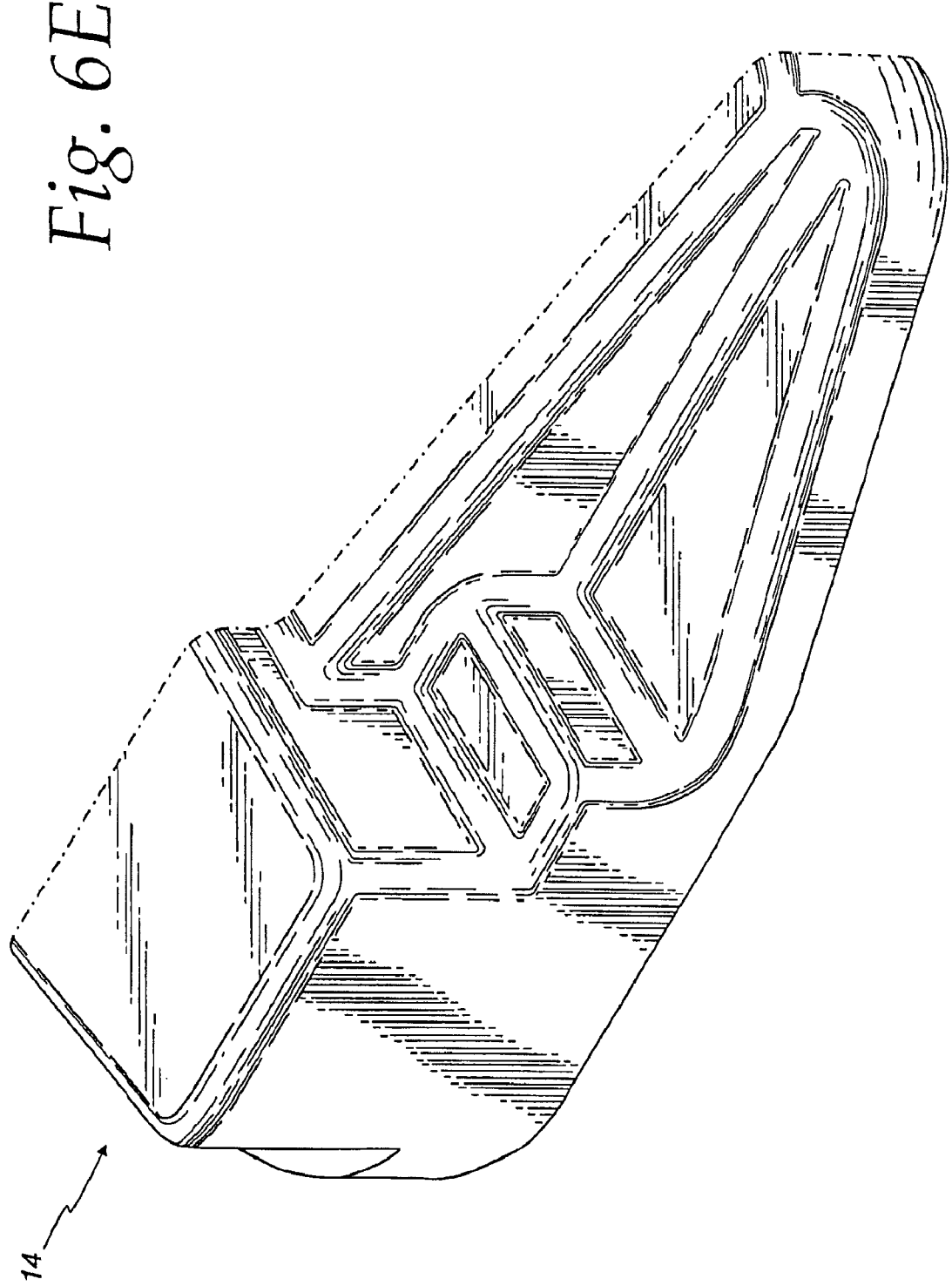

Illustrated in FIG. 1A is a block diagram of one embodiment of the Electronic Tire Management System (ETMS). A tire tag 14 is located within a tire 10 mounted on a vehicle 12. Various methods of attaching the tire tag 14 to the interior of the tire 10 have been described in various patents and related applications, including U.S. Pat. No. 5,500,065 entitled "Method for Embedding a Monitoring Device Within a Tire During Manufacture"; U.S. Pat. No. 5,562,787 entitled "Method of Monitoring Conditions of Vehicle Tires"; U.S. Pat. No. 5,573,610 entitled "Tires Containing a Monitoring Device for Monitoring an Engineering Condition Therein"; U.S. Pat. No. 5,573,611 entitled "Method of Monitoring Conditions of Vehicle Tires and Tires Containing a Monitoring Device Therein"; and U.S. Pat. No. 5,971,046, filed Sep. 17, 1997, and entitled "Method and Apparatus for Bonding an Active Tag to a Patch and a Tire"; all commonly assigned to the assignee of the present invention and all of which are incorporated herein by reference in their entirety.

The tire tag 14 includes a microcontroller and RAM memory device 16, one or more monitoring devices (sensors) 18, and a tire tag antenna 20. Signals are emitted from and received by tire tag 14 through tag antenna 20. A power source such as a battery 22 is provided for energizing tire tag 14. An RF circuit 21 is also provided on tag 14 for receiving signals from and transmitting signals to a remote interrogator 26. The vehicle 12 preferably will have a tire tag for each individual tire 10.

The interrogator 26 is designed to operate interactively with the tag 14. It is to be appreciated that the interrogator 26 may include a variety of components dependent upon the particular implementation, and the design of the components themselves may be configurable to specific implementations. For example, the interrogator 26 may be hand-held, fixedly mounted for drive-by interrogation, or located on-board the vehicle 12.

On a general level, interrogator 26 includes an antenna 28, a reader/transceiver (RT) 30, and a reader processor (RP) 32. The antenna 28 is configured to receive signals from the tag antenna 20 and also to transmit data from the interrogator 26 to the tag 14 (or other tags). RT 30 illustrates one system for receiving and transmitting signals to and from the tag 14. RP 32 interacts with RT 30 via a communication channel 33. The RP 32 receives and interprets tag data and provides command signals to the RT 30 for transmission to the tag 14 via a communication channel 29.

A communication channel 34 may be provided from RP 32 to a user interface site 36. The user interface site 36 may be a field support computer (FSC), an unintelligent or intelligent terminal, or other device that allows a user to either view and/or interact with data processed by the RP 32. The communication channels 29, 33, and 34 may include an Ethernet link, Internet link, wire link, wireless link, microwave link, satellite link, optical link, cable link, RF link, LAN link, or other communication link. Furthermore, the user interface site 36 (although shown separately) may be incorporated in the interrogator 26. In one embodiment, the RP 32 includes the functionality of the field support computer (FSC) 36.

Alternatively, the reader processor (RP) 32 and reader/transceiver (RT) 30 can be separate units where RP 32 is part of the user interface site 36 and is itself remote from the RT 30. The RT 30, while shown as a single unit, may in some embodiments be multiple RT units. As an example, in some situations it may be advantageous to provide individual RT units 30 physically located on opposite sides of a vehicle 12 with each RT unit 30 reading tags 14 from the side of the vehicle 12 on which the RT 30 is located. The data obtained from individual tires 10 may then be downloaded to a "tire" database forming part of a tire management system.

In FIG. 1A, the tire tag antenna 20 is illustrated as one of the blocks in the block diagram. However, the inventors have found that for transmission of tire tag signals through either or both of the tire walls and for durability, unique antenna designs for particular implementations are useful. In one embodiment, the tag antenna 20 is a monopole antenna 20A, shown in FIG. 1B, that is potted (i.e., encapsulated in an epoxy, such as Stycast®) and mounted within a rubber tire patch that is permanently bonded to the inside of the tire. In one embodiment, the patch is bonded to the inner wall, which may be the inner liner of a cured tire. The antenna 20A is connected to the tag electronics via a connection 24, as is known in the art. The monopole antenna 20A is a tunable antenna that achieves the same RF signal capability as a dipole configuration, but is smaller in size. The antenna 20A shown in FIG. 1B is not shown in any relative or actual size proportions, but is merely an example. Thus, the monopole configuration enables the manufacture of a much smaller tag having less mass. In the preferred embodiment, the antenna is 2 inches long and made of standard bus wire having a 0.040 inch diameter.

FIGS. 1C and 1D illustrate embodiments where the antenna elements 20B are two strips or arms operating in a dipole fashion and connected to the electronics of the tire tag 14. The antenna elements 20B are attached to a rubber patch 39 (shown in FIGS. 2-8) that is permanently affixed to the inside of the rubber tire 10. In order to assure a good connection to the tire, the components of the tag 14 and the antenna 20 first may be encapsulated in an epoxy, such as Stycast®, and then affixed to the rubber patch 39, which is attached to the inside of the tire 10.

It is preferable to encapsulate the electronic printed circuit board 38 (shown for example in FIGS. 2A and 7A) and the separate antenna 20 in an epoxy so that both will be encapsulated in one block. The encapsulated block (tag 14) may be bonded or otherwise adhered to the patch 39, which in turn is bonded to the inner wall, or perhaps inner liner of the tire 10. The advantages of this approach are several. First, encapsulation provides improved mechanical integrity. When the antenna 20 is encapsulated with the electronic printed circuit board (PCB) 38 it is not subjected to the mechanical stresses associated with the patch 39. Secondly, by spacing the antenna 20 from the PCB substrate, the antenna 20 can be located further away from the ground plane on the PCB 38, thus providing a stronger signal; this also permits the use of less costly circuit boards. Third, the preferred antenna is a monopole antenna that radiates signals in all directions and is believed to provide an advantage over single direction antennas, such as patch antennas. Fourth, better matching of components is provided when the antenna 20 is encapsulated in the potting material which, when properly matched, provides consistent loading of the antenna 20. Fifth, the cost to manufacture such a potted assembly is less because in manufacturing such an assembly the impedance of the microstrip circuitry does not have to be tightly controlled, the printed circuit board 38 does not have to be made of expensive materials, and the step of building the antenna 20 within the rubber patch 39 is eliminated. Sixth, a potted tag assembly enables the tag 14 to operate in the harsh environment encountered on the inside of a tire that is in use.

As shown in FIG. 1D, inductors 20E may be placed in series with the dipole antenna elements 20D to enable shorter dipole elements 20D to be used.

In FIGS. 2A-D there is disclosed one embodiment of the tire tag 14 that is potted or encapsulated in a material, such as Stycast® or any other normally used potting material. FIG. 2A is a side view illustrating the printed circuit board 38 having the antenna 20 attached thereto in a plane parallel to the printed circuit board 38. FIG. 2B is a plan view of the novel potted tire tag 14 while FIG. 2C is a perspective view and FIG. 2D is an end view. Note that the base 13 of the tire tag 14 is elongated and generally ovate in shape and has a recess 15 therein for mounting on a tire patch 39 as will be disclosed hereafter. The antenna 20 is under an elongated extension 20A of the PCB 38.

FIG. 3 illustrates another embodiment of the tire tag 14 prior to being potted in an epoxy material, such as Stycast®. The tire tag 14 includes a PCB 38 having an elongated extension 20A. Under the elongated extension 20A is the antenna 20, which is generally parallel to the extension 20A. FIG. 3A is a side view, FIG. 3B is a top or plan view, FIG. 3C is a perspective view, and FIG. 3D is an front view.

FIG. 4 illustrates one method of mounting a potted tire tag 14 to a molded tire patch 39. FIG. 4A is a side view of the potted tire tag 14 mounted on the tire patch 39. FIG. 4B is a cross-sectional view of FIG. 4A, taken along line 4B-4B, illustrating the recess 15 under the base 13 of the potted tire tag 14 for mounting on a mesa or plateau area 39D formed on the tire patch 39. FIG. 4C is an exploded perspective view illustrating the potted tire tag 14, and the tire patch 39 having the mesa or plateau 39D formed thereon for receiving the tire tag 14.

FIG. 4D is a perspective view of the tag assembly when the tire tag 14 is assembled to the tire patch 39. FIG. 4E is a cross-sectional view of one corner of FIG. 4B illustrating how the recessed base 15 of the potted tire tag 14 is placed on the mesa or plateau 39D of the tire patch 39. The patch 39 may be bonded to the tire tag 14 in any well-known manner.

FIGS. 5A-5E represent another embodiment illustrating a different method of attaching the tire tag 14 to the tire patch 39. As seen in FIGS. 5B and 5E, the tire patch 39 has a T-shaped mesa 39D and the recessed bottom portion 13 of the tire tag 14 has a matching recess 14A to receive the T-portions 39A of the tire patch 39, thus locking the tire patch 39 to the tire tag 14 as shown.

It is desirable to place the tire tag 14 on a tire patch 39 such that the tire tag 14 is isolated from the tire 10 as much as possible. Such basic construction is shown in commonly assigned U.S. Pat. No. 6,030,478. However, it is preferred to use the type of tag mounting that is shown in FIGS. 5A-E to ensure the best possible attachment of the tire tag 14 to the tire patch 39. To construct such a mesa 39D on the tire patch 39, a special construction of the tire patch 39 is used. Thus, the potted tire tag 14 is mounted on a tire patch 39 of unique construction that securely attaches the tire tag 14 to the tire patch 39 by retaining the pliable rubber patch 39 in compression by the over molded encapsulation around both the tag 14 and the patch 39 and assists in isolating the tire tag 14 from the stresses and vibration encountered in a moving tire.

It will be noted in FIGS. 5B and 5E that the base 13 of the tire tag 14 has recess 14A formed by inwardly extending leg 14B that receives a shoulder 39A extending outwardly from the periphery of the mesa 39D on the tire patch 39. Note that recess 14A abuts the tire patch face 39C that extends downwardly from, and is perpendicular to, shoulder 39A and that immediately under shoulder 39A, an arcuate concave recess 39B is formed. The purpose of this recess 39B is to distribute stresses in the tire patch 39 so that the tire tag 14 is more isolated from the stresses generated by the tire and thus extends the life of the tire tag 14. This purpose is accomplished because the arcuate concave recess 39B allows a well-known stitching tool, used during mounting of the tire patch 39 to the tire 10, to remove the air in the recess 39B and therefore provide a stronger attachment between the patch 39 and the tire 10. The novel recess construction described above can used in each of the embodiments disclosed herein.

Figure 12:
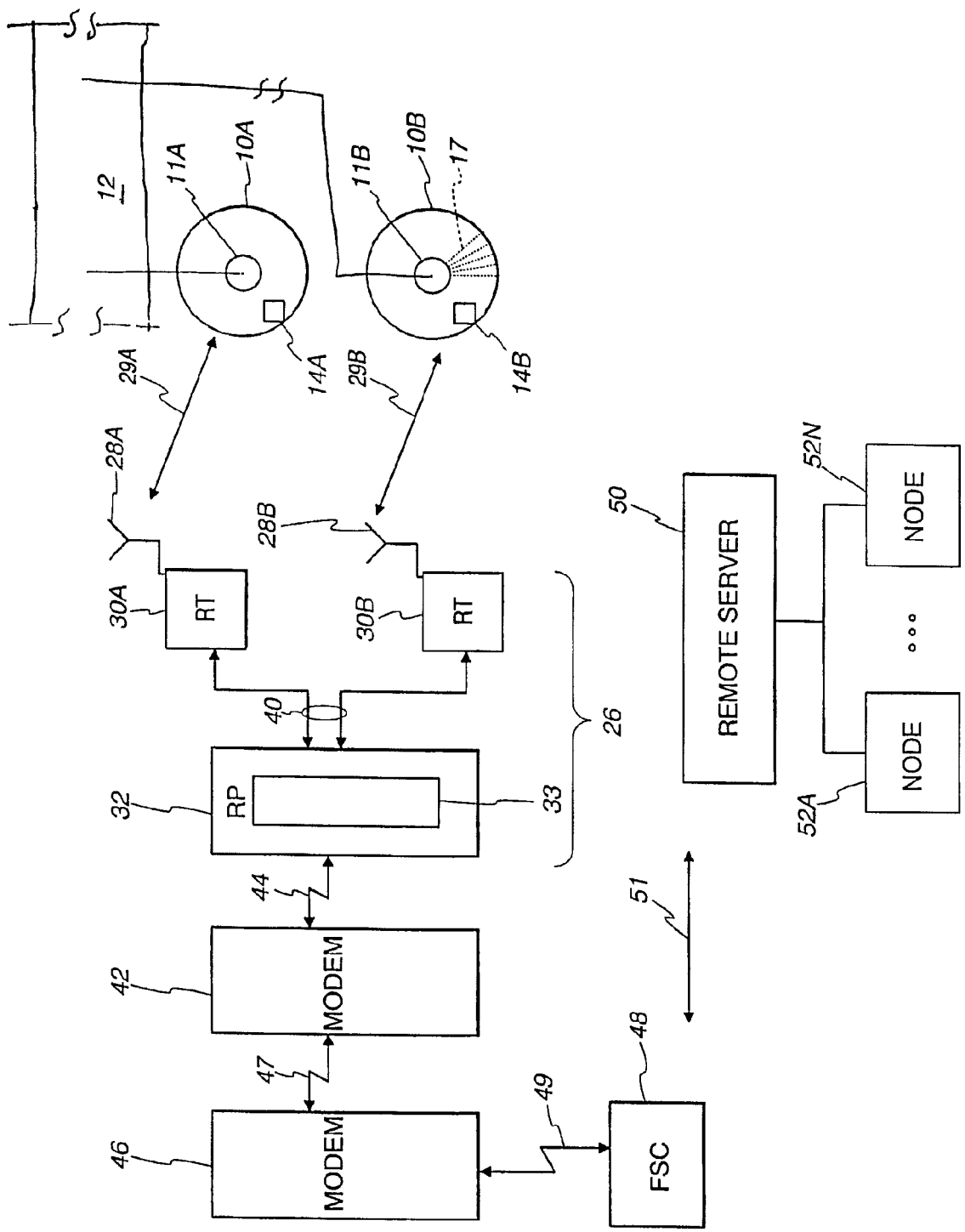
FIG. 12 illustrates another embodiment of the ETMS of the present invention wherein multiple tire tags and multiple reader/transceivers (RT) are used.

The placement of the tire tag 14 in the tire 10 is both significant and important. The location of the tire patch 39 within the tire 10 affects not only the life of the tag 14 but also the ability of the tag 14 to transmit signals through the wall of the tire 10. Off-the-road (OTR) tires are extremely large in both diameter and width. As is well-known, some tires may include steel cords or wires that are circumferentially positioned near the bead 11A, 11B of the tire to strengthen that area (see FIG. 12). Radially extending cords 17 may also extend in a spaced radial manner from one bead 11A, 11B on one side of the tire 10 to the corresponding bead 11A, 11B on the other side of the tire 10, as shown in FIG. 12. This construction strengthens those areas of the tire and enables only slight flexure of the tire in the bead area. On the one hand, the areas where the steel cords or wires are located, especially those in the bead area, are not ideal locations for the tire tag 14 because the tag needs to be in an area where the steel cords are spaced as far as possible to allow for good radio transmission through the wall of the tire 10.

However, on the other hand, the tire tag 14 needs to be located in an area of the tire 10 that minimizes the stresses that are placed on a tire tag 14. Also, the further away from the wheel rim or tire bead that the patch 39, with the tag 14 thereon, is placed, the better the radio transmission is through the tire walls. This is because the further away from the bead (where the large circumferential steel wires or cords are placed) that the tag 14 is located, the less the tag 14 is influenced by the steel cords (or wires) that are located at or near the bead and any steel belts in the tire.

The greatest distance between any two of the radially extending wires 17 occurs at the center of the tread of the tire 10. As is well known, the radially extending wires 17 have a spacing that increases as they move away from the bead on each side of the tire 10. This wider spacing between wires creates gaps that allow better RF transmission through the tire 10. Thus, the best transmission through the tire 10 will occur at the greatest distance from the bead of the tire.

Thus, it is desirable to position the tire patch 39 (with the tire tag 14 thereon) at some optimum position to minimize stresses to the tire tag 14 while at the same time sufficiently far away from the bead of the tire for allowing adequate radio transmission through the wall of the tire 10. In this manner, the stresses in the tag 14 are minimized while, at the same time, adequate radio transmission is obtained. Thus, the position of the tire patch 39 on the tire wall is a compromise. It is at a distance sufficiently far from the tire bead to allow adequate signal transmission through the tire wall but in a location to reduce stress and concurrent damage to the tire tag 14 from severe flexure of the tire 10.

In off-the-road (OTR) tires, it has been determined that the preferred area for mounting the combined tire patch 39/tire tag 14 on the tire 10 is from about 6 to about 20 inches from the bead of the tire (in the radial direction). The preferred distance depends on the specific size and type of tire. In one embodiment, this distance is about 12-15 inches from the bead (or wheel rim). Mounting the tire patch and tag in the preferred area ensures that the distance from the steel circumferential wires, and the spacing of the radially extending wires 17, is sufficient to allow acceptable radio transmission. Moreover, this distance provides a minimum of stress to the patch 39, thus lengthening the life of the tire tag 14.

FIGS. 6A-6D illustrate still another embodiment of a tire tag 14 and tire patch 39 in which the potted tire tag 14, rectangular in shape, is placed in a recess 39E in the tire patch 39 and attached thereto so that the entire assembly can be bonded to a tire 10. As shown in FIGS. 6A-6D, an orifice or port 14C is provided in the potting of tire tag 14 to enable pressure within the tire to be accessed by the pressure sensor 74, shown in FIG. 13. However, when a tag 14 is used in tires containing a fluid (such as Tire Life), the sensor 74 should be protected from the fluid to prevent damage to the sensor. To this end, a hydrophobic filter 14D, well-known in the art, is placed in the orifice or port 14C to prevent fluid from reaching the pressure sensor 74.

PCT Patent Application Ser. No. WO 99/29524 discloses a tire tag with an encapsulated pressure sensor that uses a wicking device to provide a path for pressure equilibrium between the pressure sensor and the inflation chamber. The wicking device allows gas molecules to pass from the inflation chamber to the pressure sensor while preventing adhesives, rubber, grime, and the like from doing so. However, because it is a wicking device, it will not prevent liquids in the tire from being transferred to the sensor. By contrast, the hydrophobic filter of the present invention not only prevents the adhesives, rubber, grime, and like contaminants from reaching the pressure sensor, but also prevents any fluids from reaching the pressure sensor 74.

FIGS. 6E-6F are opposed perspective views that illustrate one embodiment of the present invention when the tire tag 14 has been potted in an epoxy. The potted shape is the same as that shown in FIGS. 2A-2D FIGS. 7A-7D are similar to the embodiment shown in FIG. 3 with the exception that the base 14A of the tire tag 14 is rectangular instead of oval. The assembly is again potted with the antenna 20 normal to the tire tag printed circuit board 38.

FIG. 8 is a plan view of the tire patch 39 with the raised oval T-shaped pedestal or mesa 39D in the center for receiving the embodiment of the tire tag 14 illustrated in FIG. 5.

FIG. 9 is a side view of the tire patch 39 illustrating an optional tire patch construction in which various layers 39F are used to form the patch 39 and to create the T-shaped pedestal 39D on which the tire tag 14 is mounted, as shown in FIG. 8 and FIG. 5.

FIGS. 10A-10C illustrate the mold 39G for making the tire patch 39 having the T-shaped pedestal, plateau or mesa 39D to which the tire tag 14 can be mounted.

Figure 11A:
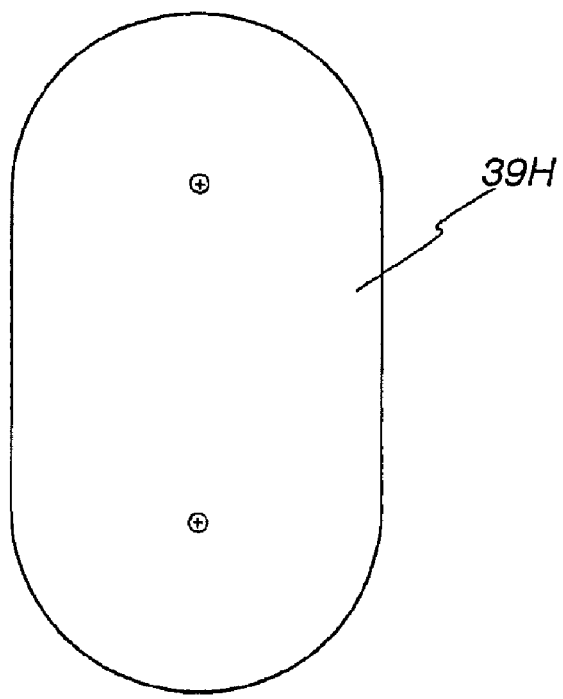
FIGS. 11A-11B are top and side views, respectively, of the lower half of the mold illustrated in FIGS. 10A-10C.
Figure 11B:
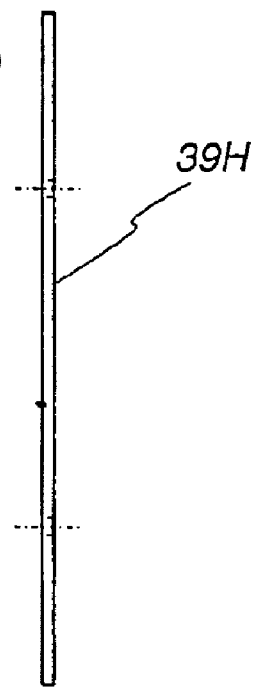

FIGS. 11A and 11B illustrate the lower half 39H of the mold 39G shown in FIG. 10.

FIG. 12 illustrates another embodiment of the system shown in FIG. 1. In this embodiment, the vehicle 12 is shown with two tires, 10A and 10B, each having respective tire tags 14A and 14B attached to the inner surface thereof. These tire tags 14A and 14B are self-powered units that may be encapsulated within a hard epoxy (or similar) housing or coating, or any other protective housing termed "potting". The potted tags 14A, 14B may be affixed within the tires 10A and 10B, respectively, in rubber patches 39, such as shown, for example only, in FIG. 8, that are permanently bonded to the inner wall of the cured tires 10A and 10B, such as disclosed in commonly assigned U.S. Pat. No. 6,030,478, which is incorporated herein by reference in its entirety. In one embodiment, the tag antenna 20 is disposed within the rubber structure of the patch 39 and a suitable connection is made to the tag electronics. The tag/patch assembly is attached to a tire 10 as a single unit.

Also depicted in FIG. 12 is an interrogator 26, which includes a first reader/transceiver (RT) 30A, a second reader/transceiver (RT) 30B, antennas 28A, 28B, and a reader processor (RP) 32. The RTs 30A, 30B may be of different types, examples include a fixed gate reader, a portable reader, or an on-board vehicle reader. A fixed gate reader is designed for installation at fixed locations, such as fuel islands, docks, haul roads, etc. Besides reading the most recent tag sensor data from memory, a RT 30 may download tag history data during periods when the vehicle 12 is stationary or within range of a RT for an extended period of time. Communication to fixed gate readers may be through hardwired phone lines, RF links, modem links, or local area network (LAN) links. Fixed gate readers, portable reader and on-board vehicle readers gather tire data, such as pressure and temperature data.

In one embodiment, the interrogator 26 includes a portable reader 30 that is used for, inter alia, initially programming or reprogramming the tags 14 as tires are mounted and unmounted on the vehicles 12, reading the most recently stored sensor data from tags, and downloading tag history data from the tags 14. Portable readers 30 are battery powered, include a keypad/keyboard, touch screen, or other input device known in the art, and an LCD display for user interaction and data display, sufficient memory to retain tag data from multiple tags for a lengthy period of time between data retrieval and downloading to a remote server 50, and a communication channel 51 for allowing stored tag data to be downloaded to a database in the remote server 50. The communication channel 51 may include, for example, an RS-232 serial link, an Ethernet link, or some other communication link known to those skilled in the art.

As shown in FIG. 12, this embodiment of the interrogator 26 includes reader/transceivers (RTs) 30A and 30B. Each RT 30A, 30B has associated with it an antenna 28A and 28B, respectively. The reader processor (RP) 32 is a separate component that is in communication with RTs 30A, 30B through a communication channel 40. Reader processor 32 may be connected to a first data transmission device 42 (e.g., a modem) through communication channel 44. It should be noted that the RT power supply may be located in the RP 32. First data transmission device 42 is configured to communicate, as needed, with a second data transmission device 46 (e.g., a modem) through a communication channel 47. As used herein, the term "communication channel" includes communication via an Ethernet link, Internet link, wire link, wireless link, microwave link, satellite link, optical link, cable link, RF link, LAN link, or other communication link. The second data transmission device 46 is designed to communicate with a user interface site 48, which may include a field support computer (FSC) or remote server, via a communication channel 49, such as an RS-232 serial link, an Ethernet link, or other communication link.

As previously discussed, various configurations of the present invention can be employed. One such configuration, shown in FIG. 12, has data from the field support computer 48 transferred to a remote server 50. In one embodiment, the information from the field support computer 48 is transmitted across a communication channel 51, such as the Internet, to a remote server 50, which is connected via a communication channel to a variety of computer nodes 52A-52N. The remote server 50 may be a personal computer, web server, or other computer with appropriate software to run and maintain a database of tag data. The nodes may be portable computers or remotely located computers that can access the remote server 50 via, for example, the Internet. The RP 32, field support computer 48, and remote server 50 may be, for example, two or more separate computers, one computer partitioned into different virtual machines, or one virtual machine, acting as two of the components, that is connected to a second computer acting as the third component.

The user interface site 48 may also be a RT 30 that resides on-board a vehicle 12 having tires 10 in which tags 14 are mounted. In one embodiment, the RT 30 is powered by the vehicle 12 and has the ability to store tag data until such data is downloaded to the remote server 50 via a communication channel, including an RF link or other communication link.

The system illustrated in FIG. 12 may include stationary surveillance readers that are installed at fixed locations around a particular site, such as a mine site, to provide early warning of low inflation/high temperature alarm conditions. Stationary surveillance readers are primarily listen-only readers that are located at various locations, for example, around a mine site, such as at major intersections, vehicle-ready lines, shovel sites, crusher sites, dump sites, loader sites, maintenance yards, tire shops and the like. The purpose of the surveillance readers is to provide a lower cost system for signaling an alarm condition, such as low pressure or high temperature, than would be achieved by outfitting each vehicle 12 with an on-board vehicle reader. Surveillance readers generally listen for autonomous transmission (AT) packets being transmitted from one or more tags. AT packets indicate a tag alarm condition (such as an under-pressure condition or an over-temperature condition). Surveillance readers can also listen for AT packets containing the most recently stored tire sensor data when the vehicle passes within range of a surveillance reader. In one embodiment, an alarm signal transmitted from a tag 14 to the surveillance reader is relayed to a remote server 50 via a dispatch system (such as Modular Mine), hardwired telephone line, RF modem, or similar communication channel. Alternatively, the reader processor 32 or the user interface site (e.g., a field support computer) 48 may transfer the tire tag data and/or alarm signal from one of the various types of RTs to, for example, a dispatch system. The dispatch system would then transmit this data to the remote server 50, which acts as the Electronic Tire Management System (ETMS) database. The specific locations of the fixed gate readers and surveillance readers vary from customer to customer depending upon need.

In the embodiment shown in FIG. 12, data is obtained by the interrogator 26 from the tire tags 14 over a wireless RF link (e.g., 29A) operating in the Industrial, Scientific, and Medical (ISM) frequency band (902-928 MHz). Other frequency ranges can be used without departing from the invention. This frequency band is primarily intended for unlicensed transmitters, which have been certified under Part 15 of the Federal Communications Commission Code (47 C.R.F. §15). Many devices such as cordless phones and wireless LANs share the ISM frequency band and the claimed Electronic Tire Management System is designed to coexist and operate robustly among these other devices.

To minimize signal interference, the frequency of the forward link channel (i.e., reader to tag) is varied among several of the available RF channels in the ISM frequency band in a pseudo-random manner (frequency hopping). Each forward link command is transmitted on a frequency different than the previous command in a pseudo-random manner to avoid continuous interference from other devices operating in this frequency band. Frequency hopping also allows the system to transmit the maximum signal radiation (+36 dBM) under 47 C.R.F. §15. The 902-928 MHz ISM frequency band was selected in part because these frequencies were determined to be efficient in radiating signals through the tire wall. In one embodiment, the preferred frequency for radiating forward link data through the tire wall is 915 MHz. While lower frequencies may be used, they provide narrower bandwidth.

Referring to FIG. 12, tire tags 14A, 14B, installed in tires 10A, 10B, include sensors 72, 74 (shown in FIG. 13) to sense tire parameters, such as temperature and pressure. The tire tags 14A, 14B provide the user with several features, including:

a unique tire identifier that can be used for tire record-keeping purposes;

the most recently stored sensor data representing tire parameters, including tire pressure and tire temperature;

the ability to transmit tire parameters autonomously to a RT;

a readout of all the monitored tire parameters, including pressures and temperatures, a determination that a tire parameter is out of programmed limits, wheel position on a vehicle, a tire identification number, and a vehicle identification number. This data can be provided to a local and/or remote location. Local refers to the location of the RT (i.e., a fuel island, on-board or adjacent a vehicle) and remote refers to a location separated from the RT where the data is transferred (e.g., a tire shop, dispatch);

the ability to autonomously and periodically transmit an alarm signal when a parameter is out of range. The tire parameters are sampled periodically to determine if an alarm signal should be transmitted. The alarm thresholds used by the tag to determine if an alarm condition exists are programmable by the user;

a history of the tire parameters sampled over a specified interval selected by the user; and the ability to enter alarm thresholds and wake-up time intervals.

Figure 13:
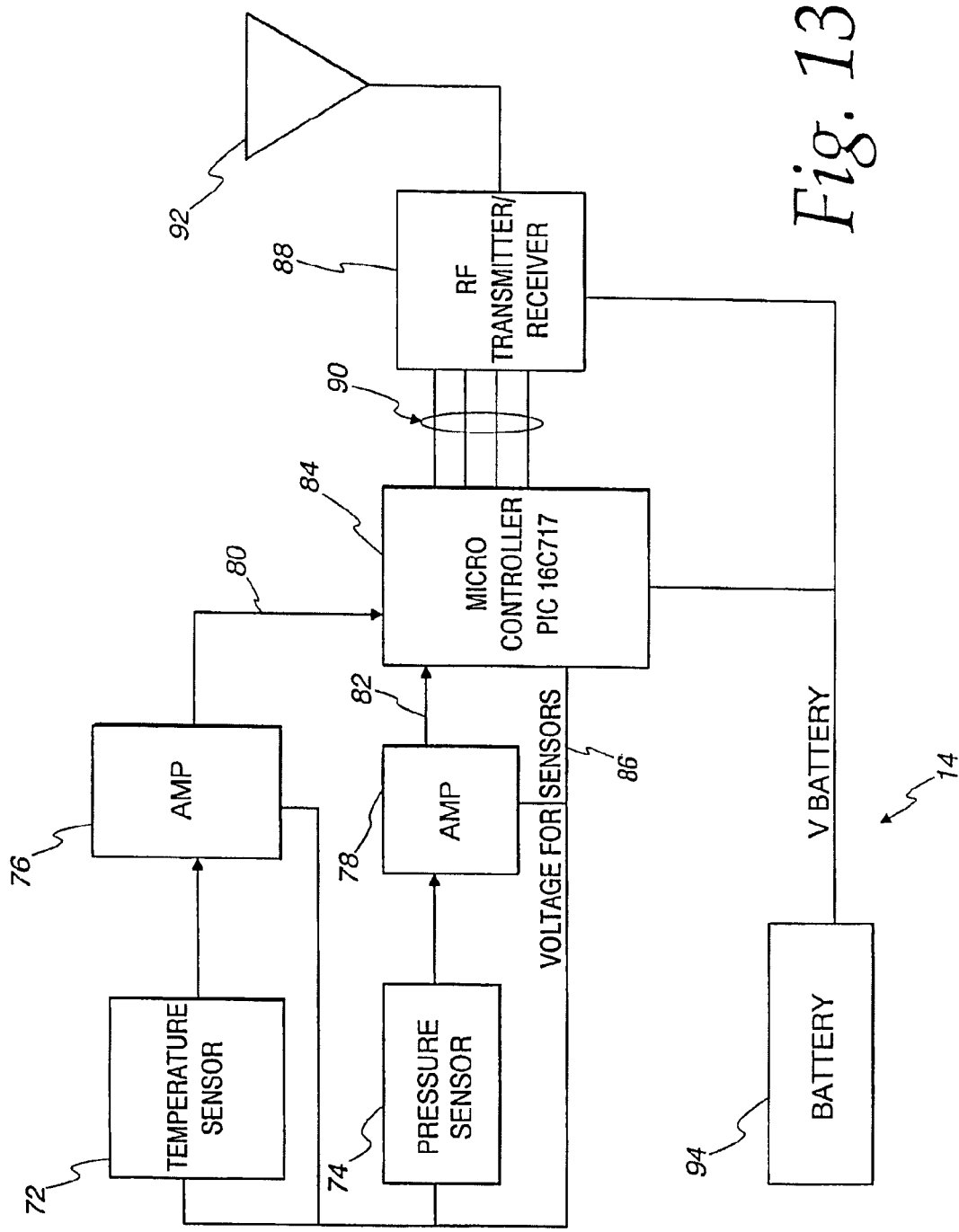
FIG. 13 is a more detailed block diagram of a tire tag in accordance with the present invention.

The tire tag 14 is shown in more detail in FIG. 13. The illustrated tag 14 includes a temperature sensor 72 and a pressure sensor 74. It could, of course, include other sensors for determining other tire parameters, such as the number of tire rotations. One purpose of temperature sensor 72 is to enable the data from pressure sensor 74 to be corrected to a reference cold-fill pressure (e.g., the pressure at sea level at 20° C. (68.0° F.)). In one embodiment, the temperature sensor 72 is manufactured by National Semiconductor, model LM60BIM3. The pressure sensor 74 is used to sense changes in pressure that may be used for long term tracking and recording purposes. In one embodiment, the pressure sensor is manufactured by Sensym, model SCC 100AHO-GF. The tire tag 14 also includes an amplifier 76 for amplifying the analog signals from the temperature sensor 72 to produce an amplified temperature signal 80, which is supplied to and stored in the RAM memory of the microcontroller 84. The tag 14 further includes an amplifier 78 for amplifying the analog signals from the pressure sensor 74 to produce an amplified pressure signal 82, which is supplied to and stored in the RAM memory of the microcontroller 84. Microcontroller 84 supplies sensor voltage 86 to the sensors 72, 74 at the appropriate time. In one embodiment, the sensors 72, 74 produce analog outputs that are supplied to the microcontroller 84, which performs analog-to-digital (A/D) conversion on the sensor data for subsequent processing and storage. In another embodiment, the sensors 72, 74 produce digital outputs in a well know manner that can be directly read by the microcontroller 84 and stored in its RAM memory.

Microcontroller 84 communicates with RF transmitter 88 through signal lines 90. RF transmitter 88 is in communication with tag antenna 92 (which corresponds with tag antenna 20 of FIG. 1A). The tire tag 14 is supplied with power by a power source 94 such as, but not limited to, lithium batteries; however, other acceptable batteries can be used. In one embodiment, the power source 94 includes two 1/2 AA, 3.6 volt, 1.2 Amp Hour (Ah) Lithium batteries, produced by Tadiran Lithium Batteries.

The tire tag 14 has several modes of operation. The typical mode is the deep sleep mode where the tag is generally inactive (no clock is running; however, an RC watchdog timer is running, which uses very little power). The tag 14 spends most of its time in this low-power mode. The tag periodically partially awakens to a lucid sleep mode (when the watchdog timer times out), initiates a low-speed clock, determines if it is time to enter a search mode by examining a search mode counter and, if it is not time, adjusts the search mode counter (e.g., decrements the counter by one), and returns to the deep sleep mode.

Otherwise, if it is time, the tag enters the search mode, which continues to use the low-speed clock. The tag first determines if it is time to read the sensors by examining a sensor counter. If it is time to read the sensors, the tag reads and stores sensor data, such as pressure and temperature. Otherwise, the tag adjusts the sensor counter by one (e.g., decrements the counter by one). The tag next checks for interrogation signals, referred to a forward link packets (FLPs), from a remote reader/transceiver (RT) 30. If the tag detects what appears to be an interrogation signal, it awakens completely to an interrogation mode. Otherwise, the tag continues in search mode and determines if it is time to perform an autonomous transmission (AT) by examining an AT counter. If it is not time for an AT, the tag adjusts the AT counter by one (e.g., decrements the counter by one) and returns to the deep sleep mode. Otherwise, the tag awakens to interrogation mode, initiates the high-speed clock, and performs an AT (i.e., it transmits the most recently stored sensor data to any RT 30 operating in the surveillance mode).

In the interrogation mode, the tag initiates a high-speed clock, reads at least a portion of the forward link transmission to see if it is a valid interrogation signal intended for this tag 14, and if it is, responds to the interrogation signal. Otherwise, if the transmission is not a valid interrogation signal, the tag waits a programmable period of time for a valid interrogation signal. If no valid interrogation signal is detected within that time, the tag turns OFF the high-speed clock and again enters the deep sleep mode. Otherwise, the tag responds to the valid interrogation signal on a return link channel assigned by the RT 30. Alternatively, the tag 14 transmits its responses to each interrogation signal on each of the return link channels, sequentially.

Figure 14:
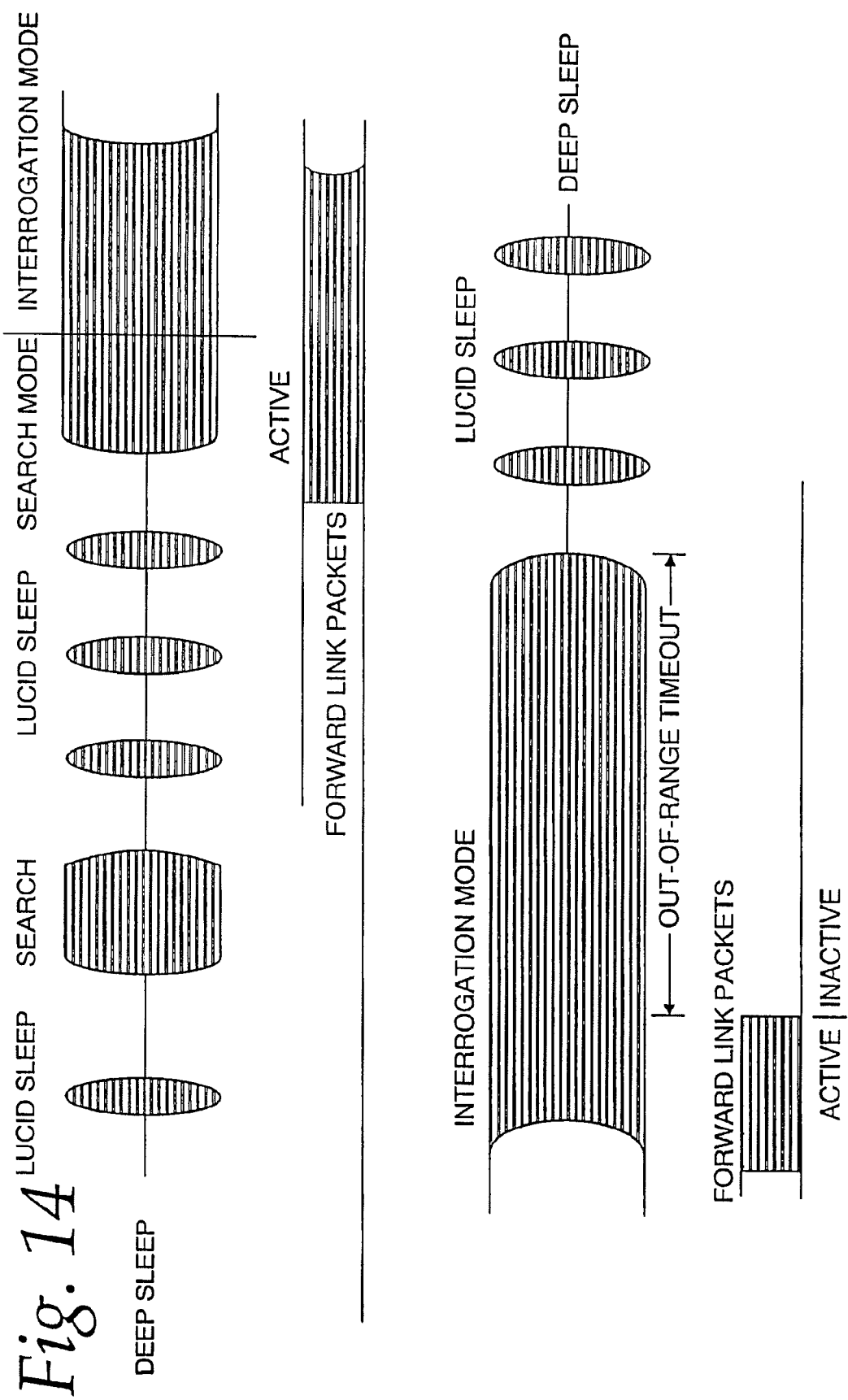
FIG. 14 is a diagram illustrating the various modes of operation of the tire tag, including the deep sleep mode, the lucid sleep mode, the search mode, and the interrogation mode.

FIG. 14 illustrates the various modes of the tire tag 14, including the lucid sleep mode, the search mode, the interrogation mode and the deep sleep mode, and the timing of these modes, according to one embodiment of the invention. The tag 14 spends most of its time in one of the sleep modes. While in the deep sleep mode, the tag 14 uses very little power to help conserve battery life. Recursive Evaluation Mode (REM) comprises deep sleep mode, lucid sleep mode, search mode, and the transition to interrogation mode (fully awake). The tag 14 periodically awakens to the search mode only long enough to determine if it is time to take sensor readings, look for the likely presence of forward link packets (FLPs), determine if it is time for an autonomous transmission (AT), and then goes back to the deep sleep mode after the sensors are read (if required) and if no likely FLPs are detected and it is not time for an AT.

In the deep sleep mode, the tag's microcontroller 84 is in a static, dormant state with its internal clock oscillator(s) shut down. Only the RC watchdog timer is running. Referring to FIG. 13, the tag microcontroller 84 can not execute any programs or control any external JO pins in the deep sleep mode. The tag 14 sleeps in this mode most of its life in an effort to conserve battery power. During the deep sleep mode, because the clock oscillator(s) are OFF, a deep sleep counter is adjusted (incremented or decremented) periodically (e.g., about every 18 ms) by an internal R/C oscillator. An internal watchdog timer (WDT) monitors the deep sleep counter and when the deep sleep counter, for example, contains a NULL value (all zeros), the WDT wakes up the microcontroller 84 (i.e., the WDT initiates the low-speed clock so that the tag 14 can enter the lucid sleep mode).

In the lucid sleep mode, the tag 14 wakes up enough to determine if it is time to enter the search mode by determining if an internal search mode counter, for example, contains a NULL value (all zeros). Lucid sleep mode requires only a minimal amount of processing and a small amount of power since it is only using the low-speed clock. If it is not time to enter the search mode, the microcontroller 84 adjusts (e.g., decrements) the search mode counter and then reverts back to the deep sleep mode. In summary, during lucid sleep mode, the low-speed clock oscillator is turned ON, thus producing a low-speed clock signal (e.g., 37 KHz), a search mode counter is adjusted, the search mode is entered if the counter contains all zeros, and if not, the low-speed clock oscillator is turned OFF, and deep sleep mode is resumed.

In the search mode, the tag 14 continues to use the low-speed clock (e.g., 37 KHz) to execute instructions that include: determining if it is time to read the sensors, searching for transmissions likely to be forward link packets (FLPs) from a RT 30, and determining if it is time for an autonomous transmission (AT). The microcontroller 84 determines if it is time to read the sensors by examining a sensor counter. If it is time to read the sensors, the microcontroller 84 reads and stores data from each sensor sequentially, as described below. Otherwise, the tag 14 searches for the presence of FLPs by performing pre-discrimination wherein the microcontroller 84 searches for a specific number of transitions over a certain period of time. For example, the tag 14 may be programmed to search for a minimum of 71 transitions over a period of 25 ms, which has been found to indicate that a transmission is likely a FLP. A transition is defined as a binary transition (e.g., from 0 to 1, or vice versa). If pre-discrimination indicates that the transmission is likely a FLP, the tag enters the interrogation mode. Otherwise, the microcontroller 84 determines if it is time to perform an autonomous transmission (AT) by examining an AT counter. If it is not time for an AT, the microcontroller 84 adjusts the counter (e.g., decrements the counter) and returns to the deep sleep mode. Otherwise, the microcontroller 84 awakens to interrogation mode, initiates a high-speed clock (e.g., 4 MHz), and performs an AT (e.g., it transmits the most recently stored sensor data to a RT 30).

In the interrogation mode, the tag 14 initiates the high-speed clock, reads at least a portion of the forward link packet (FLP), and determines if the FLP is valid. Error detection is accomplished by transmitting error detection bits, such as parity bits, a checksum, or a Cyclical Redundancy Check (CRC), in each FLP. The tag 14 then checks the error detection bits to make sure the transmission is a valid FLP. The tag also checks to insure that the FLP includes preamble bits, data bits, error detection bits (e.g., a CRC) and postamble bits, and checks to make sure the total number of bites (e.g., 127) is indicative of a valid FLP. If the tag 14 detects an error in the FLP (e.g., CRC is not valid), the bad FLP is disregarded and/or the tag 14 requests that the FLP be retransmitted.

In one embodiment, the microcontroller 84 first examines a beginning portion of the FLP (e.g., the first four bytes) and, if that portion indicates that the transmission appears to be a valid FLP, turns on the phase locked loop (PLL), and then reads the rest of the FLP to check that the CRC is valid. If the FLP contains a valid CRC, the tag 14 responds to the FLP. Otherwise, if the FLP is determined to be invalid, the microcontroller 84 continues searching for a valid FLP for a predetermined period of time (e.g., until a high-speed counter equals zero). If no valid interrogation signal is detected within that time, the microcontroller 84 turns OFF the high-speed clock and again enters the deep sleep mode. Otherwise, the tag responds to the valid interrogation signal.

The period of time the tag 14 continues searching for FLPs is a programmable feature of the tag 14. In one embodiment, the tag 14 includes a high-speed counter (mentioned above) and an out of range counter. The high-speed counter is initiated if the tag 14 determines that a transmission is an invalid FLP. The counter is thereafter adjusted by one (incremented or decremented by one) at a predetermined rate until it contains a NULL value (all zeros). At that time, the tag 14 enters the deep sleep mode. The out of range counter is initiated if one valid FLP is detected. The counter is thereafter adjusted by one (incremented or decremented by one) at a predetermined rate until it contains a NULL value. At that time, the tag 14 enters the deep sleep mode. The duration of time before a NULL value occurs is programmable by setting the start value to a certain number. The two counters can be set to contain different values, such that, for example, the amount of time before deep sleep mode is commenced is greater if a valid FLP was detected than if no valid FLP was detected. In summary, the high-speed counter determines how long to search for likely FLPs before returning to deep sleep while the out of range counter determines how long to continue searching for FLPs after receiving at least one valid FLP. Thus, the out of range counter is generally set to a greater value (longer duration) than the high-speed counter.

Figure 15:
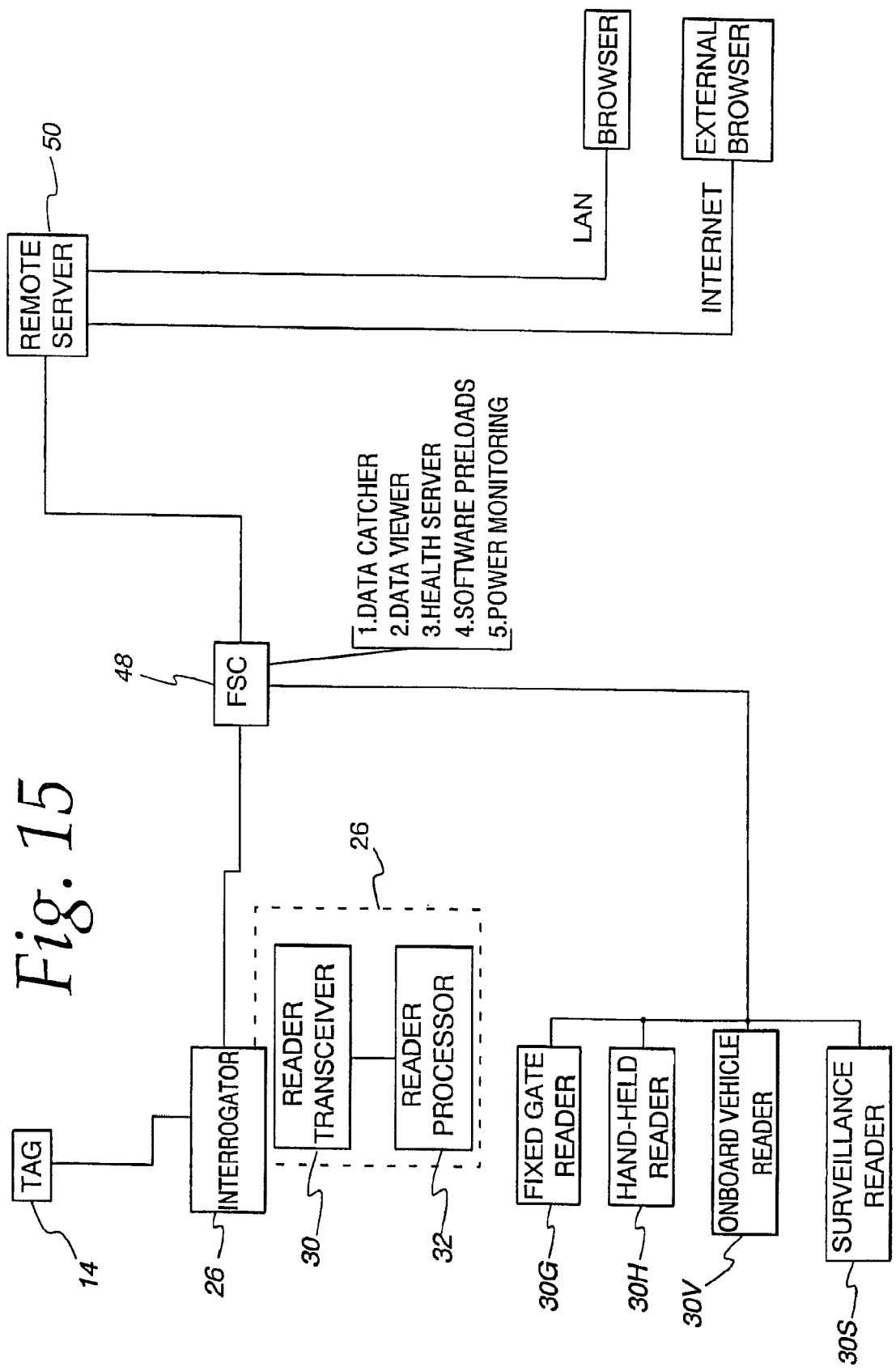
FIG. 15 is a general block diagram of one embodiment of the ETMS showing the various readers that can be used with the system.

FIG. 15 shows the components of one embodiment of the ETMS. This system includes a tag 14, an interrogator 26 including an associated reader/transceiver (RT) 30 and a reader processor 32, a fixed gate reader 30G, a hand-held reader 30H, an on-board vehicle reader 30V, a surveillance reader 30S, a field support computer 48, and the remote server 50. The remotely stored tire parameter data may be accessed via a local area network (LAN) or the Internet.

The reader/transceiver (RT) 30, in one embodiment, initiates RF communication with one or more of the tire tags 14. One form of RT 30 is a fixed gate reader 30G that is positioned at a fixed location (e.g., a fuel island, a dock, haul road, etc.). A fixed gate reader 30G will communicate with one or more tire tags 14 and gather data, including tire pressure data, temperature data, status data (e.g., alarm condition), vehicle ID, and tire ID. The RT 30 may also obtain the history of this data (history data) from one or more of the tire tags 14. The history data is sent from the RT 30 to a tire database by a communication channel, such as an Ethernet link, Internet link, wire link, wireless link, microwave link, satellite link, optical link, cable link, RF link, LAN link, or other appropriate communication link.

The RT 30 may also comprise a portable or hand-held reader 30H, see FIG. 15. Such a hand-held reader 30H communicates with the tire tags 14 and gathers data, including temperature, pressure, and ID information, and captures history data. Hand-held readers 30H may be used at locations where no stationary reader can be used or when it is easier to program a tag and/or download data from a tag on a tire that can be physically inspected by a human user. The hand-held readers 30H may be used to communicate with tire tags 14 at various locations and times, such as on the ready line, at the tire shop, during non-vehicle use periods, during yard checks, at dump sites, or during fueling by a fuel truck. Thus, the hand-held readers 30H provide an "on-site read" of the most recently stored tag data, including tire temperature, pressure, tire ID, and tire history data.

Another form of RT 30 is an on-board vehicle reader 30V (shown in FIG. 15), i.e., a reader attached to the vehicle 12. Each on-board vehicle reader 30V is also able to retrieve tag data, including tire pressure, temperature, status, vehicle ID, tire location, and tire ID, from one or more tags 14 and transfer this data to a tire database resident in, for example, the remote server 50.

The RT 30 may also comprise a surveillance reader 30S (also shown in FIG. 15), which may be strategically stationed at specific locations where the monitored vehicles must pass, such as major intersections, vehicle-ready lines, shovel sites, crusher sites, dump sites, loader sites, maintenance yards, tire shops and the like. These readers 30S can read autonomous transmissions of tag data, including tire identification, pressure, temperature, and alarm transmissions, from the tags 14 on the vehicles 12 that travel near them. Generally, history data will not be collected from the tags 14 by a surveillance reader 30S. The tag data will be communicated to a RP 32, a field support computer 48, and/or a remote server 50 via a communication channel, such as satellite link, RF link, or LAN link, etc. Alternatively, the tag data may be communicated to a vehicle monitoring system. The surveillance readers 30S are primarily listen-only readers (i.e., they do not transmit command signals to the tags 14). Rather, the tags 14 periodically (or in response to an alarm condition) transmit tag data on an autonomous basis, which can be read by the surveillance readers 30S.

If the tag 14 is so programmed, a RT (such as an on-board reader 30V, a hand-held 30H, or a fixed gate reader 30G) may also detect an alarm signal transmitted from a tag 14. In one embodiment, such an alarm signal will be transmitted by a tag 14 to the RT 30 at a periodic interval if a tire 10 is outside a preprogrammed parameter threshold. The RT 30 can detect this signal and determine the position of the tire 10 having the alarm condition. The RT 30 automatically transmits such an alarm condition at periodic (frequent) intervals to the remote server 50 via a communication channel, such as an RF link, satellite link, or other communication link. The tire tag 14 is typically programmed such that the temperature and pressure thresholds equal the maximum and/or minimum limits of temperature and pressure allowed for operation of the tire 10.

In one embodiment, the RT 30 acknowledges the alarm signal. Once the alarm signal is acknowledged, the tire tag 14 may be programmed to cease transmitting the alarm signal. Alternatively, the tag 14 may be programmed to stop transmitting the alarm signal after a predetermined time period, in order to conserve the battery 94 (FIG. 13). If so, when the tag data is later downloaded to a RT 30, the out of range condition will be noted and the alarm condition will be recognized by the RT 30. The alarm signal may include various information, including an out of range condition (e.g., temperature or pressure), the actual temperature and/or pressure values, etc. An on-board vehicle reader 30V may simply need to receive an alarm signal and the time it was generated, while the field support computer 48 and/or remote server 50 may need the actual temperature and/or pressure data for tire management purposes. The surveillance readers 30S may also receive transmissions from tags 14 that indicate pressure and/or temperature alarm conditions and relay that information to the remote server 50.

Tire Tag Features

All tire tags 14 and/or RTs 30 may be programmed to include the following features:

Pressure readings—the RTs 30 have the capability to read the pressure of the tire 10, i.e., read the internal air pressure in pounds per square inch (psi) in the tire/wheel cavity. RTs 30 can also calculate the equivalent cold-fill pressure (e.g., the pressure at 20° C./68° F.).

Temperature readings—the RTs 30 have the capability to read the temperature of the tire 10. The temperature of the tag 14 may not be due to only air temperature because of factors such as the mounting location.

A unique tire identification number—this number specifically identifies a particular tire 10. The tire identification number is typically the tire serial number. This number is programmed into the tag 14 by the tag installer (via, for example, a hand-held reader 30H). The tire serial number is assigned by the tire manufacturer.

A tire brand number—the tire brand number identifies the tire and is easier to read than the tire serial number. This number is typically branded on the tire by the user. This number may also be programmed into the tag 14 by the tag installer (via, for example, a hand-held reader 30H).

A tire model number—the tire model identifies the model of tire and is assigned by the tire manufacturer. This number may also be programmed into the tag 14 by the tag installer (via, for example, a hand-held reader 30H).

A functional identification (FID) number—an abbreviated identification number that identifies, for example, the tag, the tire, and the location of the tire on a vehicle. The functional ID number can be changed if, for example, the tire is rotated to another portion of the vehicle. The FID number is programmed into the tag 14 by the RT 30.

A unique tag identification number—the tag identification number identifies a particular tag 14. The tag identification number is typically the tag serial number; however, it may also identify, for example, the tire and the location of the tire on a vehicle. The tag serial number is assigned by the tag manufacturer and programmed into the ROM of the tag 14.

Tire history data—the tag 14 includes a RAM memory 16 that records history data, such as temperature and pressure, during a certain time interval. The history data is recorded with a time stamp that indicates when the data was recorded. This data may be downloaded from the tag 14 (either directly or indirectly) to a RP 32, a field support computer 48, or a remote server 50. The tag memory 16 periodically stores sensor data. In one embodiment, about 1,000 data records may be stored simultaneously. However, the number of records that can be stored is limited only by the size of the memory 16. The rate at which sensor data is stored to the memory 16 is selectable by the user. If there is no more room for the newly measured sensor data (i.e., the tag memory is full), the oldest stored data is overwritten.

Update tire history data—the tag 14 allows the transfer of only the new tire history data that has not been previously transmitted to a RT 30. Additionally, the tag allows the transfer of a portion (including all) of the current tire history data.

Write-in capability—the tag 14 allows users to write user defined data into the tag memory 16, including wheel position, vehicle number, parameter thresholds, etc. This data may be password protected such that only authorized users can write data to the tag 14.

Automatic data collection—the tag 14 has the capability to self-awaken at preset intervals, take sensor readings, store these readings in memory, and go to sleep without external activation. The tag 14 is generally pre-programmed from the factory with a default wake-up interval (e.g., 2.5 seconds); however, the user can change the wake-up interval.

Autonomous transmit (AT)—the tag 14 may be programmed to self-awaken at preset intervals, take sensor readings, transmit the sensor data to a RT, and go back to sleep without external activation. The sensor measurement function is activated independent of the transmission function of the tag 14. The tag 14 is generally pre-programmed from the factory with a default wake-up interval (e.g., 2.5 seconds); however, the user can change the wake-up interval. The tag wake-up intervals are generally more numerous than the AT intervals; both of these intervals may be programmed by the user. During AT, the tag 14 transmits the mostly recently stored sensor readings (e.g., pressure and/or temperature).

Alarm transmit—the tag 14 may be programmed to self-awaken at preset intervals, examine the most recently stored sensor data, determine if an alarm condition exists (i.e., the sensor data values are outside of a stored threshold), transmit an alarm signal if such a condition exists, and go back to sleep without external activation. The alarm feature can be enabled or disabled by the user. The tag 14 is generally pre-programmed from the factory with a default wake-up interval (e.g., 2.5 seconds); however, the user can change the wake-up interval. If a tire parameter is outside a predetermined threshold (i.e., above or below one of the parameter thresholds allowed for operation of the tire 10), the tag 14 will transmit an alarm signal during an awake mode. If the alarm signal is not acknowledged after some period of time, such as one hour, the tag 14 will cease transmitting the signal to conserve battery power. The tag 14 continues to operate even if the alarm times out. The RT 30 can also acknowledge the alarm signal and command the tag 14 to terminate the alarm signal. Return to a non-alarm state rearms the alarm feature, if enabled by the user.

Security—the tag 14 provides different levels of password protection. The first is at the manufacturer level (the manufacturer may password protect the unique tag identification number) and the second is at the user level (the user may password protect all programmable data, such as user defined data).

Kill tag—the kill tag command erases all the data stored in the memory 16, such as temperature and pressure readings, user defined data, tag history data, etc. This returns the tag 14 to the same condition as when it was first manufactured. Once killed, the tag 14 will no longer respond to any external commands. This feature is password protected. One way to erase all the stored data is to awaken the tag 14 to its most alert state (e.g., the interrogation mode) and initiate all battery consuming operations (e.g., the high-speed clock, RF receiver, sensors, PLL, etc.) until the battery is dead. This function may be used when, for example, the tire 10 is scrapped so no one could obtain potentially useful tire data from the tire.

Erase user data—this function erases all user defined data (e.g., fleet name, parameter thresholds, wheel position data, etc.) and returns the tag 14 to the manufacturer level defaults. This function may be used, for example, when the tire 10 changes owners.

Radio frequency operation—the claimed system preferably operates in the ISM frequency band (902-928 MHz).

Communications—the tag 14 is able to communicate with a RT 30, such as a fixed gate reader 30G, a hand-held reader 30H, an on-board vehicle reader 30V, and/or a surveillance reader 30S, as described herein.

Data display—tag data is displayed in standard units of measurement (e.g., psi for pressure and degrees C. and/or degrees F. for temperature).

Power—the tag 14 is powered by a power source 94 that is included with the tag 14. Typically, the power source 94 is not replaceable (not a maintenance item).

Tag life—given current battery capabilities, total tag life is greater than about 2 years, which is greater than the average life of the tire the tag is monitoring, during normal operating conditions.

Turn-OFF function—the tag 14 is able to recognize when, for example, tire pressure falls below 40 psi (or some other preselected pressure). Such a pressure indicates that the tire 10 is unmounted or the tag 14 is on the shelf prior to being installed on the tire 10. When the tire pressure falls below such a threshold, the tag 14 ceases reporting and storing sensor information. This prevents the tag 14 from operating when it is not needed. However, the tag 14 is able to monitor sensor pressure and look for forward link packets (FLPs) so that it can turn itself ON to a fully functioning state when the tire pressure rises above the threshold (e.g., 40 psi or some other preselected pressure).

Reader range—for a fixed gate reader 30G, the reader range is up to and including at least 10 meters from the tag 14 at any wheel position on the same side of the vehicle 12 as the reader antenna 28 (this range is possible with the vehicle 12 moving up to 20 kilometers per hour). For a hand-held reader 30H reading a stationary tire 10, the range of the reader is about 5 meters from the tag 14 at any wheel position on the same side of the vehicle 12 as the reader 30H. For an on-board vehicle reader 30V, the reader is able to receive signals from the tire tags 14 that are within range of that reader (e.g., on the same side of the vehicle 12 as the reader 30V). The on-board vehicle reader 30V can read the tags 14 while the vehicle 12 is moving up to about 90 kilometers per hour. It is estimated that a surveillance reader 30S can monitor tire tags up to about 50 meters from the reader antenna 28 (while the vehicle 12 is moving up to about 73 kilometers per hour).

Definitions

On demand (or on-site)—round-trip communication where the RT 30 initiates communication, and the tag 14 responds with the most recently stored sensor data representing, for example, temperature, pressure, tire ID, and/or other tire parameter information.

Alarm—one-way communication wherein the tag 14 transmits an alarm signal to a RT 30. The alarm signal may include various information, including an out of range condition (e.g., temperature or pressure), the actual temperature and/or pressure values, etc. An alarm signal is transmitted when one or more of the tire parameters exceed preprogrammed thresholds.

Autonomous transmission (AT)—one-way communication where the tag 14 transmits the most recently stored sensor data (or other preprogrammed data) at periodic time intervals to a RT 30.

Update tire history data—round-trip communication where the RT 30 initiates communication and the tag 14 responds with new tire history data that has not been previously transmitted to a RT 30, including temperature, pressure or other stored data.

Forward link—one-way communication from a RT 30 to a tire tag 14. RTs 30 (except for surveillance readers 30S) periodically transmit an RF signal to one or more of the tire tags 14. Forward link signals are either searching for or directly communicating with one or more tags 14.

Return link—one-way communication from a tire tag 14 to a RT 30. A tag 14 transmits a response (e.g., tag data) to a RT 30 via the return link. Both forward and return link timing and other characteristics of the system are described hereinafter.

Further Description of the Invention

Referring again to FIGS. 1A and 12, the process of acquiring tire data is shown. In the interrogation mode, a RT 30 can acquire sensor and other data from a specific tire tag 14 only when that specific tire tag 14 is being addressed. In one embodiment, the tire tag 14 can be addressed by: (1) a unique ID (e.g., tag serial number); (2) a functional ID; and/or (3) a temporary ID assigned by the RT 30 during a tag interrogation. Tag acquisition is described in more detail hereinafter.

If the RT 30 desires the tire temperature and pressure from a specific tire 10, the RT 30 requests data from specified memory locations in the memory 16 of the tire tag 14 corresponding to the specific tire 10. Those memory locations store the sensor data acquired by the tag 14. This data can be transmitted to a RT 30 via return link packets (RLPs). The RT 30 can also request transmission of the calibration coefficients for the sensors 72, 74 (see FIG. 13). Other information stored in the tag memory 16 also may be requested, including tire type, tire position on the vehicle, vehicle ID, and/or tire ID. Once the requested information has been retrieved, RT 30 instructs tag 14 to go into a sleep mode (e.g., deep sleep mode) for a programmable period of time. Alternatively, the tag 14 may be programmed to return to a sleep mode once the tag is out of range of the RT 30 for a predetermined period of time (e.g., 2-3 seconds). Entering the deep sleep mode completes the tag interrogation session. Thereafter, a new interrogation session can begin.

Preferably, the tire tag 14 is cost effective, uses low power, and complies with FCC Part 15 (47 C.R.F.§15). The maximum allowable power (in free space) without spectrum spreading is −1 dBM. The return link (i.e., tag to reader) has the capability of transmitting on any one of several available radio frequency channels. This provides the tag 14 with a means for avoiding signals from interfering devices. In one embodiment, the tag 14 responds to FLPs on each of the different return link channels, sequentially. In another embodiment, the RT 30 monitors the return link channels and commands the tag 14 to transmit on the channel having the least amount of interference. For autonomous transmission (AT), the tag 14 has the option of transmitting return link packets (RLPs) on any or all of the return link channels.

In one embodiment, there are four return link channels and the tag 14 transmits return link packets (RLPs) on each of the channels, sequentially. For example, if the tag 14 responds to a RT 30 with its serial number on channel 1, the tag 14 will then respond to the next reader command on channel 2. If the RT 30 receives bad data from the tag, it will disregard that data and command the tag 14 to retransmit the data. The tag 14 will then retransmit the data on channel 3. If the RT 30 determines that the received data is again corrupt, it will command the tag 14 to retransmit the data. In one embodiment, retransmission of data will continue until the data has been sent five times (once on each channel, e.g., on channel 1, 2, 3, 4, and 1—the first channel is tried twice). If the RT 30 still does not receive good data, it will cease transmitting to that particular tag 14 for a predetermined period of time.

Alternatively, the RT 30 can monitor the four return link channels, and determine which channel has the lowest received signal strength (RSS), which indicates the channel having the least amount of noise and/or interference. Thus, the channel having the lowest RSS has the least signal interference. Therefore, after the RT 30 determines which channel has the lowest RSS, it sends two bits in a forward link packet (FLP) that correspond to the return link channel having the lowest RSS and instructs the tire tag 14 to transmit return link packets on that channel. The duration of interfering signals can be expected to be on the order of several seconds. Therefore, the RT 30 checks for clear return link channels every several seconds. The RT 30 tunes itself to receive tag signals on the indicated return link channel and transmits a NULL command (all zeros). The NULL command is broadcast to prevent any other tag from responding while the RT 30 monitors the RSS level. The lowest RSS channel becomes the channel to which a specific tag 14 will be commanded to respond, until another channel has been determined to have the lowest RSS. Again, the lowest RSS channel is selected because that channel is open, and not interfering with other transmissions. Each RT 30 has a received signal strength (RSS) indicator, which tells the RT 30 that a tag 14 is attempting to respond. The RT 30 investigates the received signal strength on its incoming return link channels. The RT 30 then sends a forward link packet instructing the tag 14 to respond on the channel having the lowest RSS and monitors that channel for tag transmissions.

During forward link communication, packets are sent from the RT 30 to the tag 14. During return link communication, packets are sent from the tag 14 to the RT 30. The received tag data is then communicated to the reader processor (RP) 32 (see FIGS. 1A and 12).

The forward link uses amplitude shift keying (ASK) modulation. There are 50 channels scattered between 902 MHz and 928 MHz. Using spread spectrum transmission, the maximum allowable power that can be radiated from the reader antenna 28 is +36 dBM. In one embodiment, the data rate in the forward link is 7.5 Kilo-bits-per-second (Kbps).

The return link, which includes up to four communication channels, uses frequency shift key (FSK) modulation. These channels are somewhat evenly spaced between 902-928 MHz.

Under 47 C.R.F.§15, using spread spectrum transmission (i.e., frequency hopping), the maximum allowable power that can be radiated in free space is +36 dBM (without using spread spectrum transmission, the maximum allowable power in free space is −1 dBM). In the forward link, the amount of power transmitted is measured just outside of the tire wall. However, in one embodiment, 10 to 15 dBM is lost by transmitting FLPs through the tire wall. In addition to attenuation resulting from transmission through the tire wall, additional attenuation may occur due to interference from other tires and/or parts of the vehicle 12.

The system transmits far less data/instructions to the tag 14 than vice versa. The data rate of the forward link is 7.5 Kbps and the data rate of the return link is 60 Kbps. The reason for the data rates being asymmetrical is that most of the system complexity is located at the RT 30, rather than at the tag 14. This allows for simpler tag circuitry and enables the tag 14 to consume less power by reading FLP data at the slower rate of 7.5 Kbps. The RT 30 has sufficient sophistication to read the data being returned at 60 Kbps by the tag 14. Additionally, since the tire tag 14 delivers data at a faster rate, it will be ON for a shorter period of time. This is an important advantage because the battery life of the tire tag 14 is an issue to the overall usefulness of the system.

Figure 16:
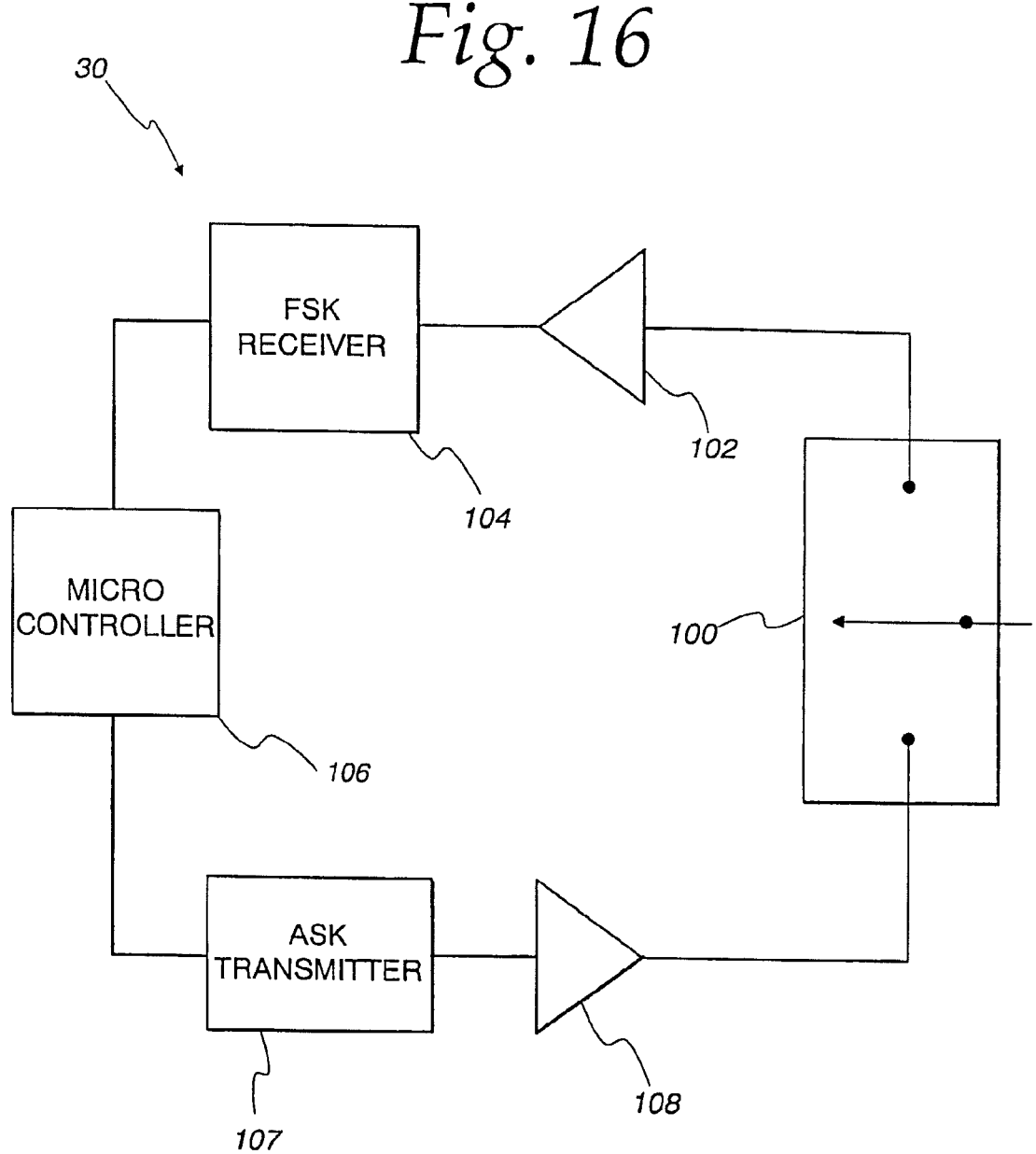
FIG. 16 illustrates a more detailed block diagram of a RT according to one embodiment of the invention.

Turning to FIG. 16, there is shown an overview of the components of the RT 30. A transmit/receive (TR) switch 100 is provided because the communication protocol is half-duplex (i.e., at any one time, the reader/transceiver (RT) 30 either transmits or receives data). This illustrated embodiment of the RT 30 is not used in a multiplex system; therefore, the RT antenna 28 is used in both the transmitting and receiving operations. It is to be appreciated that the RT 30 includes additional components such as filters and the like; however, for simplicity, these circuits are not shown because they are well known in the art. In the receiving path, a low-noise amplifier 102 is on the front end of an FSK receiver 104. Incoming RLP data is transmitted to a microcontroller 106. Each RLP is received by the microcontroller 106 and investigated to determine if it is valid. When a FLP is transmitted to the tag 14, it is first supplied through an ASK transmitter 107 to a high-power amplifier 108. The amplified signal is then sent to the other side of the TR switch 100, which is connected to the reader antenna 28, for transmission to the tag 14.

Fifty forward link channels were selected in part due to FCC Part 15 (47 C.R.F.§15), which specifies 50 channels as the minimum; however, it is apparent that more than 50 channels could be used in this spread-spectrum system. Similarly, the 4 return link channels used for sending data from a tag 14 to a RT 30 may also be varied to a different number of channels.

Where the system is used with multi-tire vehicles, such as large trucks, synchronization of operation is anticipated. Particularly, in using two RTs 30A, 30B as shown in FIG. 12, the first RT may, for example, be designated for one side of the vehicle 12 and the second RT may be designated for the other side of the vehicle 12. Command signals from the first RT 30A on the first side of the vehicle 12 may instruct tire tags 14 receiving its signal to use only specific return link channels, for example, only channels 1 and 3. The second RT 30B on the second side of the vehicle 12 may instruct tire tags 14 receiving its signal to transmit on different return link channels, for example, on channels 2 and 4. This scheme is implemented to reduce the chance of reading data from two different tires simultaneously or reading data from the same tire twice. In situations were two RTs 30 read the same tag 14, either the RP 32 or the FSK receiver 104, or both, are configured to recognize the duplicate data and eliminate such data.

In other situations, it is possible that two tags 14 will awaken at the same time and both be within range of the RT antenna 28. If this occurs, interference may result since both tags 14 may be responding to the same message on the same return link channel. To identify and communicate with one tag out of many tags that may be within range, the RT 30 uses the SAR algorithm, as described below, and/or transmits to a specific tag 14 by transmitting that tag's unique tag serial number or functional ID number.

Figure 17:
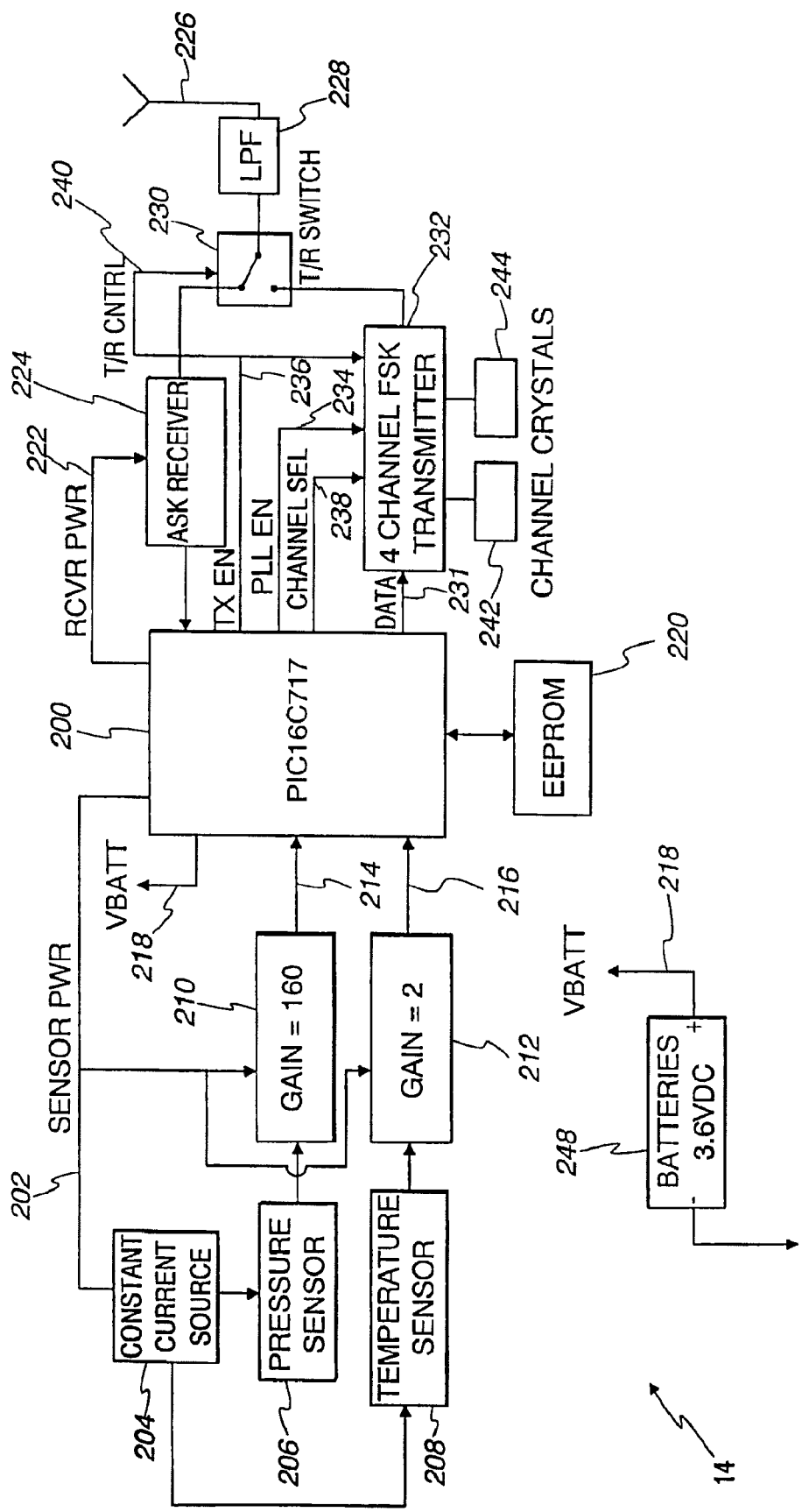
FIG. 17 illustrates a more detailed block diagram of a tire tag according to one embodiment of the invention.

FIG. 17 is a more detailed block diagram of the tire tag 14 illustrated in FIG. 13. A PIC microcontroller 200 receives and transmits various signals for operation of the tire tag 14. The microcontroller 200 may be one manufactured by Microchip Technology Inc., Model PIC16C717 having two internal oscillators, internal RAM, internal ROM, internal A/D converters, and other standard structures. It is to be appreciated that this is one of many microcontrollers that could be used in the claimed system; however, to maximize battery life, two oscillators are desirable because they allow for two clock speeds. Having two clocks allows a designer to minimize use of the high-speed clock (thus, conserving battery power). The two oscillators need not be internal microcontroller oscillators.

The tire tag 14 shown in FIG. 17 has two unique functions that are separate and independent from each other: (1) the data measurement function, and (2) the data reception and transmission function. To perform the first independent function, the microcontroller 200 measures tire parameters by using, for example, pressure sensor 206 and temperature sensor 208. The microcontroller 200 is programmed to periodically awaken to the search mode and (among other tasks) cause the sensors 206, 208 to measure tire parameters. The measured parameters are then sent to the microcontroller 200 and stored in its internal RAM. Upon completion of the search mode, the microcontroller 200 returns to the deep sleep mode.

In the second independent function, the microcontroller 200 checks for FLPs from a reader/transceiver (RT) 30 and, if a valid FLP is received, transmits one or more RLPs to the RT 30. Thus, the data transmission function is independent of the parameter measurement function. Having a separate data measurement function is a unique aspect of this invention that provides advantages over the prior art. When the RT 30 requests a tire parameter stored in the tag 14, the tag microcontroller 200 simply accesses its RAM and sends the most recently stored parameter data to the RT 30. Therefore, the microcontroller 200 does not have to power the sensors 206, 208 in response to an interrogation command from a RT 30. This allows the system to operate faster than prior art systems. Moreover, the microcontroller 200 only has to deal with one function (e.g., data reception and transmission) at any given time, which is independent of another function (e.g., data measurement). The tag 14 either measures a sensor parameter in a first mode or transmits data in a second mode. These functions are independent of each other. The parameter measurement function is not performed in response to any external interrogation command from a RT 30.

Specifically, the microcontroller 200 periodically awakens from the deep sleep mode to the lucid sleep mode. In the lucid sleep mode, the microcontroller 200 initiates the low-speed clock and determines if it is time to enter the search mode by examining a search mode counter. The counter will either indicate that it is time to enter the search mode (e.g., the counter contains all zeros) or it will indicate some other value. If is not time to enter the search mode, the microcontroller 200 adjusts the search mode counter (e.g., decrements the counter) and returns to the deep sleep mode.

Otherwise, the microcontroller 200 enters the search mode, and continues using the low-speed clock. The microcontroller 200 determines if it is time to read the sensors by examining a sensor counter. If it is time to read the sensors, the microcontroller 200 reads and stores data from each sensor sequentially, as described below. Otherwise, the microcontroller 200 adjusts the sensor counter and performs pre-discrimination (i.e., it determines whether a transmission is likely a forward link packet). If the microcontroller 200 determines that the transmission is likely a FLP, it enters the interrogation mode. Otherwise, the microcontroller 200 determines if it is time to perform an autonomous transmission (AT) by examining an AT counter. If it is not time for an AT, the microcontroller 200 adjusts the counter (e.g., decrements the counter) and returns to the deep sleep mode. Otherwise, the microcontroller 200 awakens to the interrogation mode, initiates the high-speed clock, and performs an AT (i.e., it transmits the most recently stored sensor data to a RT 30).

To read the sensors in search mode, the microcontroller 200 issues a signal on sensor power line 202 to activate constant current source 204 which, in turn, activates pressure sensor 206 and temperature sensor 208. Amplifiers 210 and 212 are also turned ON via the sensor power line 202. The amplifiers 210, 212 amplify the analog signals produced by the sensors 206, 208, respectively. The microcontroller 200 includes an A/D converter and digital signal processing code for digitally filtering and smoothing any irregularities in the data from the sensors 206, 208 due to dynamic physical effects occurring to the tire 10. For example, pressure data can be somewhat erratic as the tire 10 moves and flexes as a function of angular position, terrain, and the like. The microcontroller 200 waits a short time period before taking sensor readings to ignore transients from the just turned-ON components 204-212 and to allow the components to assume a normal, steady state operation. Thereafter, the microcontroller 200 performs A/D conversion of the amplified sensor signals on input lines 214 and 216. Signal line 214 carries amplified pressure sensor data that will be stored in the microcontroller RAM. Similarly, signal line 216 carries amplified temperature sensor data that is also stored in the RAM of the microcontroller 200. At the end of the search mode, the microcontroller 200 turns OFF power to sensor power line 202, thereby placing elements 204-212 in an inactive mode. Power is supplied to the microcontroller 200 via an input pin connected to battery 218.

A serial EEPROM 220 is used for storing configuration values and history data including min/max sensor values, consecutive data samples, and the like. This data is periodically written from the microcontroller RAM to the EEPROM 220. The EEPROM is a non-volatile memory; therefore, it does not need power to maintain its information, and can be turned off to conserve battery power.

To perform the second function (i.e., data reception and transmission), the microcontroller 200, during the search mode, performs pre-discrimination to determine whether a transmission is likely a forward link packet from a RT. If the microcontroller 200 determines that the transmission is likely a FLP, it enters the interrogation mode and determines whether the transmission is a valid FLP. As an initial step, tag receiver power is supplied from the microcontroller 200 to the ASK receiver 224 on line 222. In one embodiment, the tag receiver 224 is constructed as a diode detector with gain-enhancement transistors. A well known comparator circuit is associated with the receiver 224 in order to detect the forward link data. The data signals received by tag antenna 226 are supplied through a low-pass filter 228 to an ASK receiver 224 via a transmit/receive (TR) switch 230. The TR switch 230 is set to a receive state during periods of data reception. Data signals from the receiver 224 are provided to the microcontroller 200. During data reception in the interrogation mode, the microcontroller 200 determines if a transmission is a valid forward link packet. FLPs include command signals that instruct the tire tag 14 to supply information, such as sensor information, tag location, user defined data, etc. The obtaining and storing of pressure and temperature sensor data is a separate function (as stated earlier) that is independent of the data reception function (i.e., searching for valid forward link packets from a RT 30).

In the interrogation mode, the tag 14 can receive and transmit data. Upon entering the interrogation mode, the microcontroller 200 initiates the high-speed clock, examines a first portion of the FLP (e.g., the first four bytes) and, if that portion indicates that the transmission appears to be a valid FLP, turns ON the Phase Lock Loop (PLL) stage of the transmitter 232 via the enable line 234, and then reads the rest of the FLP (e.g., the last two bytes) to check whether the CRC is valid. If the FLP contains a valid CRC, the tag 14 responds to the FLP.

The PLL is turned ON after reading only a portion of the FLP because the PLL requires a certain amount of time to lock on the selected return link channel. The transmitter 232 is turned ON by activating the transmit enable line 236, which enables the high-powered amplifier stage of the transmitter. Once the FSK transmitter 232 is activated, the data requested by the FLP, which may include the previously stored pressure and temperature data, is provided by the microcontroller 200 to the FSK transmitter 232 on data line 231. In order to transmit this data, the TR switch 230 is changed from the receive state to a transmit state. The data is then sent through the low-pass filter 228 and transmitted via tag antenna 226. Upon completion of the interrogation mode, the microcontroller 200 turns OFF the tag components (such as the PLL, the transmitter, the sensors, the high-speed clock, etc.) and resumes the deep sleep mode. This concludes the second independent function of the microcontroller 200 (i.e., data reception and transmission).

In one embodiment, the FSK transmitter 232 is designed to transmit on four distinct channels. Channel select line 238 is provided to the FSK transmitter 232 in order to allow selection of a particular one of the four channels available to the FSK transmitter 232. It should be noted that only one of the four transmission channels is normally used during any individual RLP transmission.

Therefore, in performing the second data reception/transmission function, the microcontroller 200, in the search mode, performs pre-discrimination to investigate whether a transmission is likely a FLP from one of the RTs 30. If the microcontroller 200 determines that the transmission is likely a FLP, it enters the interrogation mode. Otherwise, the tag 14 again enters the deep sleep mode for a predetermined period of time. In the interrogation mode, the transmission is verified as a valid FLP and the requested data stored in the tag 14 is transmitted to the RT 30 once all the proper transmission safeguards and protocols have been followed. This cycle of sleeping, awaking, searching for FLPs, and either transmitting data or re-entering deep sleep mode is a continuous function of the tag 14.

Referring again to FIG. 14, the various modes of the tire tag 14 and the timing of these modes are illustrated, according to one embodiment of the invention. As shown, the tag 14 is in the deep sleep mode for about 600 ms. It then transitions to the lucid sleep mode for approximately 25 ms. If it is time to enter the search mode, the tag 14 further awakens to the search mode and performs pre-discrimination (i.e., determines if a transmission appears to be a FLP) for a predetermined amount of time. If the transmission is not likely a FLP, the tag 14 simply resumes the deep sleep mode for another 600 ms. The tag 14 then repeats this process until a transmission is detected that appears to be a FLP. At that time, the tag 14 fully awakens to the interrogation mode to look for valid FLPs. The tag 14 then responds to a valid FLP by, for example, transmitting stored data regarding tire temperature and pressure to the RT 30. It should be noted that the above timing is programmable by the user. The time at which a RT 30 seeks to acquire sensor data from a tag 14 is also programmable by the user. During the search mode, the tag 14 also measures and stores tire parameter data at predetermined times. These times are typically different than the times when pre-discrimination is performed. In one embodiment, the sensor data is read by the tag 14 every 30 seconds. In addition, there may be occurrences when the tag 14 is attempting to autonomously communicate with the RT 30 (e.g., send an AT).

Referring again to FIG. 17, the transmit/receive control signal on line 240 is controlled by the transmit enable signal on line 236. Crystals 242 and 244 control the frequency of the four return link channels. The combination of crystals 242 and 244, the phase lock loop (PLL), and a frequency divider provide the four FSK frequencies for the four return link channels in a known manner.

The return link channel to be used for transmission by the tag 14 may be determined in a number of ways. The tag may select the return link channel sequentially (i.e., use a different return link channel for each RLP). Alternatively, the RT 30 may instruct the tag 14 to use a specific channel. One way to determine the best return link channel to use is to have the RT 30 send a NULL command, which causes the tags 14 not to transmit. This allows the RT 30 to determine the received signal strength (RSS) on each of the four return link channels. Thereafter, the RT 30 instructs the tag 14 to send its response back on the return link channel having the lowest signal strength (i.e., the least amount of noise/interference).

In one embodiment, the microcontroller 200 requires an external crystal, such as a 4 MHz crystal, for generating its internal clock. In another embodiment, the microcontroller 200 is the model PIC16C717, made by Microchip, Inc., which includes two internal oscillators for producing a low-speed clock (37 KHz) and a high-speed clock (4 MHz). Therefore, an external crystal is not required for the PIC16C717 microcontroller. In yet another embodiment, the microcontroller 200 uses two or more external crystals (or one crystal and a frequency divider) to generate two or more clocks having different frequencies. The tag 14 preferably includes different clock speeds for performing different functions so as to conserve power. It uses a lower speed clock to perform most of its functions, and minimizes the amount of time a higher speed clock is used, which consumes more tag power. Conservation of power is also why the tag 14 preferably includes different modes of operation, including a sleep mode.

The tag 14 transmits alarm signals to the RT 30 to allow, for example, a surveillance reader or an on-board vehicle reader to detect that a tag 14 has sensed a tire abnormality. When enabled, alarm conditions will initiate transmission of autonomous transmission (AT) packets. Alarm conditions include over-temperature and/or over/under-pressure conditions, as determined by the tag sensors 206, 208. The alarm thresholds are programmable; thus, both maximum and minimum set points may be selected for each tire parameter (e.g., temperature and pressure). Once the tag 14 detects that the temperature exceeds the threshold value stored in its memory or that the pressure is either above or below the preset thresholds, the tag 14 will initiate an alarm signal.

A. Tire Temperature Correction

As tires are run in service, they do work by flexing. This flexing is caused, at least in part, by supporting a load as a vehicle moves from one location to another, absorbing bumps and shocks, and providing cornering and traction for enabling movement of the vehicle. This work results in the generation of heat within each tire. Ultimately, this heat is dissipated by the tire through, for example, conduction to the rim and vehicle suspension, radiation, convection to the surrounding atmosphere, and conduction to the ground or roadway with which the tire is in contact.

In general, the temperature increase that a tire experiences in service is determined by the loads that the tire supports, the speed at which the vehicle travels, and the maneuvering that the vehicle undergoes as it travels. The more extreme these factors are, the more heat generation occurs. An additional factor to the heat generation of the tire itself is the inflation pressure of the tire. A tire that is under-inflated will work harder (i.e., flex more) under a given operating condition than one that is properly inflated. The harder working tire will generate more heat. Further, the presence of other heat generating components on the vehicle, such as brake drums or drive motors may contribute heat to the tire.

Each tire produced by a tire manufacturer is designed for a specific inflation pressure and a certain load bearing capacity at that inflation pressure. Rather than specifying a particular inflation pressure for a particular operating temperature, tire manufactures have agreed upon a convention whereby a Target Cold-Fill Inflation Pressure is specified for the tire. The Cold-Fill Temperature is a constant, reference temperature, generally set equal to 20 degrees C. (68 degrees F.). Tires which are properly inflated to the specified Target Cold-Fill Inflation Pressure at the specified temperature (e.g., 20 degrees C.) will, in general, function satisfactorily within the specified load carrying capacity, subject to other use conditions that a particular manufacturer may specify, such as speed, etc.

In certain operating circumstances, such as mining operations in particular, the tires may spend a considerable amount of time operating at or near the design load capacities. In these circumstances, the tires are stressed as fully as possible in order to maximize equipment utilization in the production process, and as a result the tires generate heat. The size and mass of the tires in these types of operations are large and provide an enormous amount of thermal mass, which makes cooling through the means described earlier a slow process. Tires in such an environment seldom experience sufficient downtime to allow for the tire to cool to the same temperature as the ambient air, so that measurements of the Cold-Fill Inflation Pressure at cold-fill temperatures is difficult and infrequent. Consequently, most inflation pressure measurements after a tire has gone into service are done at temperatures other than the cold temperature the tire was at when initially inflated. These measurements are termed Hot-Inflation Pressure measurements.

Because the air volume contained within the tire and rim structure is a closed system, with no significant addition or loss of air other than through intentional actions (by a tire mechanic) or unintentional actions (through injuries to the tire structure), the system is governed by the ideal gas law, represented by:

$$PV=nRT$$

where, P=pressure exerted by the gas
V=volume of the chamber containing the gas
n=number of moles of gas contained within the system
R=a constant specific to the gas within the system
T=temperature of the gas;
with all units being expressed in SI (System Internationale) convention. The value of R is fixed and dependent upon the specific mixture of gas within the tire, which is generally compressed air or, in some instances, nitrogen. Some tires also use Ultraseal Tire Life Extender, from Ultraseal International, Inc.'s, on the interior of the tire. Assuming no additional air is added or lost, the value of n is also a constant. Because the tire structure, although deformable, is essentially inextensible owing to the presence of body cords in the form of textiles or steel, the value of V (the volume of the chamber defined by the tire and rim structure) is a constant, at least as a first approximation. The only variables in this equation then become the temperature and the pressure of the gas. Hence, $$PV=nRT \text{ and } k=T/P=V/nR \text{ (a constant)}.$$

As stated earlier, when tires heat, the internal tire pressure increases and, when measured, may indicate that the tire is properly pressurized when in fact it may be seriously under pressurized. A tire that is under-inflated will work harder under a given operating condition than one that is properly inflated.

The present invention enables the equivalent ambient (cold) pressure of the tire 10 to be determined for any current (hot) tire pressure and temperature through the use of combined gas laws (both Charles' and Boyle's Law). This is important because, even though the measured tire pressure may appear to be sufficient, the calculated cold tire pressure may indicate insufficient pressure in the tire for the current measured temperature. Thus, the present invention determines the equivalent ambient (cold) tire pressure by using the current (hot) tire temperature and pressure.

The inventive method of determining the equivalent cold-fill pressure of a tire differs from the predictive method disclosed in U.S. Pat. No. 6,025,777. The example given therein at column 10, lines 8-21 illustrates "prediction" of a future pressure and permits pre-adjustment of tire pressure based on future needs. The patent does not determine the actual current pressure based on preset standards. Moreover, this patent does not use the combined gas laws for this purpose. In contrast, the present invention uses the current (hot) pressure and temperature to calculate, using the combined gas laws, the corresponding cold pressure at ambient temperature.

As a tire undergoes work as described earlier, and heats up during the course of that work, the tire will exhibit a corresponding increase in inflation pressure as governed by the simplified equation above. If the air chamber temperature and inflation pressure of a tire was measured at two different points in time, t1 and t2, the corresponding values of temperatures and pressures should be related by the equation:

$$k1=k2=T1/P1=T2/P2$$

where, P1=pressure at time t1 (cold-fill reference pressure specified by the tire manufacturer) (in SI units)
P2=pressure at time t2 (current hot pressure) (in SI units)
T1=temperature at time t1 (cold-fill reference temperature—20 degrees C.)
T2=temperature at time t2 (current hot temperature) (in degrees C.).

Moreover, if the temperature and inflation pressure was measured at time t2, and if the temperature at time t1 was known, the pressure at time t1 could be easily calculated. To go one step further, if time t1 is the time at which the tire in question was initially inflated and was at an ambient temperature (which, for explanation purposes is assumed to be 20° Celsius.), and if the temperature and pressure at time t2 represent the operating condition of the tire after having been in service for some arbitrary period of time, then the Equivalent Cold-Fill Inflation Pressure (P1 in this instance) can be calculated from the previous equation. This value can then be compared to the Target Cold-Fill Inflation Pressure as specified by the tire manufacturer for that tire to determine if the tire is properly inflated.

In practice, today, one may easily measure the Hot-Inflation Pressure of a tire in service using a handheld pressure gage. However, without also knowing the temperature of that tire's internal air chamber, one can only guess as to the Equivalent Cold-Fill Inflation Pressure of that tire. Various means may be employed to also measure the air chamber temperature, such as inserting a thermocouple probe through the valve stem into the tire chamber. However, such measurements take time and manpower and detract from the service time of the vehicle since it must be at rest in a safe location to make such measurements.

In most instances today, only Hot-Inflation Pressure measurements are taken and certain assumptions or comparisons are made to determine if a particular tire needs service. The data thus obtained, however, can be misleading in making assumptions about the Equivalent Cold-Fill Inflation Pressure, as the following example can illustrate.

Consider two tires operating on the same vehicle that are both inflated initially to 100 psi Target Cold-Fill Inflation Pressure and that these measurements are done at 20° Celsius. using the same calibrated pressure gage. Place the vehicle into service and after some considerable period of time (perhaps 3 days) measure the Hot-Inflation Pressure with the same calibrated pressure gage. A typical result may be that both tires indicated Hot-Inflation Pressures of 117 psi. Since both tires indicate the same Hot-Inflation Pressure and no tire temperature information is known, it might be assumed that:

both tires have risen to the same temperature, the temperature rise has created a pressure response in accordance with the equations presented above, and the Equivalent Cold-Fill Inflation Pressure for both tires is still 100 psi.

This would be a reasonable assumption since it would be unlikely for both tires to have experienced identical changes in Equivalent Cold-Fill Inflation Pressure due to air loss and they are in similar service owing to the fact that they are on the same vehicle. One would likely leave these tires in service without further attention.

In fact, the situation may be very grave. It may be that the first tire matches the above assumption, and has an Equivalent Cold-Fill Inflation Pressure of 100 psi and a corresponding tire chamber temperature of about 65° Celsius., a perfectly normal condition for the operation circumstances described. Tire number two, however, may actually have a puncture that has allowed the tire to bleed some air. Because it has lost air, it is under-inflated and it is now doing more work and has heated up the air chamber to a temperature of about 97° Celsius. That higher temperature causes a higher pressure (per the equation above) and so the Hot-Inflation Pressure reading is truly 117 psi. However, the combination of 97° Celsius. and a Hot-Inflation Pressure of 117 psi yields an Equivalent Cold-Fill Inflation Pressure of no greater than 90 psi.

This tire is now at least 10 psi under-inflated, and may be so hot because of this actual under-inflation that the rubber is cooking and the tire is close to failure. However, without knowing the tire air chamber temperature, this information cannot be derived and the tire may be allowed to remain in service without receiving any attention.

By knowing the actual Hot-Inflation Pressure and actual tire chamber temperature, the Equivalent Cold-Fill Inflation Pressure can be readily calculated and tires that are in need of service, such as being under-inflated, can be attended to immediately. The other tires that require no service can then be given no attention other than a routine visual inspection. In this way tire servicing can be directed to only problem tires and efficiency in servicing can be achieved. In addition, early identification of problems such as leaks can lead to immediate service which can potentially eliminate further damage to the tire and associated costs such as new tire, servicing time, equipment damage, lost equipment utilization, potential collateral damages or personal injuries. All of these benefits can be provided by the present ETMS (Tire Tag System) which reports Hot-Inflation Pressure and actual tire chamber temperature. These reports will be provided automatically without any operator intervention and the calculation of Equivalent Cold-Fill Inflation Pressure will be available for evaluation. The ETMS system will also be capable of instantaneously comparing the calculated Equivalent Cold-Fill Inflation Pressure to the known Target Cold-fill Inflation Pressure and automatically alarm personnel to the need for attention or service to a particular tire.

Figure 18:
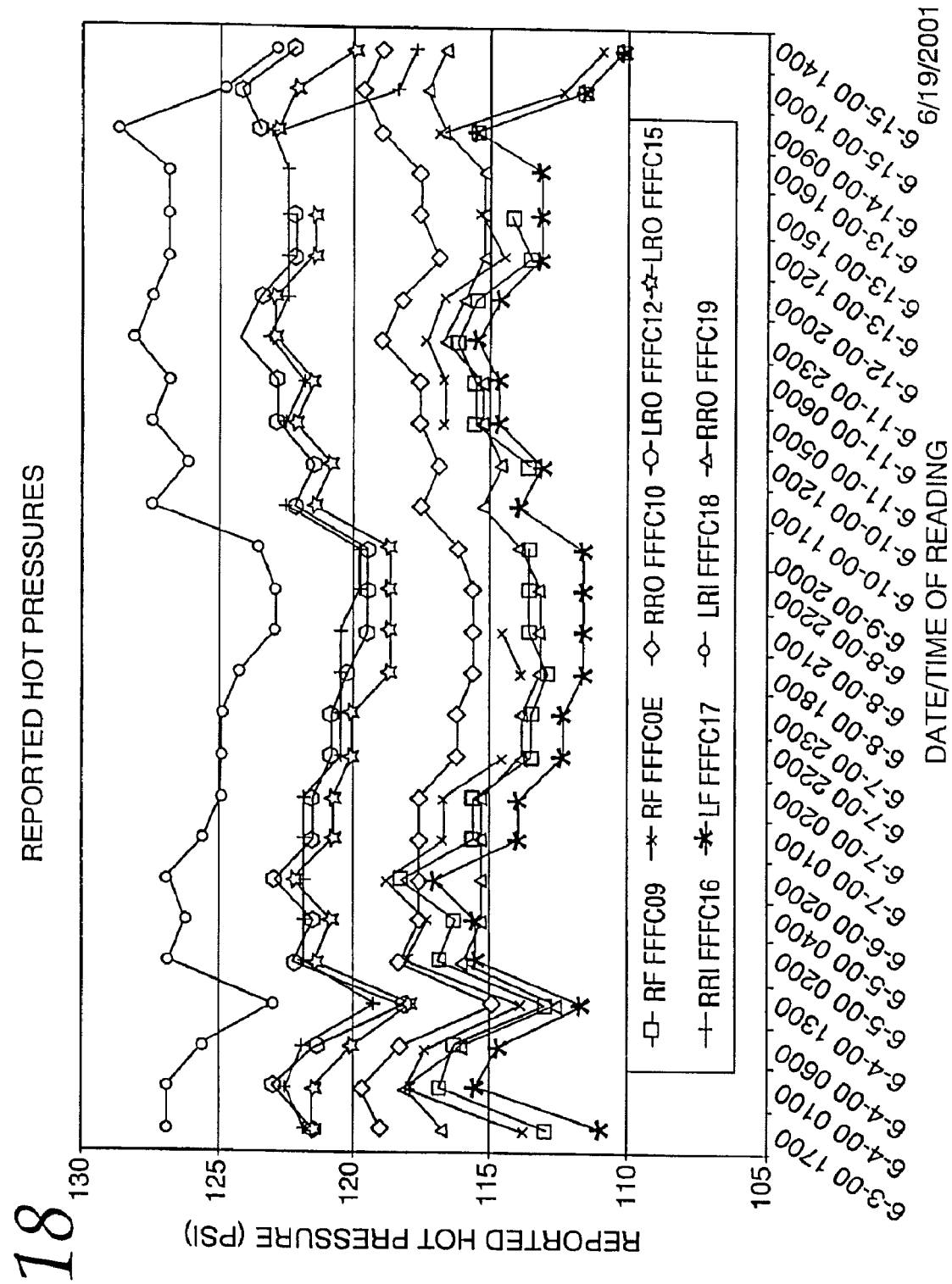
FIG. 18 is a graph of the reported hot pressures for a number of tires in different locations on a vehicle taken at given times over a number of days.
Figure 19:
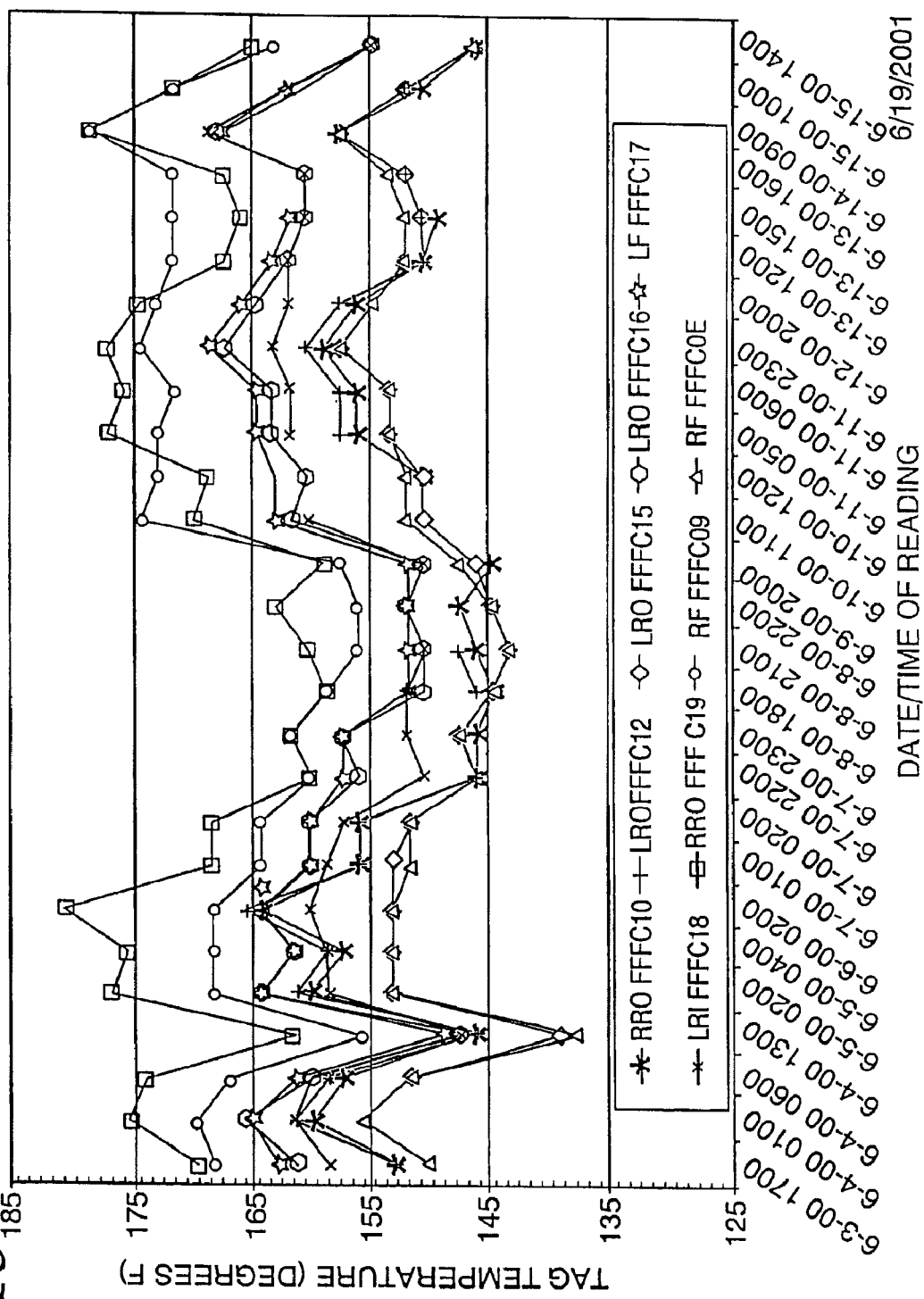
FIG. 19 is a graph of the reported hot temperatures for the same tires in FIG. 18 taken at the same given times and days.
Figure 20:
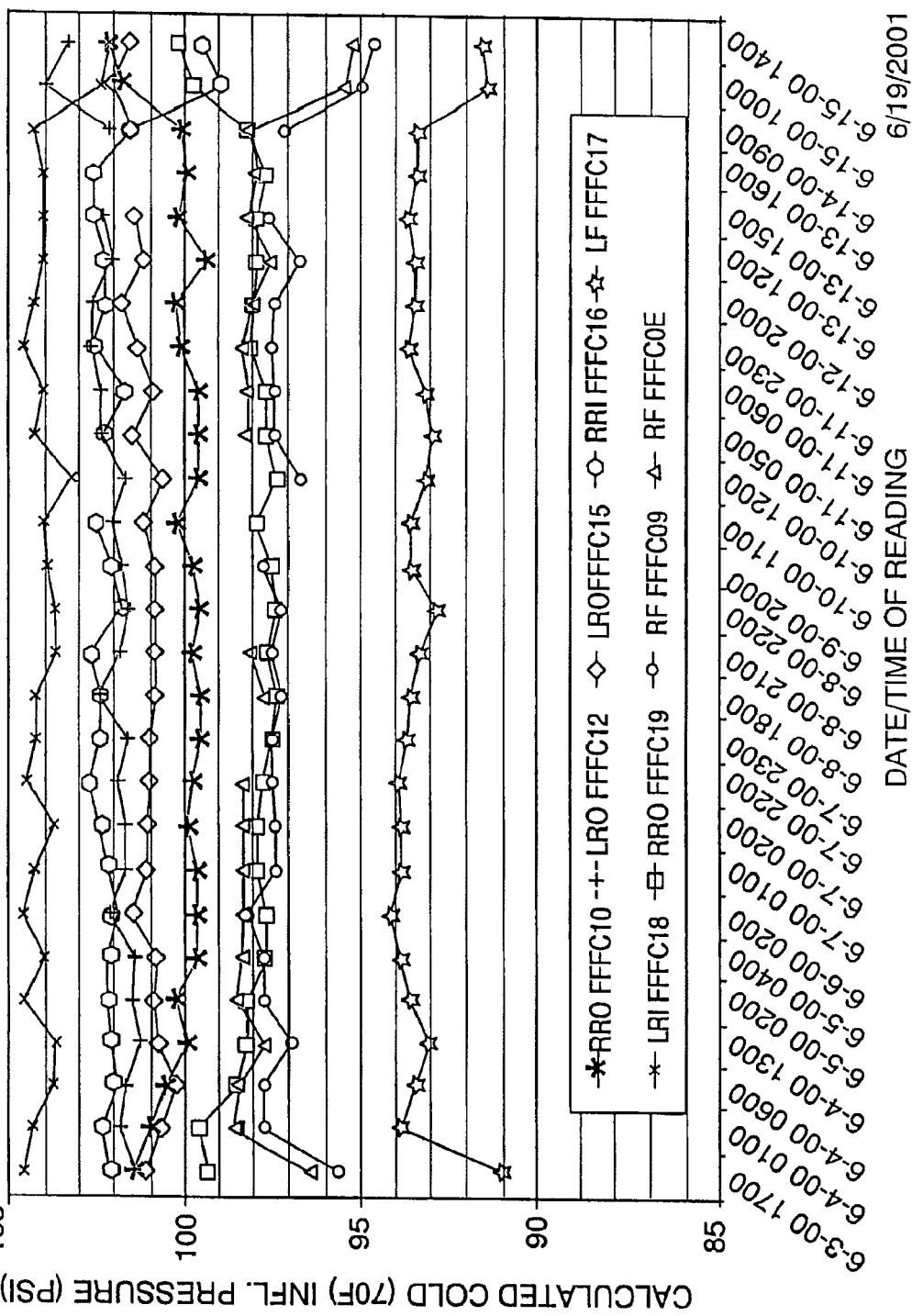
FIG. 20 is a graph of the calculated cold inflation pressures for the same tires in FIG. 18 for the same given times and days.

FIGS. 18-20 are graphs illustrating data from actual tire measurements which illustrate the problem of trying to calculate the Cold-fill Inflation Pressure. Consider, for instance, the data representing LF fffc17 tire (left front) on all three graphs. Note that the reported hot pressure in the graph in FIG. 19 is between approximately 111 and 117 psi. This is an acceptable hot pressure. Note, however, the reported hot temperature, in FIG. 20, for the left front tire is very high, between about 160° and 180° F. The graph of FIG. 20 shows that the calculated cold inflation pressure of that tire is between 91 and 94 psi, an unacceptable condition illustrating that a problem has occurred with that tire.

B. Vapor Pressure Correction

Furthermore, the present invention compensates for tire vapor pressure by correcting measured tire pressure according to the vapor pressure in the tire. To obtain the pressure of gas collected over a fluid in a tire, the partial pressure of the fluid must be taken into consideration. Physics indicates that liquids exert pressure as they change from the liquid to a gas state. This pressure is known as "vapor pressure". Normally this would not be a factor for the ETMS pressure measurements except for the use of liquid cooling products in tires. These products contain mostly water and it is assumed that enough of the coolant is added to the tire that there is always liquid present at the maximum operating temperature of the tire. Given these assumptions, the ETMS system corrects for water vapor pressure based on the temperature of the tire if a coolant is used. The use of a coolant must be indicated in the data base for the correction to be used.

The vapor pressure adds to the measured tire pressure. To correct for this additional measured pressure, the computed vapor pressure contribution is subtracted from the measured pressure. This vapor pressure is computed using the following equation:

$$P_{vp}=(2.4\times10^{-6})*e^{[0.0433(\text{Temp}+273)]} \text{ (in SI units)}$$

The partial pressure of fluids, such as water, Tire Life, or other known liquids, can be obtained from well known tables for each fluid. The tables include the gas temperature in given increments and a corresponding partial pressure for each given temperature increment. By programming the microcomputer 200 with the proper values from the appropriate tables, the tag 14 or the RT 30 can compensate for vapor pressure in the tire 10 in a well known manner, as discussed above.

C. Elevation Pressure Correction

Furthermore, because ambient (cold) tire pressure varies with altitude, the present system can calculate what the ambient (cold) pressure should be based upon the elevation of the site where the tires are being used. This pressure compensation is performed in order to provide a more accurate result pressure reading. The ETMS system measures pressure as an absolute pressure. This information needs to be presented in a form that is relevant to the location of the system. That is, the reported gage pressure should agree with a pressure measured on site. The absolute pressure measured by the ETMS system must be converted to gage pressure based on the elevation of the site. This conversion is done by subtracting the atmospheric pressure at the site from the absolute pressure. The atmospheric pressure is computed using the following equation:

$$P_{atmos}=(6.6\times 10^{-9})*(Elev^2)-0.00053*Elev+14.69$$
(in SI units)

In one embodiment, the tag 14 gives the absolute cold pressure of the tire and, if the elevation is known, this pressure can be corrected to account for the elevation of the site.

Additional Description of the Invention

As mentioned above, the tag 14 has several modes of operation. In one embodiment, the tag periodically awakens from the deep sleep mode to the lucid sleep mode to determine if it is time to enter the search mode by sampling a search mode counter for a NULL value. If the counter contains all zeros, the tag 14 enters the search mode. In the search mode, the tag 14 performs at least two independent functions: (1) it takes and stores sensor measurements, and (2) tests for the likely presence of forward link packets. If pre-discrimination indicates that a received transmission is likely a FLP, the tag 14 enters the interrogation mode where it verifies that the FLP is valid, and if so, responses thereto. The process of reading valid FLPs continues until the interrogation is complete. The tag 14 then returns to the deep sleep mode.

When no tags 14 are within range of the RT 30, there obviously will be no response to a RT interrogation. When a tag 14 comes into view of the RT 30, however, one way to detect and identify a specific tag 14 is by using a unique successive approximation routine (SAR) algorithm. This algorithm identifies a tag by an identification number (such as the unique tag serial number and/or tire identification number). Another way to identify a specific tag 14 is by using a functional ID (FID) number and/or a temporary ID number. Identification by FID should be used in instances where fast acquisition is required and there is no need for information beyond standard tire location and simple tire parameter readings, such as pressure and temperature.

In one embodiment, a tag 14 can be identified by its factory encoded serial number (which is unique to each tag), its FID number (which is a short number (typically between 0-63) that identifies the tag and its location on the vehicle), or a temporary ID number (which is a short number that identifies the tag only during a particular interrogation session). The SAR process is used to identify a tag by its unique ID (e.g., its serial number). The unique ID may take longer to acquire but it is more versatile than the functional ID number. Using a 24-bit tag serial number, over 16 million unique tags can be identified.

Figure 21:
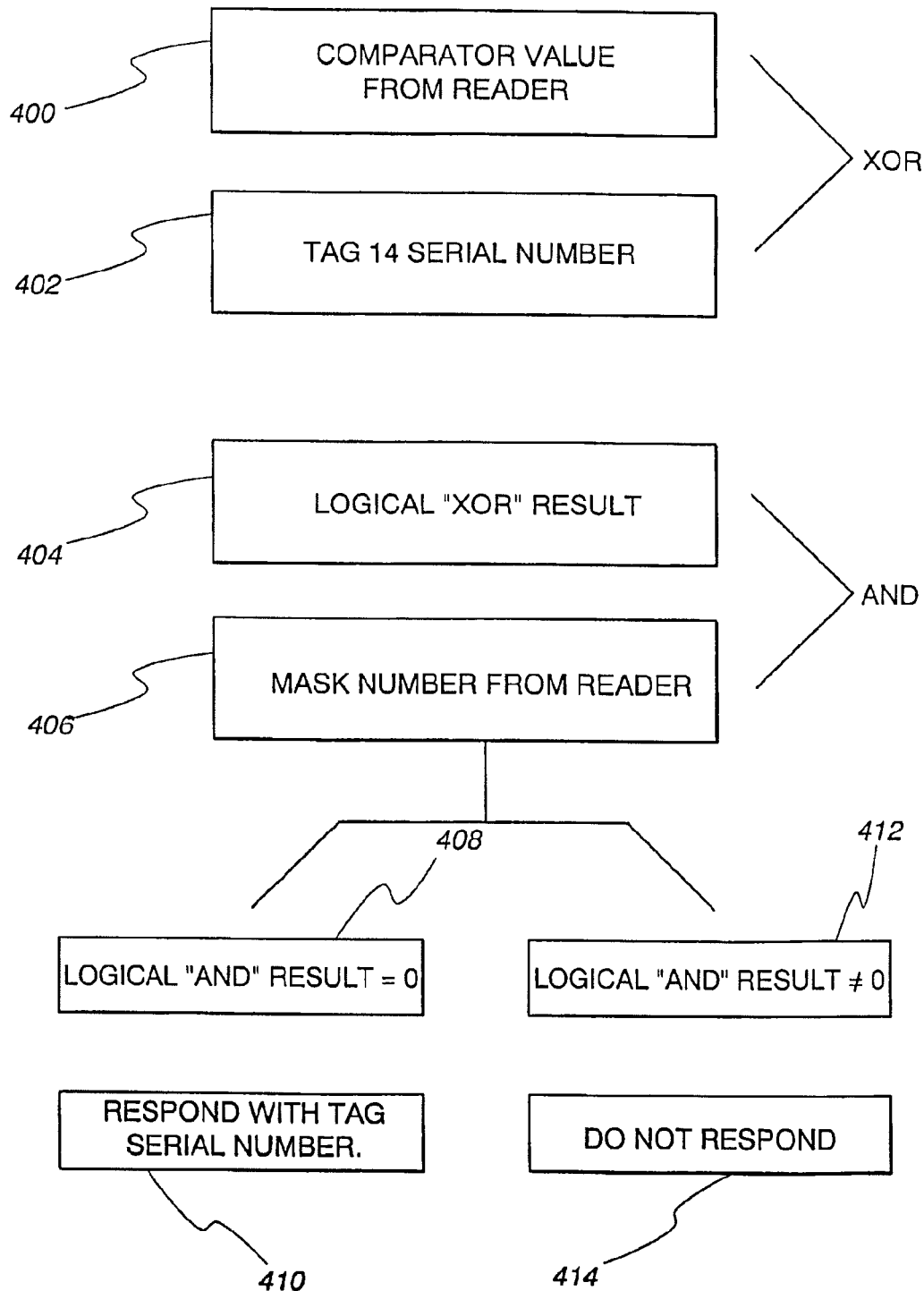
FIG. 21 is a flow chart depicting a tag successive approximation routine (SAR) flow diagram.
Figure 22:
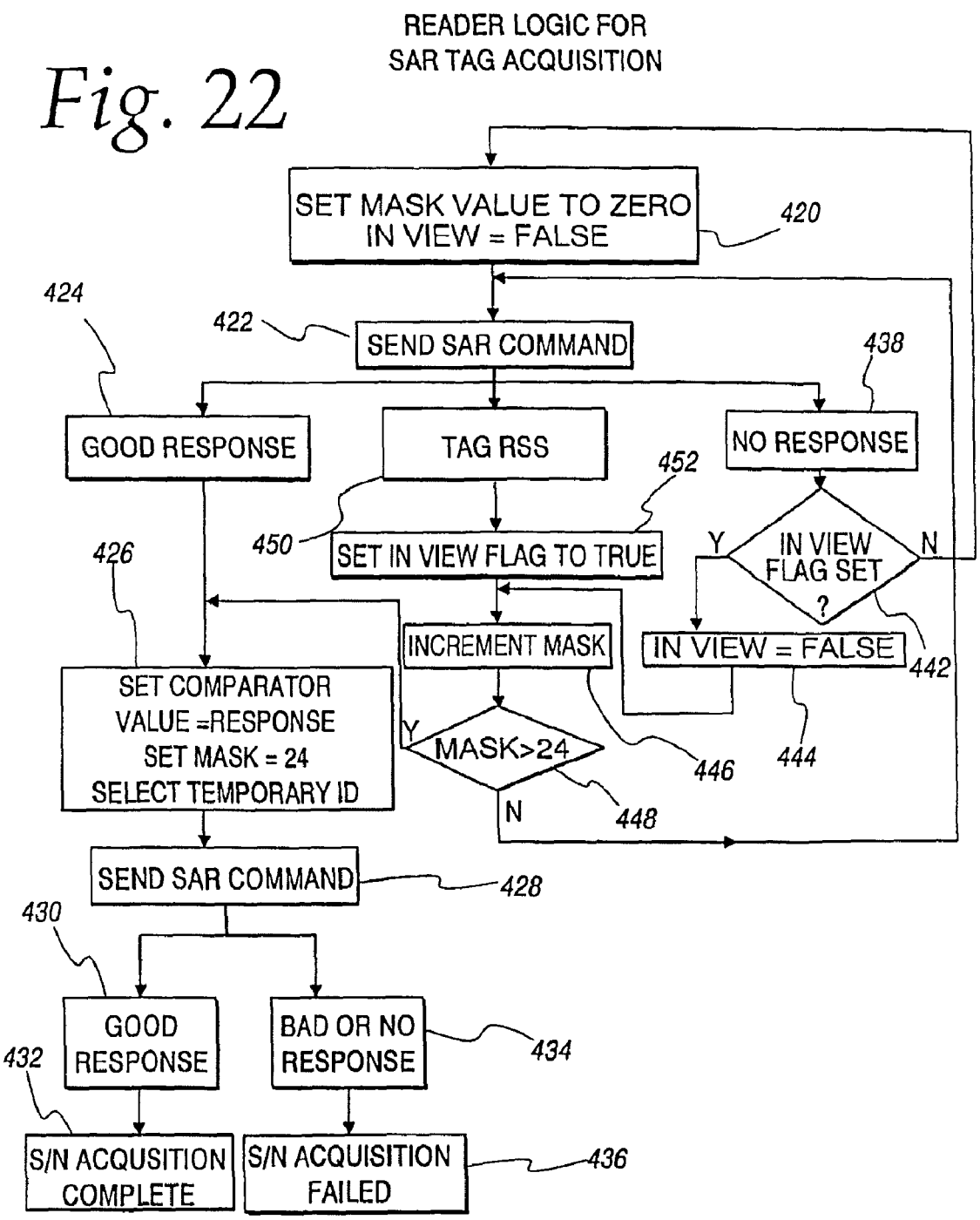
FIG. 22 is a flow chart depicting a reader SAR flow diagram.

One embodiment of the unique successive approximation routine (SAR) is illustrated in the flow charts shown in FIGS. 21 and 22. The RTs 30 take readings from the tags 14 mounted on tires 10 that are moving into view of the RT antenna 28. The SAR process shortens the time required to identify a particular tag, speeds up the communication process, expedites reading data from a specific tag 14, and conserves energy.

In the embodiment of FIGS. 21 and 22, each tag 14 is identified by a 3 byte integer (24-bit) tag identification number (thus, over 16 million tags can each have a unique tag serial number). These serial numbers are read using the successive approximation routine (SAR). This command and response algorithm interrogates each bit of all viewable tags in a manner that allows the RT 30 to zero in on a unique tag serial number within a maximum of 24 command cycles. A command cycle is defined as sending one FLP command signal to a tag and receiving one RLP response. This algorithm can be used to identify an unknown tag serial number (among many tire tags) by comparing a masked comparator value having a certain number of bits to the serial number of a specific tag. The SAR algorithm further includes sequentially incrementing a mask value by one to reveal another bit of the masked comparator value. The modified masked comparator value is then compared with the serial number of the tag until there is a match. When the tag 14 detects a match, it responds to the FLP command signal. In one embodiment, the comparator value is 24 bits and the mask value is 5 bits.

A flow chart showing the SAR logic from the standpoint of the tire tag 14 is illustrated in FIG. 21. The tag microcontroller 84 performs a logical XOR operation between a comparator value received from the RT (e.g., 10 Hex) (block 400) and that tag's unique tag serial number (e.g., 12 Hex) (block 402). The logical XOR result is provided in block 404. A logical AND operation is performed between the result in block 404 and a mask number received from the RT (e.g., 01 Hex) (block 406). If the logical AND result is zero (block 408), then the comparator value matched the tag serial number. Thus, the tag 14 responds with its serial number (block 410) to confirm that the RT has acquired the right tag. If, in block 412, the logical AND result is not equal to zero (as in the case of this example), then the process must continue. Therefore, the tag 14 does not respond (block 414).

A flow chart showing the SAR acquisition process from the standpoint of the RT is shown in FIG. 22. Initially, all of the mask bits are set to logic zero and the tag In View flag is set to false (block 420). The SAR command is then transmitted (block 422). When all the mask bits are logic zero, the comparator value that is transmitted is all zeros. Transmitting this NULL command instructs all the tags 14 in range of the RT 30 to respond.

The RT 30 then monitors the RSS level on the return link channels to determine if any tags are within range (block 450). If the level of the RSS indicates that one or more tags 14 are within range of the RT 30, then the tag In View flag is set to true (block 452). The RT 30 then increments the mask value by one (block 446) (i.e., the first bit of the comparator value is revealed). In block 448, the RT 30 determines whether the mask value is greater than 24. If it is not, the RT 30 sends another the SAR command containing the modified comparator value (block 422) and this process continues until a tag responds or until the mask value is equal to 24 (i.e., the entire 24-bit comparator value is transmitted). If the mask value is greater than 24, the RT proceeds to block 426 where tag acquisition verification is performed, as described below.

Alternatively, if the RT 30 receives a good response from one tag (block 424), then the RT has acquired the tag. A good response is a return link signal having good RSS and a good CRC. To verify that the RT acquired the right tag, the comparator value is set equal to the response value from the tag 14 (i.e., its serial number) and the mask value is set equal to the full mask value of 24 (block 426). Setting the mask value to 24 allows the entire 24-bit response value to be sent to the tag 14. The RT 30 also selects a temporary ID number to assign to the tag 14 to simplify further communication with that tag. The RT 30 then sends an SAR command to the tag 14 that includes the unmasked comparator value (which equals the response value) and the temporary ID number (block 428). If the RT 30 receives a good response from the tag 14 (block 430), then serial number acquisition is complete (block 432). If there is no response or a bad response to the SAR command (block 434), then serial number acquisition failed (block 436).

Alternatively, there may be no return link response (block 438), which indicates that no tags are in range of the RT 30 that match the current mask value. The RT 30 then determines if the In View flag is set (block 442). If it is not set, the RT 30 starts a new SAR command (block 420). Otherwise, if the flag is set, the RT 30 clears the In View flag in block 444 and continues to block 446. In block 446, the mask value is incremented by one. In block 448, the RT 30 determines whether the mask value is greater than 24. If it is not, the RT 30 sends another the SAR command (block 422) and this process continues until a tag responds or until the mask value is equal to 24 (i.e., the entire 24-bit comparator value is transmitted). If the mask value is greater than 24, the RT proceeds to blocks 426, where the comparator value is set equal to the response value from the tag 14 and a temporary ID number is assigned, as described above.

Although a temporary ID is described above, the RT 30 can select a specific tag to communicate with by using the full tag serial number, a functional ID, a temporary ID, or any other unique identifier.

Referring to FIG. 12, the RP 32 gathers information received from the RTs 30A and 30B and runs a scheduler 33 for issuing commands to the RTs 30A and 30B. The scheduler 33 creates a schedule of commands that are to be transmitted by one of the RTs. For example, one command may be to instruct the RT 30 to transmit a temporary ID number to the tire tag 14 once a particular tire tag 14 has been acquired by one of the RTs 30A, 30B. Such decisions are made by the RP 32. Data is transmitted over a communication channel such as, but not limited to, a wireless modem 42 which, in one embodiment, is a 2.45 GHz spread-spectrum modem. This data is transmitted to a complement modem 46 associated with a field support computer (FSC) 48. In one embodiment, a temporary ID is assigned to a particular tag 14 so that a RT 30A and/or RP 32 can discriminate signals from that tag 14 from among a group of selected tags. Once the temporary ID has been assigned, the tag 14 will respond only to commands that specifically identify: (1) the temporary ID; (2) the unique ID (e.g., tag serial number); or the (3) functional ID. These identification numbers identify a specific tag within a group of tags. The tag 14 will remain acquired while in range of FLPs. Once the tag 14 is out of range, it will go to sleep after a predetermined period of time (e.g., after an out of range counter reaches zero). Alternatively, the RT 30 will typically command the tag 14 to enter the deep sleep mode once the interrogation mode is complete.

Once a tag 14 has been specifically identified (acquired) and given, for example, a temporary ID, the RT 30 interrogates the tag 14 by sending command signals that request certain data (for example, the contents of selected memory locations). This data may include the most recent pressure and temperature readings, the wheel position of the tire tag, the vehicle number, the tag serial number, the threshold tire pressure values, the threshold tire temperature values, user defined data, and calibration coefficients for the sensor that can be used to solve the equation y=mx+b, where m=gain and b=offset value (the calibration data is used to adjust the raw sensor data). This data is received by RT 30, transferred to the RP 32 and supplied to the field support computer 48 and/or the remote server 50.

In one embodiment, the tag 14 and the reader/transceiver (RT) 30 perform their receive/transmit functions according to a specific command/response protocol. The basic tool for communicating between a RT 30 and a tag 14 consists of reading and/or writing to and from the tag memory 16. A predefined data structure dictates strategic locations within the tag memory for access to specific information, such as temperature, pressure, and calibration coefficients. The tag memory 16 also stores the software code that defines the functional operation of the tag 14.

Once the RT 30A has successfully obtained all the requested tag data, it generally issues a command signal placing the tag 14 into the deep sleep mode. In one embodiment, the deep sleep mode is designed to last for about 30 seconds. This time duration ensures that the tire tag is out of view of the RT 30 when the tag 14 reawakens, thus avoiding an erroneous double read of the same tire tag. It is to be appreciated, however, in various environments, a longer or shorter deep sleep mode may be desirable. Moreover, an erroneous double read of the same tire tag can be eliminated by correlating the data from a specific tire tag with the serial number of the tire tag. However, putting the tag 14 to sleep for about 30 seconds is a simple way to avoid a double read of the same tag 14. Once the initial tag 14 is placed into the deep sleep mode, the system will then read the next tag 14, which may be a tire on the same vehicle 12.

One embodiment of the sleep modes is shown in FIG. 14. The tag 14 is in the deep sleep mode for a predetermined period of time (e.g., about 600 ms). The tag 14 then wakens to the lucid sleep mode for a few milliseconds to determine if it is time to enter the search mode and, if it is not time, the tag 14 resumes the deep sleep mode. At some point, the tag 14 enters the search mode (running the low-speed clock). The time the tag 14 remains in the search mode is dependant on several variables, including whether sensors are to be read and whether a received transmission is likely a FLP. If a possible FLP is detected, it is read and validated in the interrogation mode (running the high-speed clock). The amount of time the tag 14 is in the interrogation mode is also dependent on several variables. To report the last stored sensor reads, the tag 14 may only need to be ON for about 100 ms. By contrast, to download the tag history data my require the tag 14 to be ON for about 20 seconds. The duration of the different modes is a programmable feature of the tag 14. The above times are merely illustrative examples of the duration of the various modes. These times may be longer or shorter depending on the specific application.

Referring again to FIG. 17, the search mode process will be described in more detail. The tag 14 first performs an abridged reset process by clearing internal flags, initializing internal registers and/or counters, and initializing external hardware functions to their OFF state. The tag 14 then determines if it is time to read the sensors and, if so, reads and stores the sensor data. The tag then turns ON the ASK receiver 224 and enables the pre-discrimination search function (i.e., it begins looking for transmissions likely to be forward link packets). In one embodiment, the tag 14 looks for forward link packets for a fixed interval of time, typically 25 ms. During this time, the tag 14 is looking for a transmission having a certain number of transitions indicative of a FLP (typically 71 transitions over 25 ms). If a likely FLP is detected, the tag 14 enters the interrogation mode. However, if pre-discrimination does not indicate the presence of a likely FLP, the tag 14 determines if it is time to perform an autonomous transmission (AT) and, if not, transitions back to the deep sleep mode for a programmable period of time (typically 600 ms). The duration of the different modes is a programmable feature of the tag 14 that may be adjusted depending on the specific application. The tag 14 will eventually reawaken to the search mode and again perform pre-discrimination. This process repeats until the tag 14 detects a likely FLP, at which time the tag enters the interrogation mode. Again, the wake-up periods, the duration of the sleep modes, and the intervals (such as sensor measurement, and autonomous transmit) are all programmable by the user.

The data from a tag 14 can be accessed via the field support computer 48, which includes a keyboard for data input by a user and a display for data output to a user. The display provides tag data to a user, such as the pressure of the tires, the temperature of the tires, calibration coefficients, pressure and temperature history, tag identification number, tire location, etc. This data can be downloaded to and archived in the field support computer 48. Periodically, new data files can be created and archived tag data can be downloaded to the remote server 50. The remote server 50 also provides a Web interface to the system for providing a remote user with tire data and for allowing the user to correlate a specific tag with a specific vehicle tire, to assign a tire location to a specific tag, or to enter other user defined data, such as tread depth, vehicle type, etc.

Although the embodiment illustrated in FIG. 12 shows the field support computer 48 in communication with the reader processor 32 via modems 42, 46, these components (i.e., the FSC 48 and the RP 32) may be a single unit or, alternatively, separated by a large distance. The arrangement of components is driven by the implementation in which these components will be used rather than by any requirements of the system. Various options can be provided, as indicated by FIG. 15, which is another overview of the various components useable with the ETMS.

In addition, as mentioned above, the RP 32, the field support computer 48, and the remote server 50 may be two or more separate computers, one computer partitioned into different virtual machines, or one virtual machine, acting as two of the components, that is connected to a second computer acting as the third component. Moreover, data can be transmitted between these components using a request/response protocol (where, for example, the remote server requests data from the RP 32) or using a push protocol (where, for example, the RP 32 periodically transmits data to the remote server 50 without such data being requested by the remote server 50).

Figure 23:
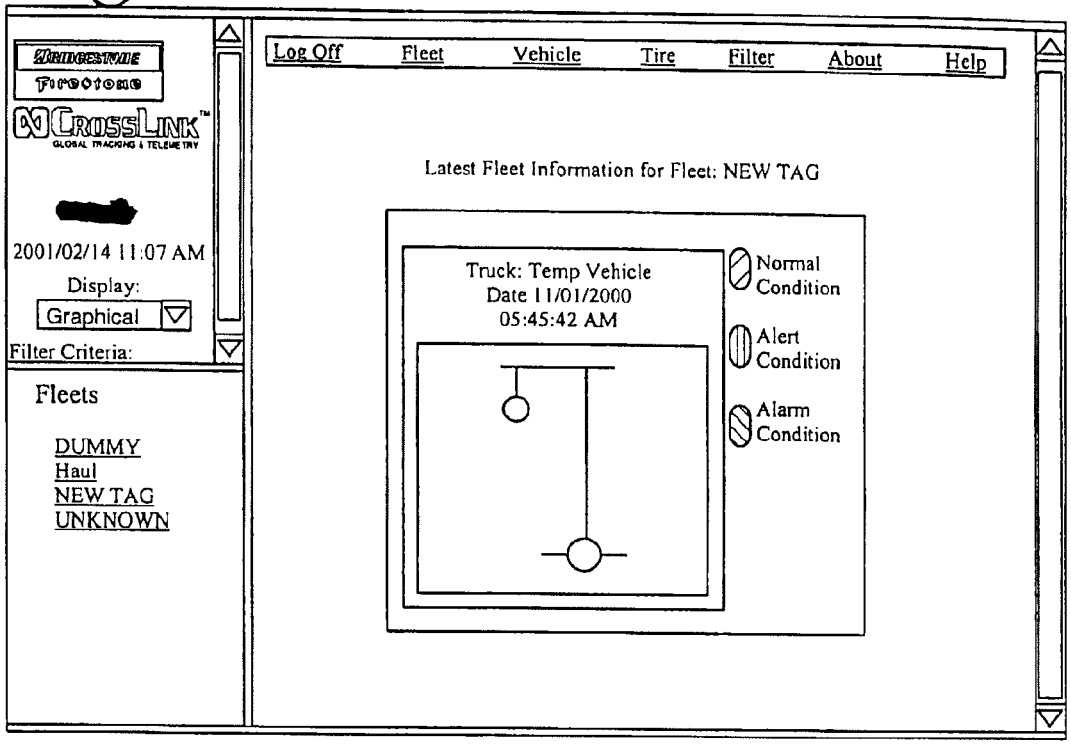
Figure 24:
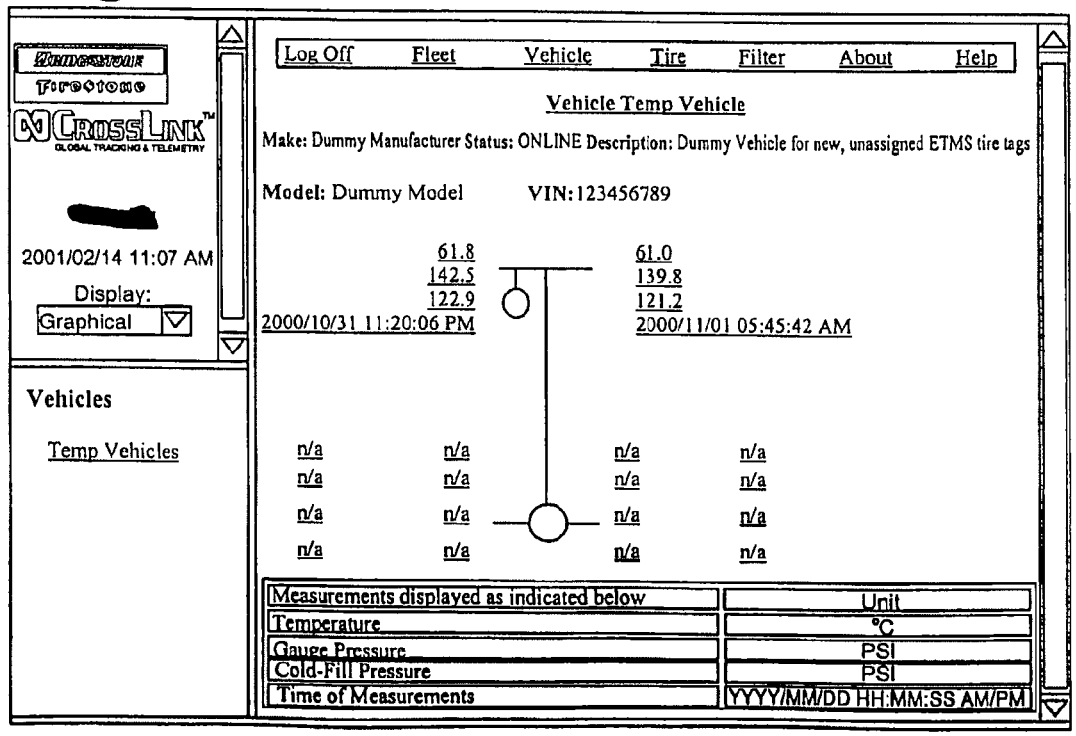

FIGS. 23-33 illustrate screen shots of Web browser screens showing how a user can access tire data and set certain tag parameters. FIG. 23 shows a status screen identifying a specific tag, the date and time, and the current status of the tag: Normal, Alert, or Alarm. Alert is a first level of out of tolerance, alarm is severely out of tolerance. FIG. 24 shows the stored temperature, measured pressure, and calculated cold pressure readings at the time indicated for two tags on the front of a vehicle.

Use of the word "current" herein indicates the current (measured) hot temperature or pressure of a tire, as opposed to the ambient (cold) pressure or temperature of a tire. FIG. 25 shows history data, including current temperature data (Temperature), calculated Cold-fill Pressure data (Cold-fill), and current gauge pressure data (Gauge) over a certain time period, for a specific tag (SN 16776728) on the Left Front (LF) of the vehicle "Temp Vehicle". FIG. 26 shows a graphical display of the tag data, including Cold-fill Pressure data and current temperature data over a certain time period.

Figure 27:
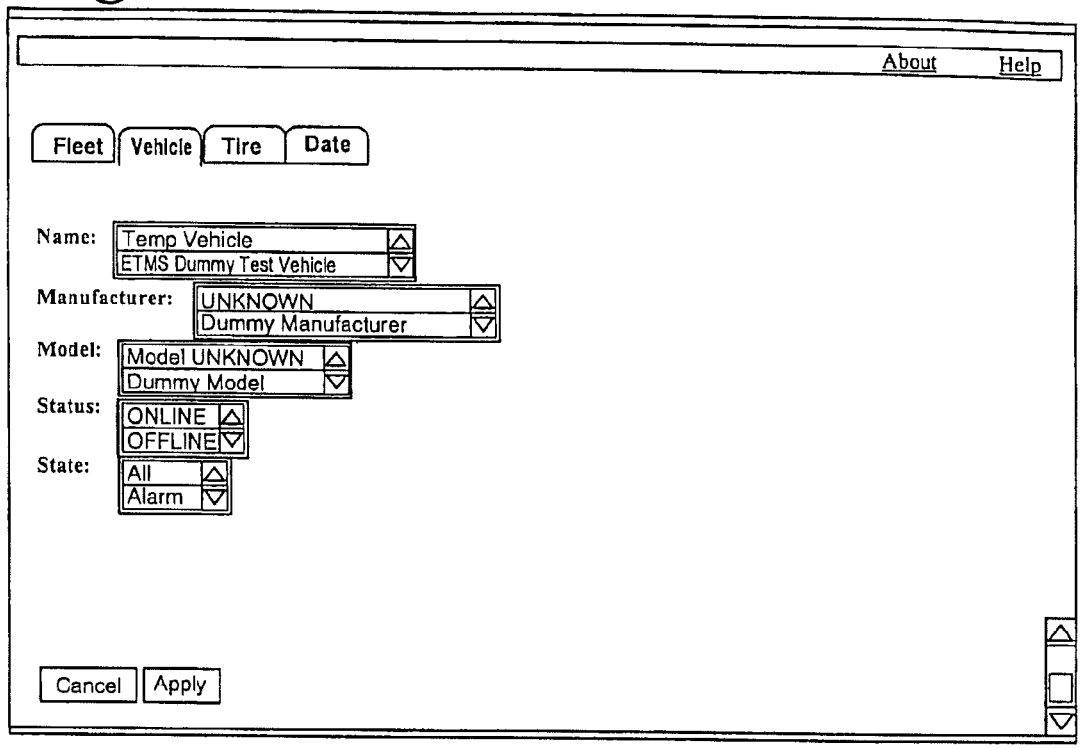
Figure 28:
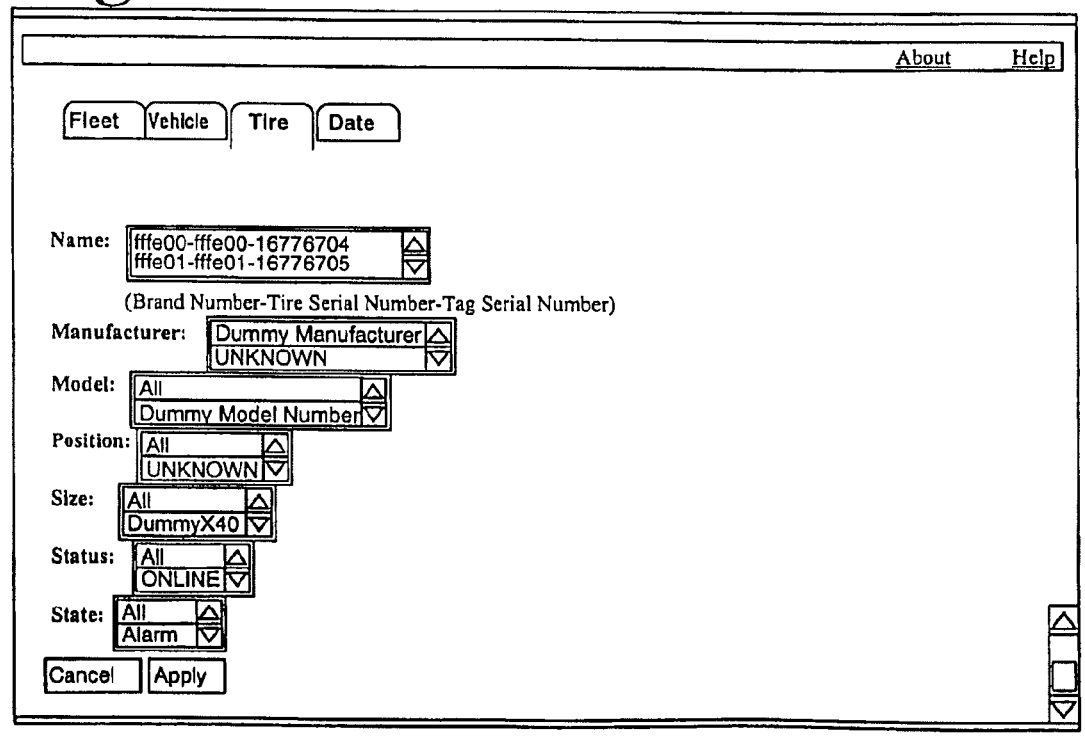

FIG. 27 shows tag information for a specific vehicle, including the vehicle Name, Manufacturer, Model, Status (online or offline), and State (whether any of the associated vehicle tires are in an alarm condition). FIG. 28 shows the tag information associated with a specific tire. This screen allows a user to edit certain of the tag data, such as Name (including tire brand number, tire serial number, and tag serial number), Manufacturer, Model, Position of tire on vehicle, Size of tire, Status, and State.

Figure 29:
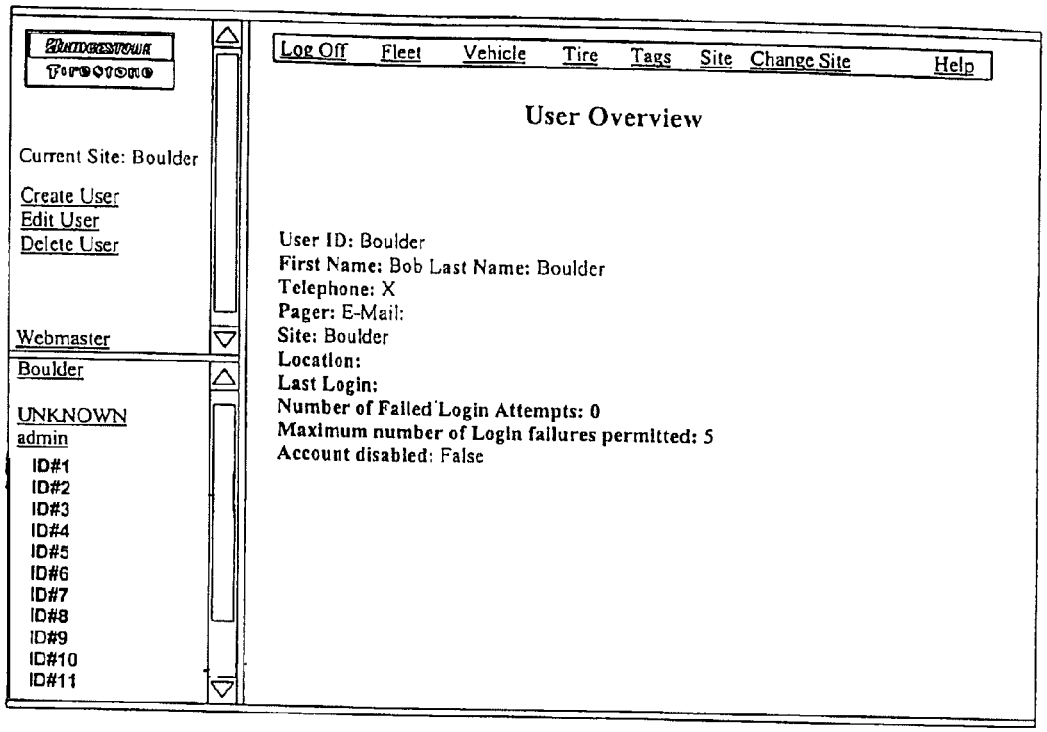
Figure 30:
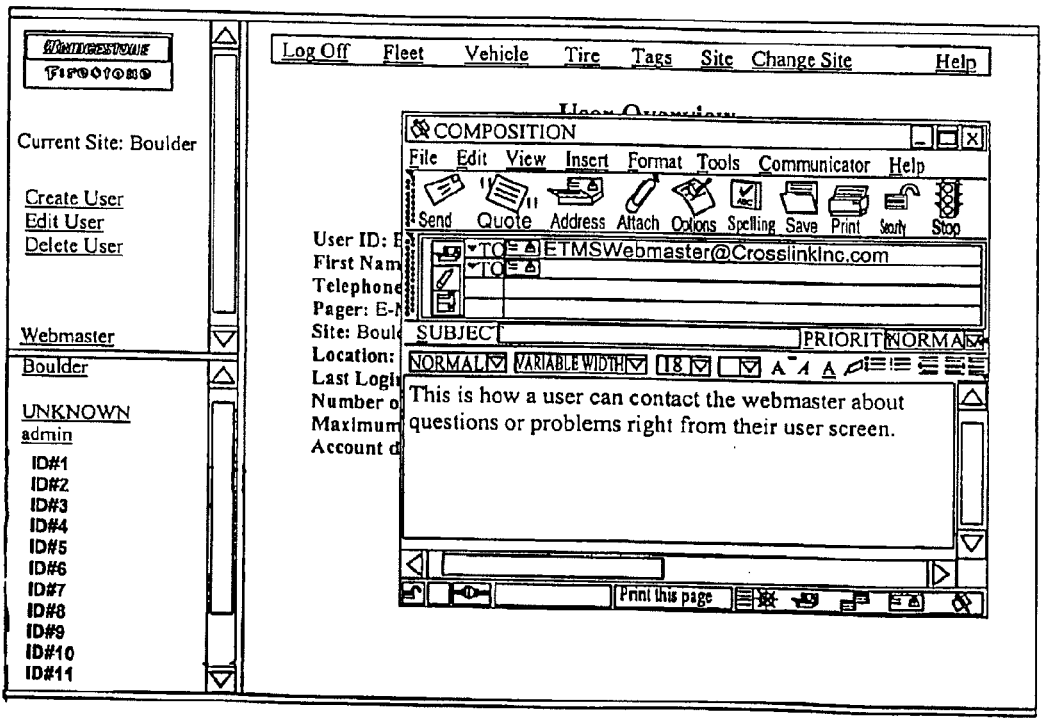

FIG. 29 shows a user overview that identifies the user of the tire tags (including the user's location, name, telephone number, etc.) and login information such as last login, number of failed login attempts, maximum number of login attempts permitted, and whether the account is disabled. These parameters can be edited by users having an appropriate password. FIG. 30 shows how a user can contact the tag manufacturer with questions about the system via e-mail.

Figure 33:
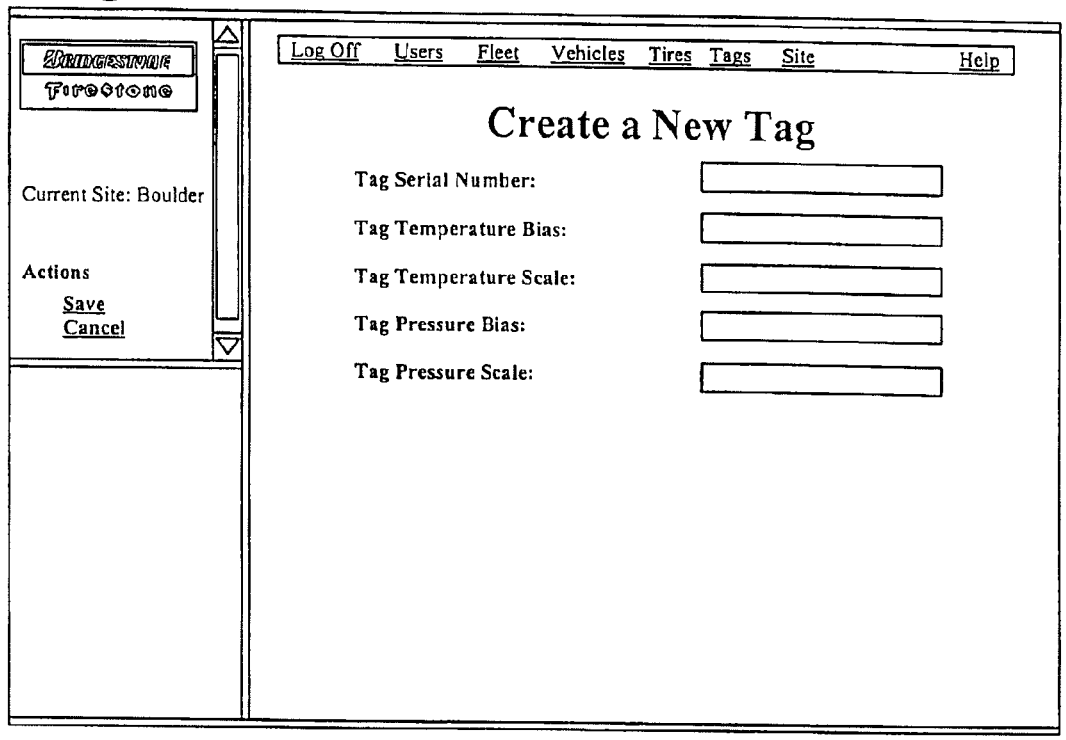

FIG. 31 shows how an authorized user can edit vehicle data to, for example, assign a specific tag to a specific tire on a specific vehicle, identify the tire manufacturer and model number, assign a Vehicle Identification Number (VIN) to a specific vehicle, etc. FIG. 32 shows another screen that allows an authorized user to edit tire data to, for example, enter a tire serial number, a tire brand, a pressure threshold, the tire location, the hours the tire has been on the vehicle, and the total number of hours the tire has been used. This screen also allows the user to assign a specific tag to the tire being edited. FIG. 33 allows authorized users to create (program) a new tag by entering the tag serial number and the temperature and pressure alarm thresholds.

Figure 34:
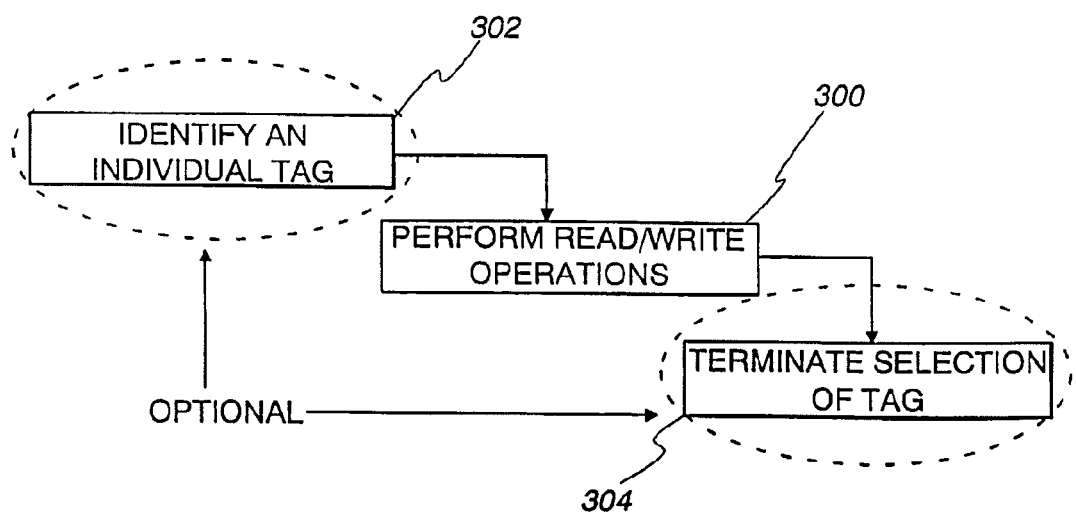
FIG. 34 is an overview of the protocol used in accordance with one embodiment of the present invention.

FIG. 34 illustrates an overview of the receive/transmit protocol according to one embodiment of the invention. The most typical RT commands relate to reading data from or writing data to a tag (block 300). Optional features include identifying an individual tag (block 302) by temporary ID, functional ID and/or unique tag ID, and terminating communication with a tag (block 304) by commanding the tag 14 to enter the deep sleep mode once the interrogation mode is complete. The interrogation mode is completed when: (1) the RT 30 commands the tag to enter the deep sleep mode, (2) the high-speed counter expires, or (3) the out of range counter expires.

Figure 35:
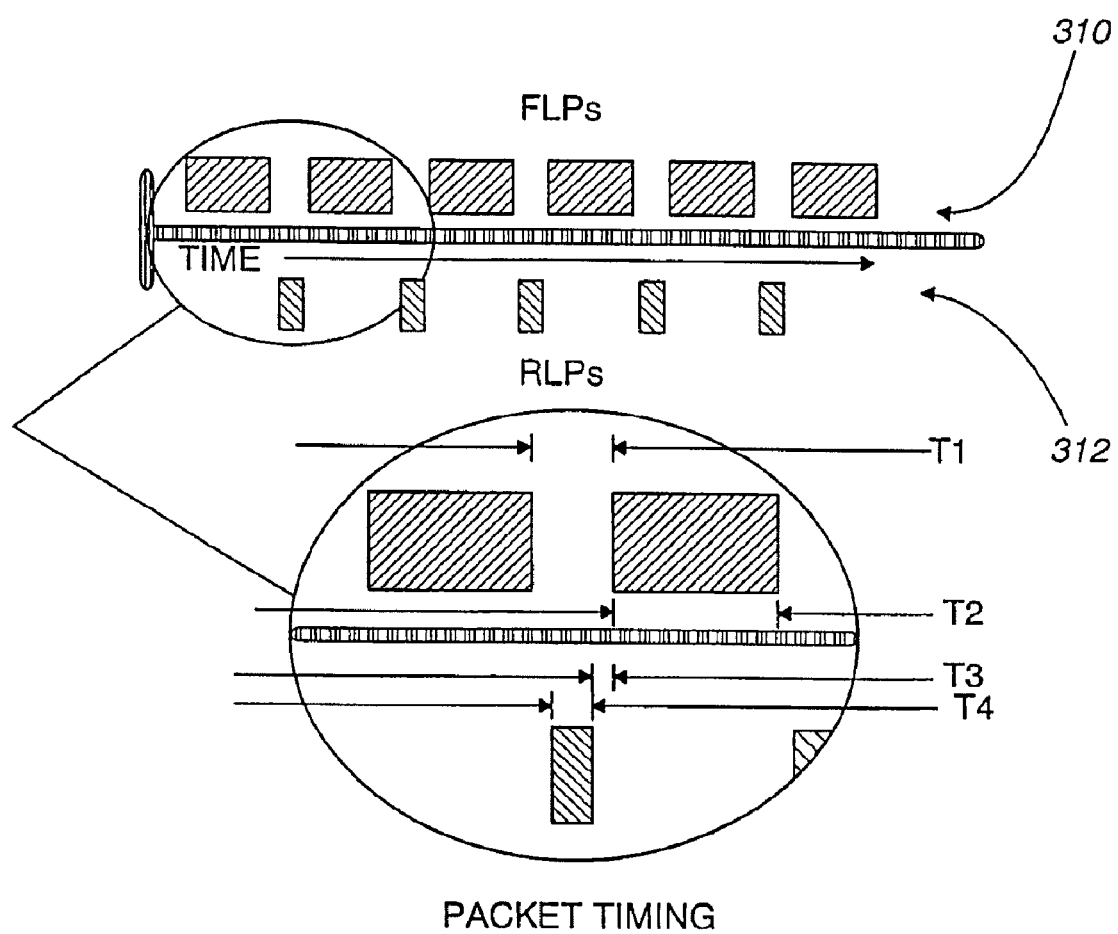
FIG. 35 is a diagram illustrating the timing of FLPs to the tag and RLPs from the tag.

FIG. 35 shows the timing of FLPs 310 and RLPs 312. As illustrated, these packets are interleaved in a half-duplex fashion. The RT 30 transmits a FLP 310 and then waits a defined time period for a responsive RLP 312 before sending the next FLP 310. This defined time period is longer than the duration of the RLP. In one embodiment, the duration of the FLP is 7.33 ms, the time period between FLPs is 2.7 ms, and the duration of the RLP is 1.3 ms, as shown in FIG. 37A. The RT 30 will continuously transmit and listen in this fashion. Referring to FIG. 35, there are four time specifications. T1 and T2 relate to FLPs from a RT, and T3 and T4 relate to a RLP from a tag 14.

Time T1 represents the forward link quiet time between one FLP and the next FLP (i.e., the time when the RT 30 is not transmitting). During this time, the RT 30 is waiting for a RLP response from a tag 14 or is in an idle mode. In one embodiment, this period is 2.7 ms. The duration of time T1 is programmable.

Time T2 represents the duration of a forward link packet from the RT 30. The time period T2 is controlled by the RT 30. In one embodiment, this period is 15.8 ms. The duration of time T2 is programmable.

Time T3 represents the idle time between the end of a RLP and the next FLP (i.e., it represents the time between the end of a tag response and the start of the next RT transmission). In one embodiment, this period is 0.7 ms. The duration of time T3 is programmable.

Time T4 represents the duration of a RLP response from a tag 14. The time period T4 is controlled by the tag 14. In one embodiment, this period is 1.33 ms. The duration of time T4 is programmable.

In the normal mode of operation, the wireless protocol for the ETMS uses a command/response architecture. The RT 30 transmits Forward Link Packets (FLPs) at periodic intervals and listens for Return Link Packets (RLPs) from a tire tag 14 at specified times between the FLPs. The RT 30 cannot rely on the tags 14 being at known locations or being present (within range) at specific times. In the case of the fixed gate reader, the tags 14 are generally not within range of the RT 30. Depending on the work site and the location of the fixed gate reader, a tag may only be within range of a RT 30 from 2 times per hour to once a day, or less. The time in which the tag may be within range of a RT 30 may be as little as a few seconds or as long as several hours. Because of these uncertainties, the tag 14 must wake up frequently and remain on long enough so that it does not miss FLP commands from the RT 30.

In the search mode, the tag 14 uses a low-speed clock (e.g., 37 KHz) and searches for transmissions likely to be FLPs. The tag 14 generally performs the search mode operation thousands of times every hour. For this reason, the search mode is the largest consumer of tag battery power. During the search mode, the tag 14 performs pre-discrimination (i.e., it searches for a transmission having a certain number of transitions indicative of a FLP). Upon detection of a transmission indicative of a FLP, the tag enters the interrogation mode, initiates a high-speed clock (e.g., 4 MHz), verifies the presence of a valid FLP, and responds thereto.

Figure 36:
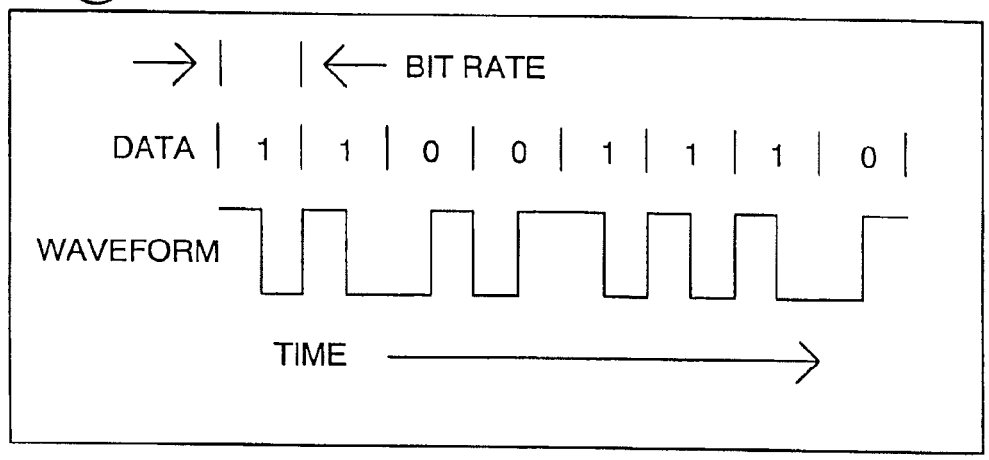
FIG. 36 is a timing diagram showing Manchester encoding, which is used in one embodiment of the present invention.

In one embodiment, the FLP and RLP data are Manchester encoded, meaning there are transitions on every data bit. Such encoding helps the tag receiver to establish a clock from the waveform. In addition, such encoding allows the tag 14 to detect a certain number of transitions over a specified interval to determine whether a transmission is likely a FLP (i.e., perform pre-discrimination). A diagram of Manchester encoding can be seen in FIG. 36.

Figure 37B:
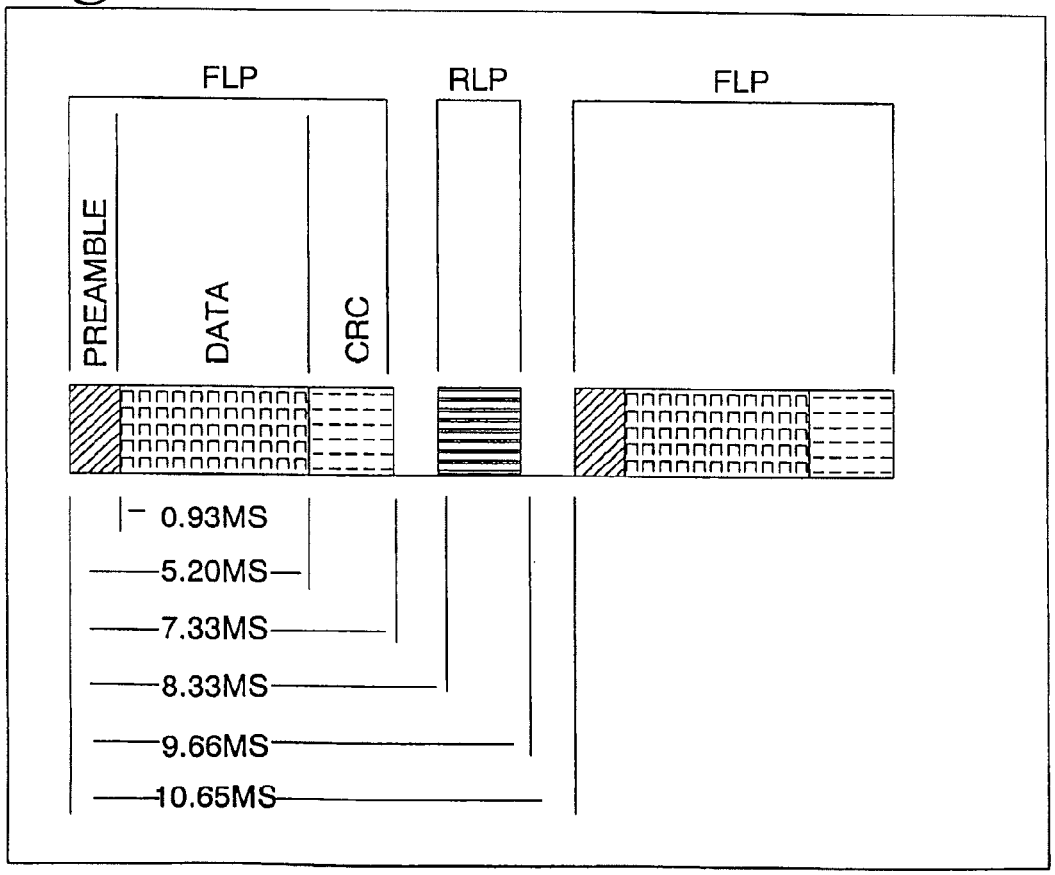
FIGS. 37A-37C are timing diagrams showing the timing of FLPs and RLPs according to one embodiment of the present invention.
Figure 37A:
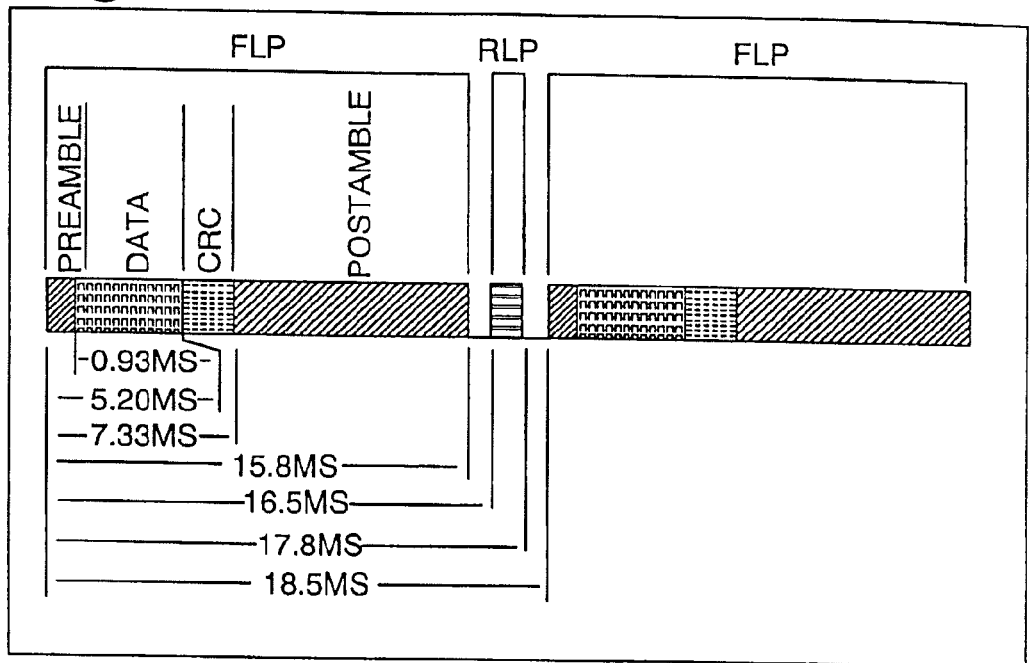

A FLP is defined as a packet from the RT 30 to tag 14, and has a short preamble, as shown in FIG. 37A. In one embodiment, the preamble includes six bits of logic 0 and ends with a logic 1. The transition in the waveform from a logic 0 to 1 signals to the tag 14 that the bits that follow are data. FLPs are transmitted at 7.5 Kbps. In one embodiment, the format of a FLP is as follows:

preamble=7 bits (0.93 ms)
data=32 bits (4.27 ms)
Cyclic Redundancy Check (CRC)=16 bits (2.13 ms)
postamble=72 bits (8.47 ms)
total time to transmit the FLP=15.8 ms The CRC is a one method of verifying the data in the FLP. Other methods include use of parity bits, a checksum, etc. FLPs with correct CRCs are valid packets. The data content of a valid FLP specifies whether the tag needs to respond. A RLP is defined as a transmission from the tag 14 to the RT 30. The RLP has a format similar to the FLP; however, RLPs are transmitted at a faster rate than the FLPs. In one embodiment, RLPs are transmitted at 60 Kbps, 8 times faster than the FLPs. The format of a RLP is as follows:

preamble=32 bits (533 µs)
data 32 bits (533 µs)
CRC 16 bits (267 µs)
total time to transmit a RLP=1.33 ms The timing of FLPs and RLPs is shown in the timing diagram of FIG. 37A-B. In one embodiment, the tag 14 must make preparations prior to sending a RLP. For instance, the Phased Locked Loop (PLL) on the transmitter 232 can take as long as 7 ms to lock on the specified return link channel. Without a FLP postamble, the time between the end of the CRC of a FLP, when the tag knows it must respond, and the beginning of the RLP is only 1 ms, as shown in FIG. 37B. This is not enough time to allow the PLL to lock on the return link channel. One option would be to turn ON the PLL any time valid FLPs are present, even if the tag does not need to respond. Another option would be to extend the off time between the FLP and the RLP; however, the tag receiver 224 would then have to remain ON much longer during wake-up periods to assure that a FLP is detected. This would increase battery usage and decrease the life of the tag 14.

Therefore, a better option is to add a postamble to the FLP transmission, as shown in FIG. 37A. The tag 14 can then read the data portion of the FLP, and if a response is required, turn ON the PLL, then verify the CRC, and continue if it is good. Otherwise, the tag 14 can turn the PLL OFF if it determines that the CRC is bad. Reading the data before verifying the CRC allows the PLL to settle while the remainder of the FLP (CRC and postamble) is being received and read. Because the tag 14 only enables the PLL after examining a portion of the FLP, the amount of time the tag PLL is ON is minimized. Therefore, packet interleaving in this fashion preserves tag battery power by minimizing the amount of time the PLL is ON when no valid FLPs that require a response are present (which could be a long period of time in the case of a fixed gate reader).

Thus, in one embodiment, the FLP includes a postamble that provides a way to minimize battery consumption. The timing diagram of FIG. 37A shows the timing of a FLP (including a preamble and postamble) and a RLP. The postamble has the same format as the FLP preamble, with the exception that the postamble is comprised of 72 bits instead of 7. Like the preamble, the postamble is a stream of zeros that ends with a one (i.e., it includes 71 zeros and ends with a one). The transition from logical zero to logical one signifies the end of the FLP. The increased amount of time between the FLP and the RLP (due to the FLP postamble) allows the tag 14 plenty of time to obtain a PLL lock on the return link channel. This means the tag 14 will only turn ON the PLL after it has been specifically commanded to do so by the FLP. This reduces the amount of time the PLL is ON, thereby saving battery power when the tag 14 is in the presence of FLPs. The postamble also conserves battery power by minimizing the amount of time the receiver 224 is ON when not in the presence of valid FLPs.

Figure 37C:
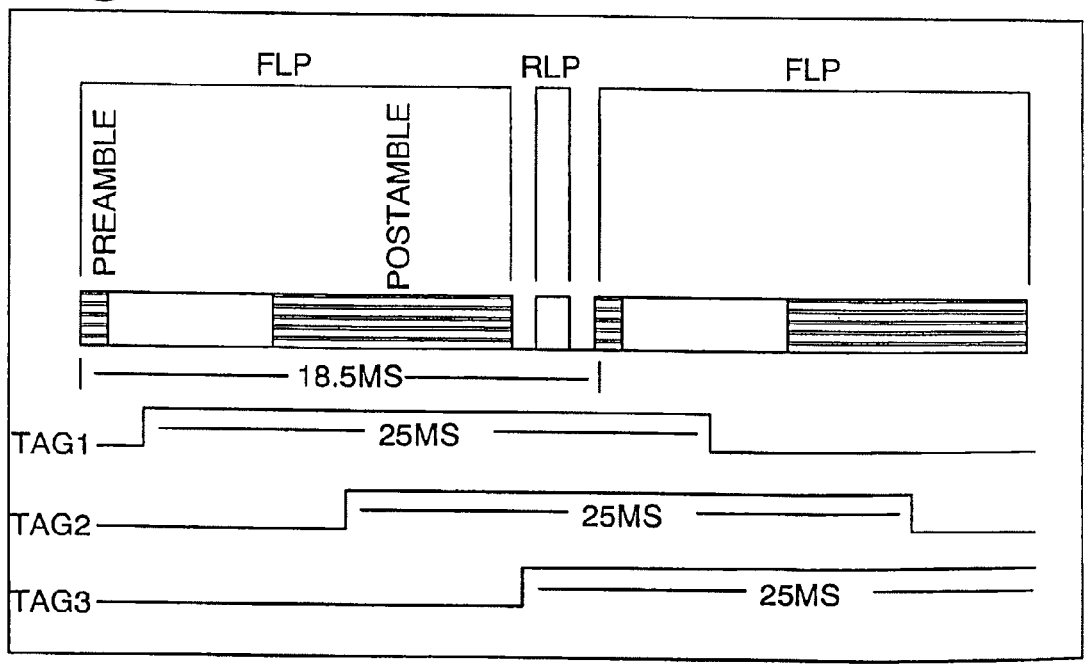

The tag 14 must turn ON the receiver 224 from time to time to search for likely FLPs. In order to detect the likely presence of a FLP, the receiver 224 must stay ON for approximately 25 ms to determine if the transmission includes at least 71 transitions. A FLP will have at least 71 transitions over this interval because the data is Manchester encoded (i.e., there is a transition on every data bit). If the same inter-packet timing were used without a postamble, the receiver 224 would need to be powered for about 50 ms. Therefore, the use of a postamble reduces the power used by the tag receiver 224 by 50%. FIG. 37C shows three tags with various wake-up times and how they should all detect the presence of a FLP. When the tag 14 detects the likely presence of a FLP, it transitions to the interrogation mode and leaves the receiver 224 ON in order to read the transmission and verify whether it is a valid FLP from a RT 30.

The above communication protocol conserves battery power because the tags 14 only enable the PLL when specifically commanded to do so by a valid FLP and because use of a postamble shortens the minimum time required for a tag to turn ON the receiver 224 and search for FLPs.

FIG. 38 is a flow chart illustrating the tire tag firmware functions and their relationship to each other, according to one embodiment of the invention. The normal tag firmware processing flow includes the hardware initiated wake-up from deep sleep to lucid sleep, initialization, sensor processing, search, autonomous transmission, interrogation and processing of valid FLPs, and return to deep sleep. These functions are used during normal processing. Each of these functions will be discussed in more detail below.

Deep sleep is a hardware function of the microprocessor. Certain registers are set to configure the watchdog timer (WDT) for a predetermined sleep time. During the deep sleep mode, the microprocessor is not running and all clocks are stopped. Thus, only a minimum amount of power is consumed in the deep sleep mode. When the WDT times out, the microprocessor is started in its low-speed clock mode. This initial wake-up from sleep is referred to as Lucid Sleep. FIGS. 39-46 are detailed flow charts illustrating each of the functions shown in FIG. 38.

Figure 39:
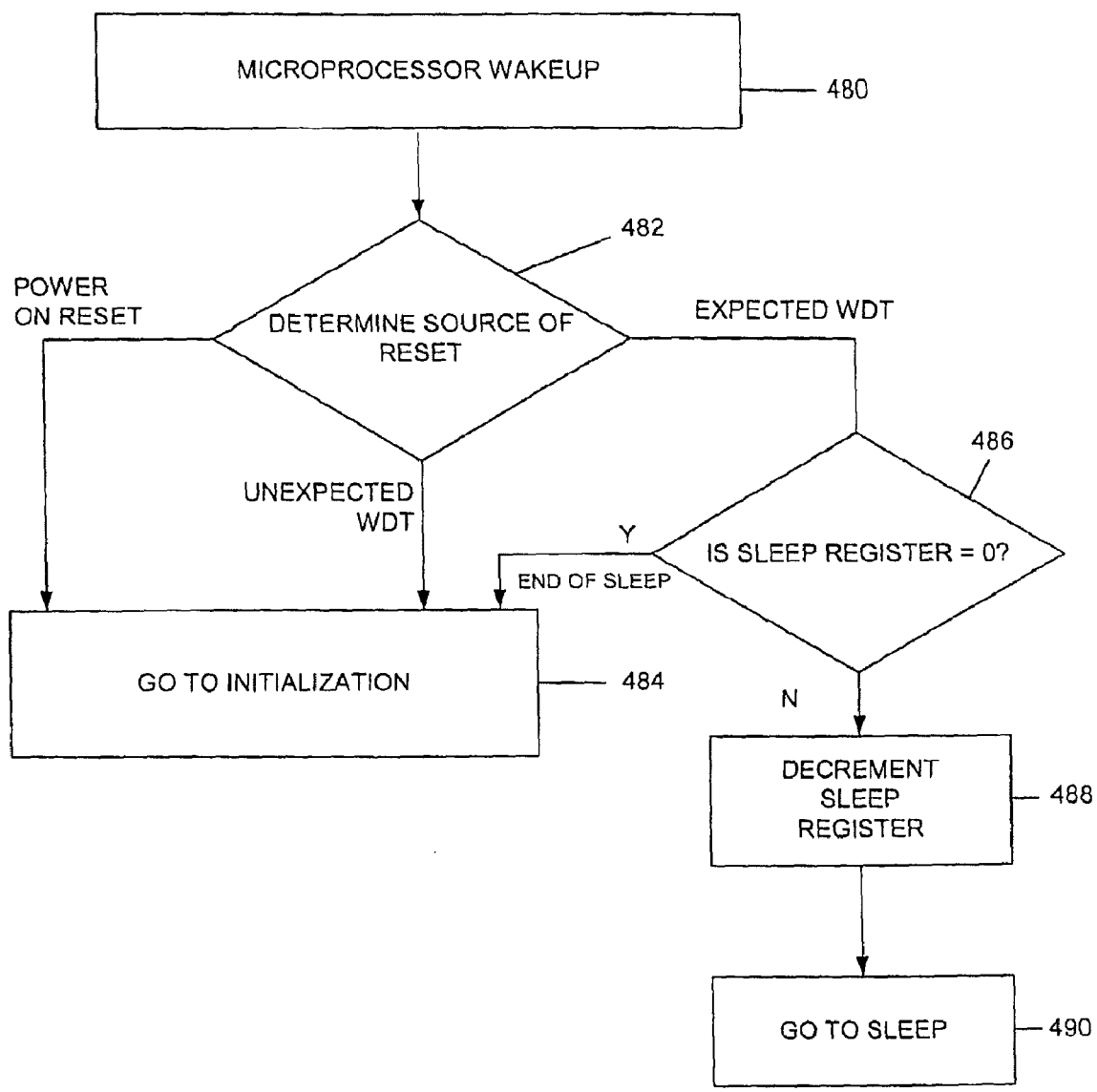
FIG. 39 is a flow chart illustrating Lucid Sleep.

FIG. 39 is a flow chart illustrating the Lucid Sleep process, according to one embodiment of the invention. The tag 14 enters Lucid Sleep directly from Deep Sleep (block 480). In block 482, the tag 14 determines the source of the reset signal. If the tag 14 determines that the source was a power on reset (POR) or an unexpected WDT reset, the tag 14 proceeds to Initialization (block 484). Otherwise, if the source was an expected watchdog timer (WDT) reset, then the tag software proceeds to block 486. There, the tag 14 determines if the Deep Sleep register contains all zeros. If it does, the tag 14 proceeds to Initialization (block 484). Otherwise, if it does not contain all zeros, the tag decrements the Deep Sleep register (block 488) and returns to the deep sleep mode (block 490).

Figure 40:
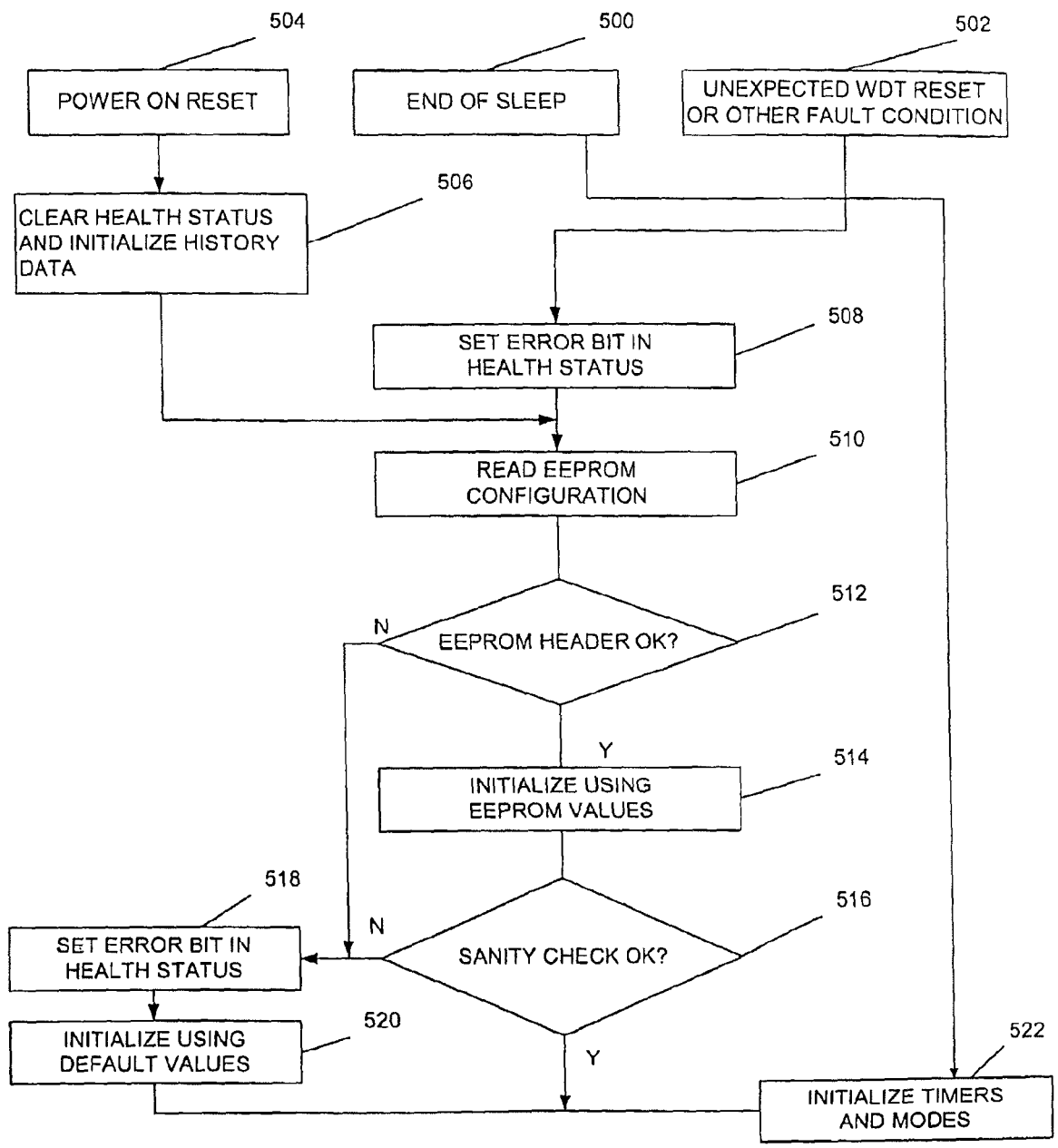
FIG. 40 is a flow chart illustrating Initialization.

FIG. 40 is a flow chart illustrating the Initialization process, according to one embodiment of the invention. The Initialization process is entered from the Lucid Sleep process due to an end of sleep condition (block 500), due to an unexpected WDT reset, or due to a fault condition encountered during the Interrogation processing loop (block 502), or due to a power on reset (POR) (block 504). If the Initialization process was entered from a normal end of sleep process (block 500), the tag proceeds to block 522. A POR (block 504) normally occurs once when the batteries are installed in the tag 14. If the Initialization process was entered from a POR, all memory is cleared, which includes the health and status bytes, and history data archive pointers are reset (block 506). If Initialization was entered due to a fault condition (block 502), the tag sets the appropriate Health Status error bits in block 508. The tag 14 then reads configuration values from its EEPROM (block 510). If the EEPROM header bytes are not valid (block 512), the tag proceeds to block 518. If they are valid, the tag proceeds to block 514 where it initializes using the EEPROM values. In block 516, the tag performs a sanity check. If the sanity check is OK, the tag proceeds to block 522. Otherwise, if the values loaded from the EEPROM fail the sanity check process, the tag sets the appropriate Health Status error bits (block 518) and uses the default values to configure the tag (block 520). Once the configuration values are loaded, all timers and modes are initialized (block 522). The tag 14 then continues with Sensor Processing.

Figure 41A:
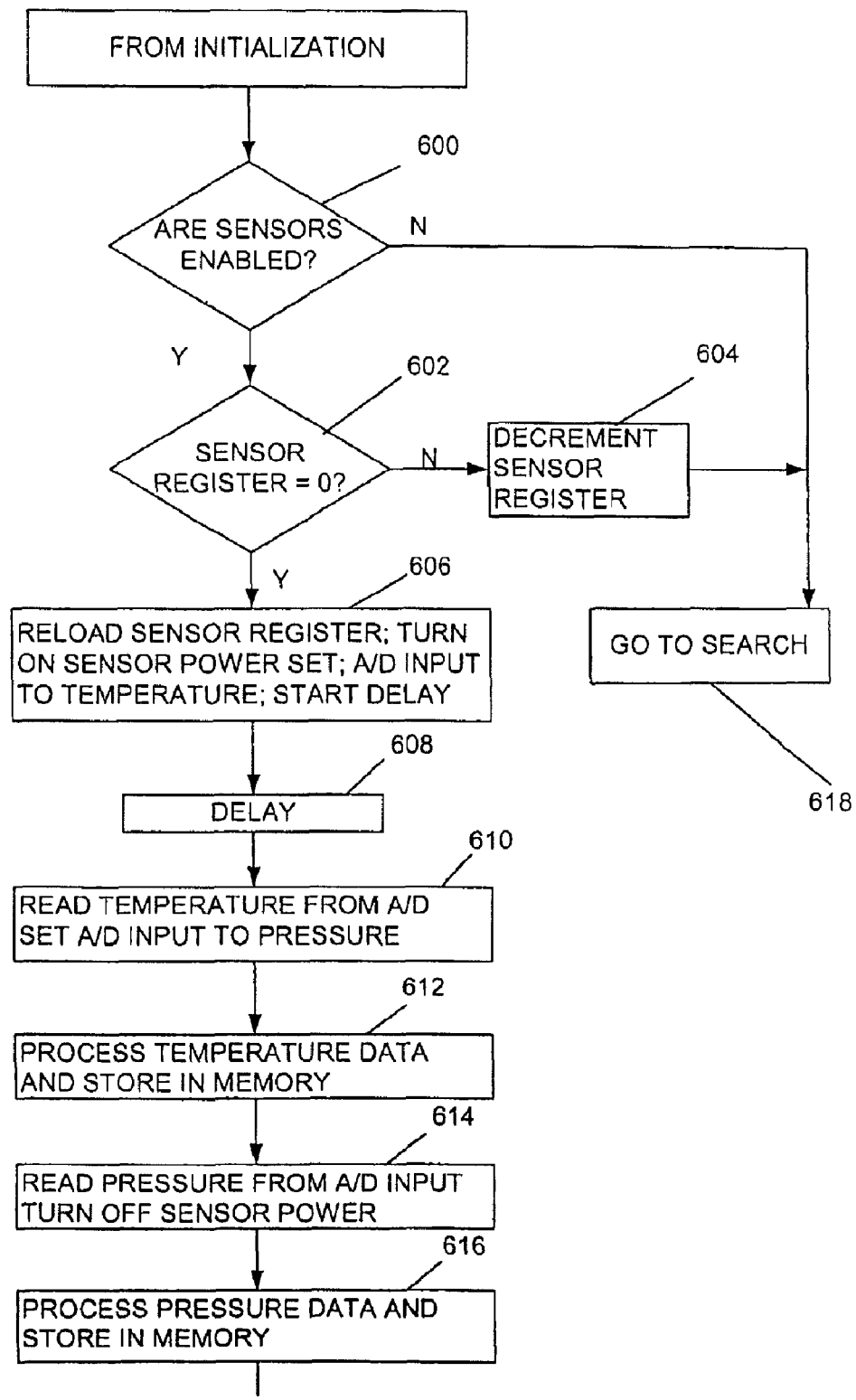
FIGS. 41A and B are a flow chart illustrating Sensor Processing.
Figure 41B:
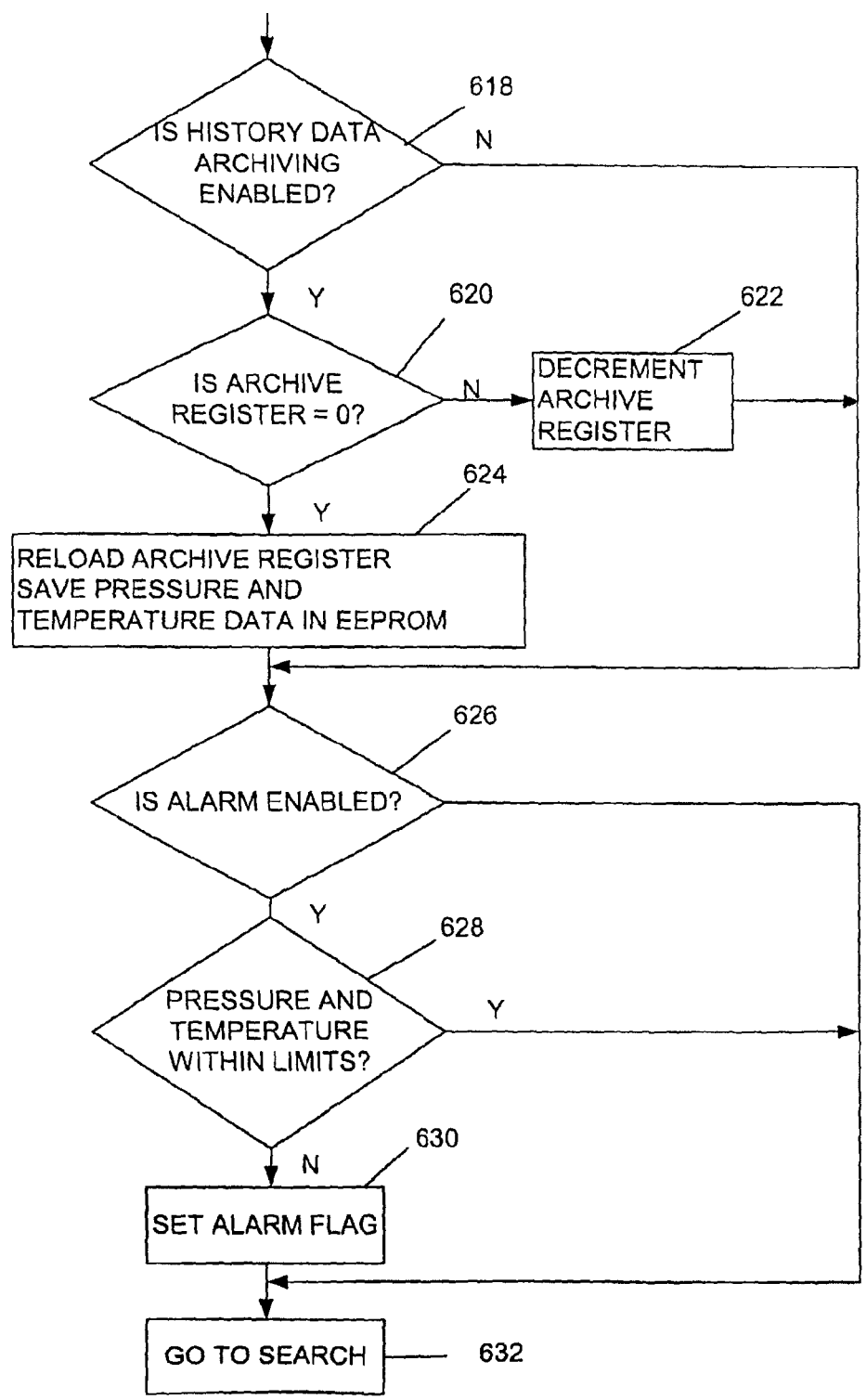

FIGS. 41A and 41B illustrate a flow chart showing Sensor Processing, according to one embodiment of the invention. The tag 14 first checks to see if sensor reading is enabled (block 600). If it is not, the tag 14 proceeds to the Search function (block 618). Otherwise, the tag 14 decides if it is time to read the sensors by determining if the sensor register (counter) equals zero (block 602). If it does not, the tag 14 decrements the sensor register (block 604) and goes to the Search function (block 618). Otherwise, the tag 14 reloads the sensor register, turns ON the sensor power, sets the analog to digital converter (A/D) input to the temperature sensor, and initiates a delay for the sensor to stabilize (block 606). After the delay (block 608), the tag 14 reads the temperature value from the A/D input and then sets the A/D input to the pressure sensor (block 610). While the pressure sensor is stabilizing, the tag 14 performs any signal filtering that is required and stores the temperature data in memory (block 612). The tag 14 then reads the pressure value from the A/D input and turns OFF the sensor circuit (block 614). The tag 14 performs any signal filtering required on the pressure data and stores the pressure data in memory (block 616).

In FIG. 41B, the tag 14 checks to see if history data archiving is enabled (block 618). If it is, the tag 14 decides if it is time to save history data by determining if the archive register equals zero (block 620). If it does not, the tag 14 decrements the archive register (block 622). Otherwise, the tag 14 reloads the archive register, and saves the temperature and pressure readings in the history data EEPROM archive (block 624). The tag 14 then checks to see if the alarm function is enabled (block 626). If it is not, the tag 14 goes to the Search function (block 632). Otherwise, the tag 14 check the values of temperature and pressure to see if they are within the preset limits (block 628). If they are, the tag 14 goes to the Search function (block 632). Otherwise, the tag 14 sets the alarm flag (block 630), which enables the Autonomous Transmission alarm mode, and then goes to the Search function (block 632).

Figure 42:
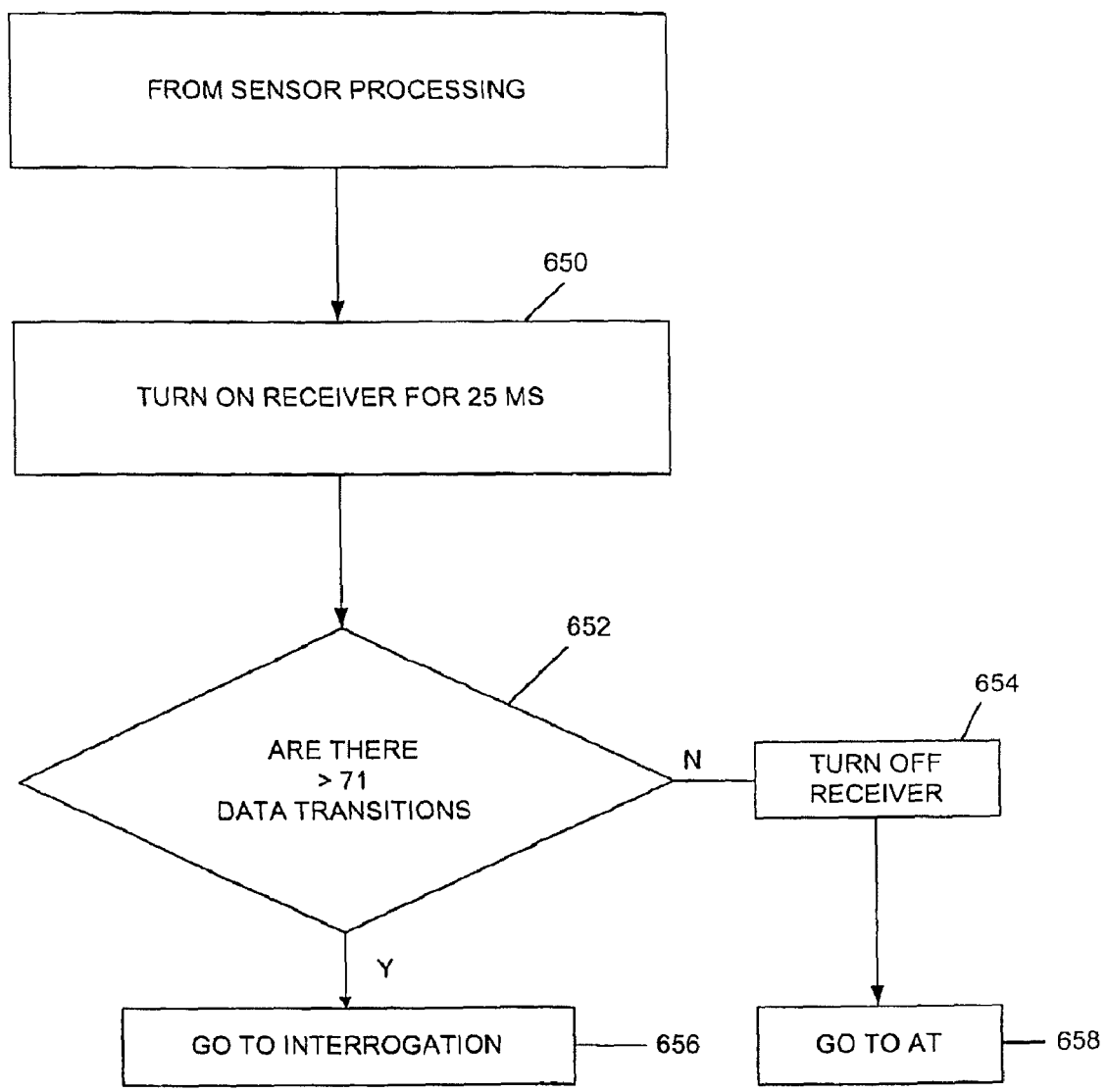
FIG. 42 is a flow chart illustrating the Search process.

FIG. 42 is a flow chart illustrating the Search function, according to one embodiment of the invention. The tag 14 turns ON the receiver 224 for a fixed interval, typically 25 ms (block 650). The tag 14 then determines if the received data transmission included more than a specific number of transitions over the fixed interval, typically 71 (block 652). If it did, then the received data transmission is a possible forward link packet (FLP) and the tag 14 proceeds to the Interrogation function (block 656). Otherwise, the tag 14 turns OFF the receiver 224 (block 654) and proceeds to the Autonomous Transmit (AT) function (block 658).

FIG. 43 is a flow chart illustrating the Interrogation function, according to one embodiment of the invention. In the Interrogation mode, the tag 14 enables the microprocessor high-speed clock (block 700). The Interrogation function is a foreground process wherein the tag 14 performs several tasks, iteratively in a loop, until the interrogation timer expires. At that time, the tag 14 goes to sleep. Alternatively, a FLP command may instruct the tag 14 to enter the deep sleep mode once an interrogation is complete. These tasks include resetting the watchdog timer (WDT) (block 702), looking for fault conditions by calling the Sanity Check process (block 704), checking for valid FLPs (block 706), responding to FLP commands, and sending return link packets (RLPs).

In one embodiment, the interrogation timer (counter) is loaded with one of two values. The High-Speed value specifies how long to search for the first valid FLP (block 700). The Out of Range Listen value specifies how long to continue searching for FLPs after at least one valid FLP has been received (block 708). If a valid FLP is received, the tag 14 checks to see if the FLP is intended for this specific tag (block 710). In one embodiment, the tag 14 checks to see if the FLP is a command or a SAR request (block 712). Then the tag 14 calls the appropriate SAR process (block 714) or Command process (block 716). These processes, in turn, typically call the RLP process (block 718). The functions that support the interrogation loop are background functions and include the Interrupt Service routine, the FLP Processing routine, the RLP Processing routine, the EEPROM Interface routine, the Sanity Check routine, the Command Processing routine, and the SAR Processing routine. The Interrupt Service routine is event driven, while the other routines are called as needed. The Interrogation process is terminated when the interrogation timer expires (block 720), at which time the tag enters the deep sleep mode (block 722).

FIG. 44 is a flow chart illustrating the Interrupt Service routine, according to one embodiment of the invention. The Interrupt Service routine responds to internal and external events (block 750) as a function of the operating mode of the tag 14. In block 751, the tag 14 determines the source of the event. In block 752, the tag determines if the event was due to receiver data transitions. If an interrupt was generated by receiver data transitions, the Interrupt Service routine calls the FLP Processing routine (block 754) where the actual detection of valid FLPs is performed. Otherwise, the tag 14 determines if the first internal timer (timer 0) has expired (block 756). If so, the internal timer zero interrupts initiate actions such as searching for FLPs, transmitting RLPs, etc. (block 758). Otherwise, the tag determines if the second internal timer (timer 1) has expired (block 760). If so, the tag terminates the interrogation loop (block 762). Otherwise, the interrupt occurred without an expected source, which indicates a fault condition. Therefore, the tag 14 sets an error bit in the Health Status word (block 764).

Figure 45A:
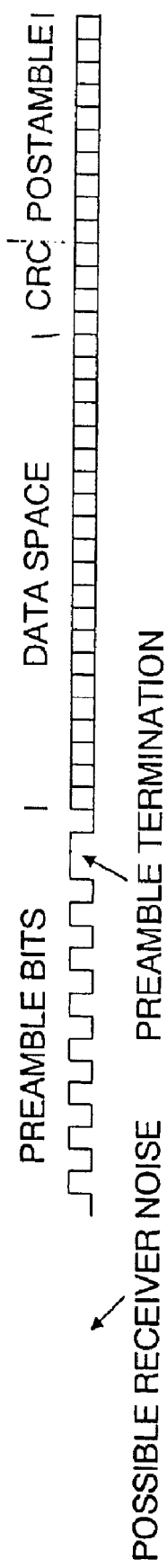
FIG. 45A illustrates the format of a Forward Link Packet (FLP)

FIG. 45A illustrates the format of a Forward Link Packet (FLP), according to one embodiment of the invention. Each FLP includes a preamble, data, a CRC, and a postamble. FLPs are processed in the Interrogation mode by the Packet Processing routine. FLPs are read by executing a series of events including pre-discrimination, bit rate measurement, data detection, data shifting, and packet validation.

The Packet Processing routine deals with the serial bit protocol relating to FLPs and RLPs. When the receiver 224 detects data transitions, an interrupt is triggered, which in turn, causes the Packet Processing routine to be called. The tag 14 must discriminate between receiver noise and a transmission that could be a valid FLP. If excessive receiver noise is present, then the pre-discrimination process will terminate searching for FLPs until the Interrogation loop can complete a full cycle and re-enable the search process (i.e., re-enable the transition interrupts).

FIG. 45B illustrates the Packet Processing pre-discrimination flow chart, according to one embodiment of the invention. In block 800, the tag 14 enters from the Interrupt Service routine. The tag 14 then determines whether the Got Preamble flag is set (block 802). This flag indicates whether the tag 14 has found a valid preamble sequence (e.g., 71 transitions over 25 ms). If this flag is set, the tag 14 proceeds to block 804 and begins the shift data process. Otherwise, the tag determines whether the bit transition time interval was too long (block 806) (i.e., it took too long between transitions). If the interval was not too long, the tag 14 proceeds to block 808. If it was too long, the tag 14 determines, in block 810, whether the last transition was of the proper polarity for preamble termination (e.g., logic one). If it was not the proper polarity, the tag 14 re-initializes the pre-discrimination routine and exits to the Shift Data process (block 816). Otherwise, if it was the proper polarity, the tag 14 determines whether enough preamble transitions were detected (block 812). If so, the tag sets the Got Preamble flag, computes the time interval threshold (for data detection), initializes the loop counter to count FLP data bits, and then exits to the Shift Data process (block 814). If not, the tag proceeds to block 816.

In block 808, the tag 14 determines whether the bit transition time interval was too short (i.e., the transitions were too close together). If the interval was too short, the tag 14 proceeds to block 816. If it was not too short, the tag determines whether there were too many preamble bits (block 818). If there were, the tag terminates the search for FLPs and disables the transition interrupts (block 820). Otherwise, the tag exits to the Shift Data process (block 822).

Figure 45C:
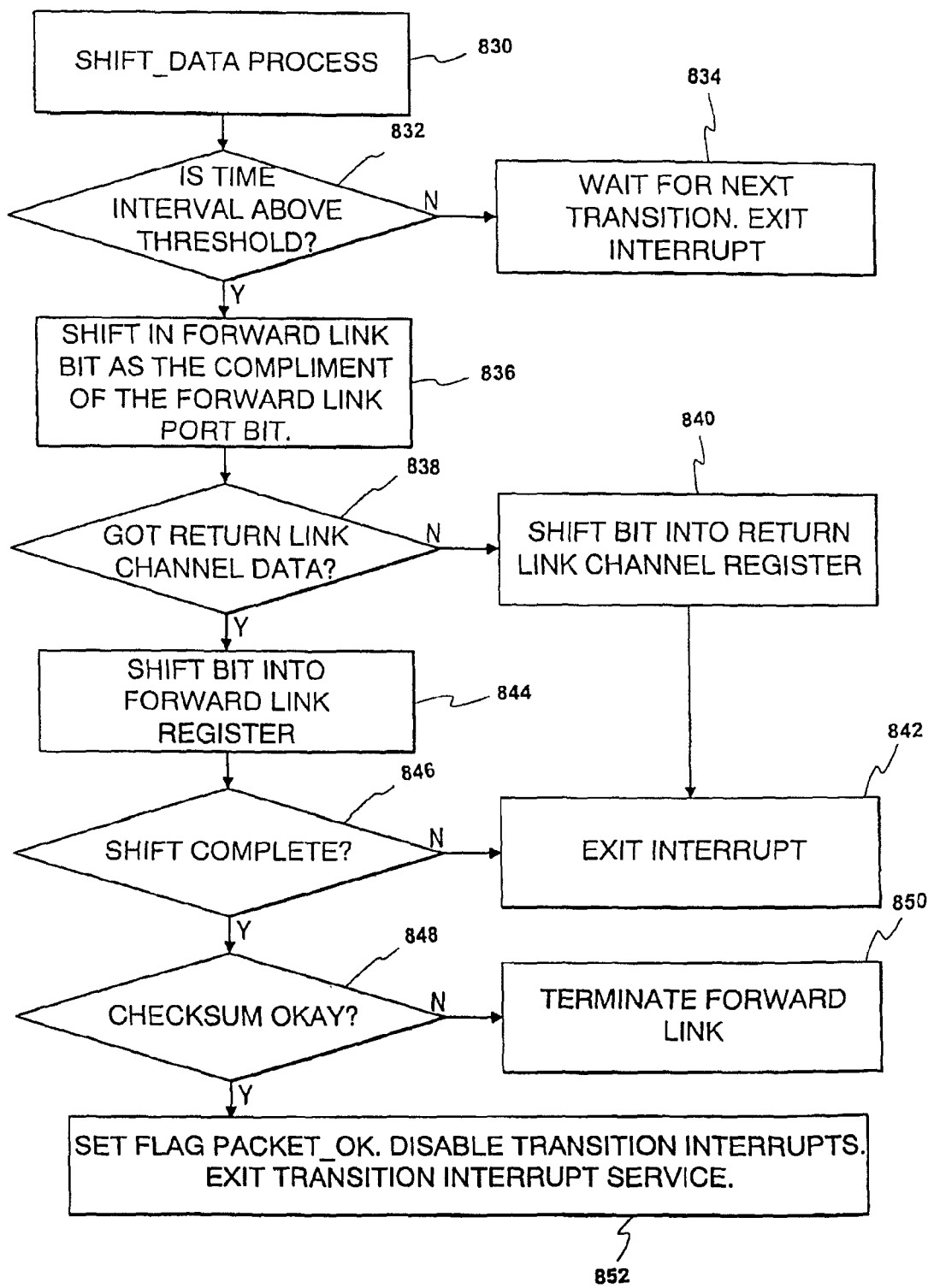
FIG. 45C is a flow chart illustrating Packet Processing (shift data process)

FIG. 45C illustrates the Packet Processing shift data process, according to one embodiment of the invention. The tag 14 enters the shift data process in block 830. It then determines whether the bit transition time interval is above a threshold (block 832). If it is not, the tag exits and waits for the next transition (block 834). Otherwise, the tag 14 shifts in the first forward link data bit (block 836). Next, the tag 14 determines whether the current data bit is one of the return link channel bits (block 838). If it is, the bit is shifted into the return link channel register (block 840) and then the tag 14 exits the transition interrupt service (block 842). Otherwise, a bit is shifted into the forward link register (block 844). The tag then determines if the shift is complete (block 846). If it is not, the tag 14 exits the transition interrupt service (block 842). If the shift is complete, the tag proceeds to block 848 where the tag 14 determines if the error detection bits (e.g., parity bits, a checksum, or a CRC) are OK. If they are not OK, the tag 14 terminates the Packet Processing routine and waits for another FLP (block 850). Otherwise, the tag 14 sets the Packet OK flag, disables the transition interrupts, and exits the transition interrupt service (block 852).

Figure 46:
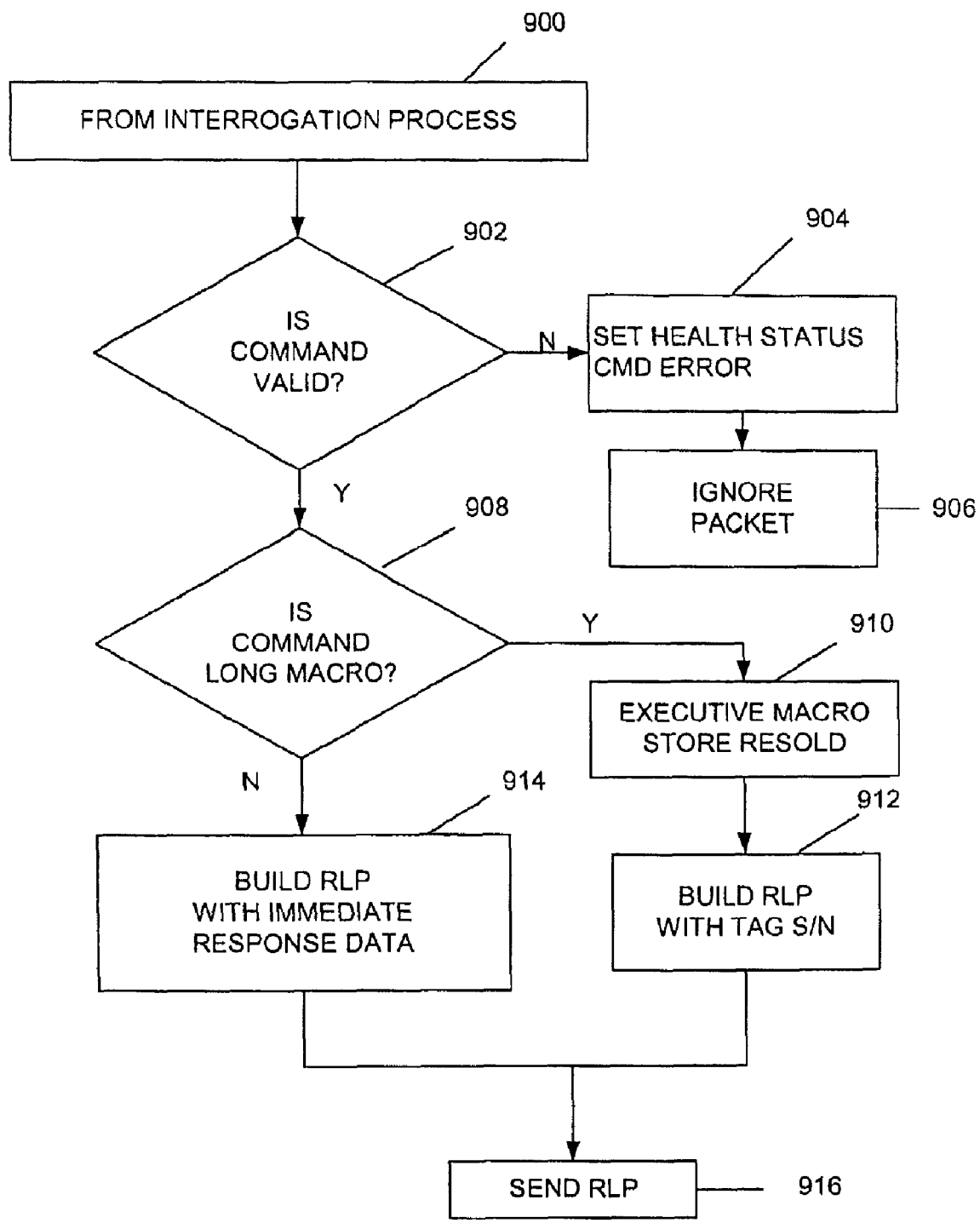
FIG. 46 is a flow chart illustrating the Command routine.

FIG. 46 illustrates the Command routine (i.e., the response part of the interrogation mode), according to one embodiment of the invention. This routine processes valid FLP commands that are received from a RT 30. The Command routine also resolves long macro commands that span more than a single Forward Link Packet time interval. Long macro commands are initiated by a first command and the results (e.g., data) are retrieved by a second command.

Specifically, the Command routine is called from the Interrogation process in block 900. The tag 14 checks to see if the FLP command is valid (block 902). If it is not, the tag 14 sets the command error bit in the Health Status word (block 904) and ignores the packet (block 906). Otherwise, the tag 14 checks the see if the command is a long macro command (block 908). If it is, the tag 14 begins execution of the long macro, and stores the result in the tag RAM (block 910). In one embodiment, the tag 14 builds a return link packet (RLP) including the tag serial number (block 912). If the command was not a long macro, the tag 14 builds a RLP including data responsive to the command (block 914). In either case, the tag 14 then transmits the resulting RLP at the required time (block 916).

Figure 47:
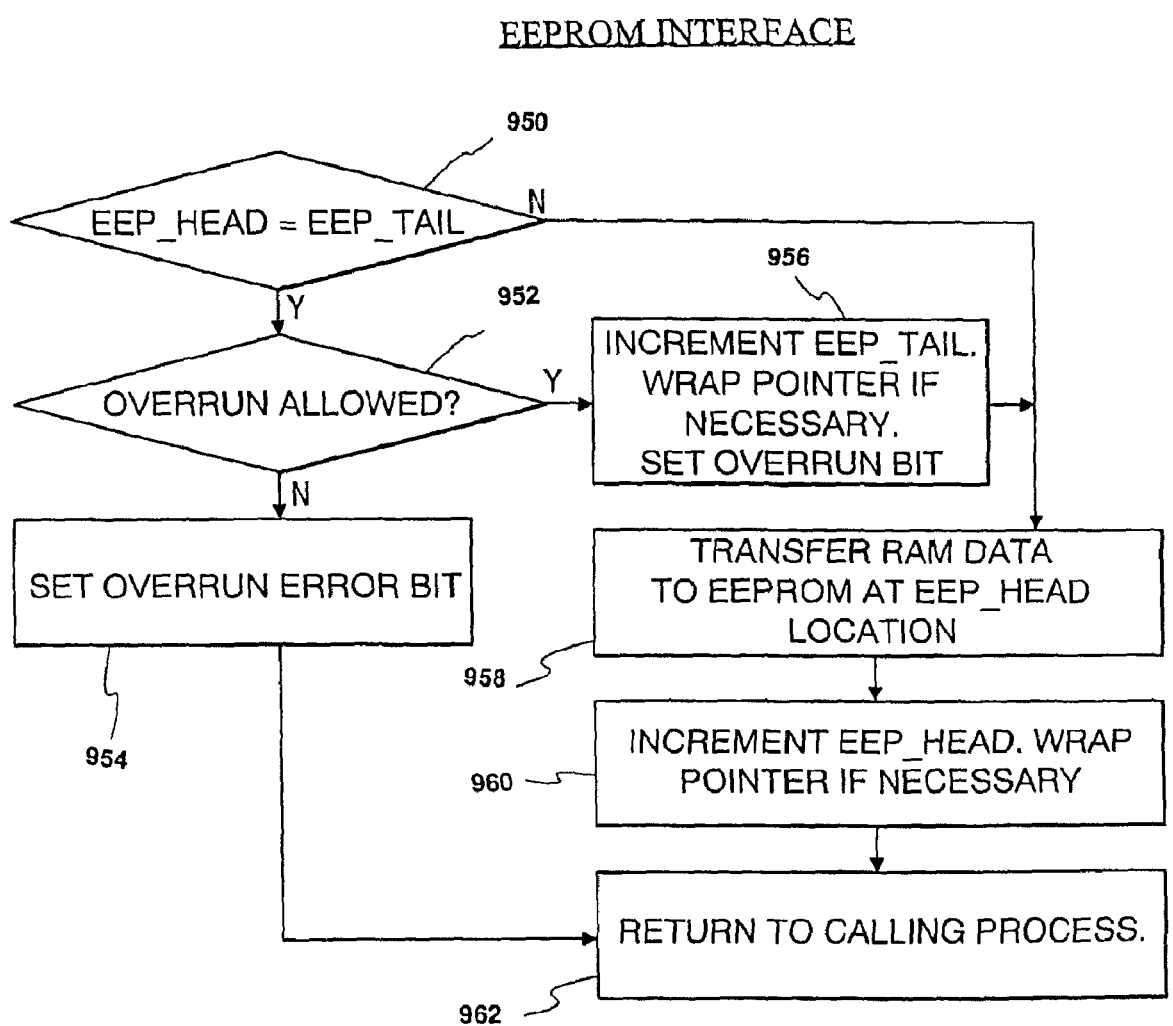
FIG. 47 is a flow chart illustrating the EEPROM routine.

FIG. 47 is a flow chart of the EEPROM routine, according to one embodiment of the invention. The tag 14 archives history data and stores manufacturer and user defined data, configuration constants, and other data (that is infrequently accessed and required to be securely maintained) in a non-volatile memory. This routine includes EEPROM read, EEPROM write, history archive and configuration transfer. Specifically, the tag 14 first determines whether the EEPROM head pointer equals the EEPROM tail pointer (block 950). If it does not, the tag proceeds to block 958. Otherwise, if it does, the tag proceeds to block 952 and determines whether an overrun (or overflow) condition is allowed. If it is not, the tag sets the overrun error bit (block 954) and proceeds to the calling process (block 962). Otherwise, the EEPROM tail pointer is incremented by one and the EEPROM tail pointer is wrapped around and the overrun bit is set, if necessary (block 956). In block 958, the tag 14 transfers data in its RAM to the EEPROM and stores that data beginning at the EEPROM head pointer location. Next, the tag 14, in block 960, increments the EEPROM head pointer to the end of the RAM data (i.e., to the first available memory location after the RAM data) and wraps the pointer, if necessary. The tag 14 then returns to the calling process (block 962).

It is understood that the above process of periodically awakening, taking sensor measurements, communicating such measurements to an external device, etc. can be used in embodiments other than a tire tag. For example, the disclosed process can be used to measure other vehicle parameters, such as vehicle/axle load(s), tire revolutions (mileage), exhaust emissions, oil pressure, battery charge, coolant levels, brake wear, transmission fluid level, power steering fluid level, brake fluid level, clutch fluid level, windshield wiper fluid level, status of headlights and taillights, etc. These parameters can be monitored in much the same way as tire parameters by using a tag that communicates with a remote device via a wireless protocol. Such a tag could use the sleep/wake-up routine described herein to converse battery life. These and other embodiments are within the scope of the disclosed invention.

In one embodiment, a novel electronic tire management system has been disclosed that includes a tire tag 14 mounted on the inside of a tire 10, the tag having a small microcontroller 84 for measuring tire parameters, filtering raw sensor data, storing data, and reporting the tire parameters to a remote RT 30. The tag 14 periodically awakens to search for likely FLPs. If one is detected, the tag further awakens, verifies that the transmission is a valid FLP, and if so, responds to the FLP command. When the tag 14 receives a valid command from a RT, it sends responsive data via one or more RLPs. Typically, the RT 30 first interrogates the tag 14 for its serial number using, for example, the SAR process. Once the tag serial number is verified, a temporary ID is generally assigned to the tag 14. The RT 30 then requests data, such as tire parameters, stored in the tag memory 16. The tag 14 then transmits responsive RLPs to the RT 30. Upon completion of the interrogation mode, the tag 14 resumes the deep sleep mode.

The benefits of using this novel tire tag system include: (1) minimizing the power required to read tire sensors and to communicate with a remote reader/transceiver (RT) 30, (2) digitally filtering the sensor data, (3) archiving the sensor data, and (4) programming the tag to adapt to various environments. A unique antenna is also provided which enhances transmission through both of the tire sidewalls, allows for opposite tire mounting, and makes it easier to interrogate a tire tag by a RT 30.

Therefore, the tag 14 provides read and write access to its internal memory via forward link packets received from a remote RT 30 when the tag 14 is within the RF range of the RT 30. In addition, the tag 14 has an Autonomous Transmission (AT) mode whereby return link packets are automatically transmitted in response to preprogrammed configurations (e.g., the elapse of a periodic interval, or an alarm condition). Alarm conditions include high or low tire pressure and/or high temperature. An alarm signal is generated whenever one of the parameters, such as pressure or temperature, is outside of predetermined limits. This alarm signal is transmitted periodically. The period of transmission can be varied by the user. The AT data is not transmitted when the tag 14 is within range of a RT 30 because otherwise other tags would encounter interference when (1) searching for valid forward link packets, and (2) transmitting their own AT data. Accordingly, the tag 14 stores pressure and temperature data periodically, and if an out of limits condition is detected, an alarm signal will be transmitted at the next AT interval.

While particular embodiments of the invention have been shown and described in detail, it will be obvious to those skilled in the art that changes and modifications of the present invention, in its various embodiments, may be made without departing from the spirit and scope of the invention. Other elements, steps, methods and techniques that are insubstantially different from those described herein are also within the scope of the invention. Thus, the scope of the invention should not be limited by the particular embodiments described herein but should be defined by the appended claims and equivalents thereof.

The invention claimed is:

1. A battery operated device comprising:
a receiver for receiving a transmission that includes a postamble; and
a sensor, in a tire, that measures a parameter of the tire and outputs data indicative of the parameter; and a microprocessor coupled to the receiver and the sensor, configured to periodically partially awaken to determine whether the transmission is likely a forward link packet (FLP) by examining the postamble, and to transmit the data in a reverse link packet (RLP) in response to confirming that the transmission is a FLP.

2. The device of claim 1 wherein the postamble is Manchester encoded.

3. The device of claim 1 wherein the postamble includes a predetermined number of transitions.

4. The device of claim 1 wherein the microprocessor determines whether the transmission is likely a FLP by determining if the transmission includes a predetermined number of transitions.

5. The device of claim 1 wherein the battery operated device includes a transmitter.

6. The device of claim 1 wherein the parameter is temperature.

7. The device of claim 1 wherein the parameter is air pressure.

8. A battery operated device comprising:
a receiver for receiving a transmission that includes a postamble; and
a microprocessor coupled to the receiver, the microprocessor periodically partially awakening to determine whether the transmission is likely a forward link packet (FLP) by examining the postamble and to respond only to a FLP having a specific identification number associated with the device.

9. The device of claim 8 wherein the postamble is Manchester encoded.

10. The device of claim 8 wherein the postamble includes a predetermined number of transitions.

11. The device of claim 8 wherein the microprocessor determines whether the transmission is likely a FLP by determining if the transmission includes a predetermined number of transitions.

12. The device of claim 8 wherein the battery operated device includes a transmitter.

13. A battery operated device comprising:
a receiver for receiving a transmission that includes a postamble;
a transmitter having a phased locked loop (PLL); and
a microprocessor coupled to the receiver, the microprocessor periodically partially awakening to determine whether the transmission is likely a forward link packet (FLP) by first examining a beginning portion of the transmission and, if that beginning portion indicates that the transmission appears to be a valid FLP, then turning on the PLL, and afterward reading the rest of the transmission to determine whether the FLP is valid.

14. The device of claim 13 wherein the postamble is Manchester encoded.

15. The device of claim 13 wherein the postamble includes a predetermined number of transitions.

16. The device of claim 13 wherein the microprocessor determines whether the transmission is likely a FLP by determining if the transmission includes a predetermined number of transitions.

* * * * *